(12) United States Patent
Lo et al.

(10) Patent No.: US 6,601,054 B1
(45) Date of Patent: Jul. 29, 2003

(54) ACTIVE ACOUSTIC AND STRUCTURAL VIBRATION CONTROL WITHOUT ONLINE CONTROLLER ADJUSTMENT AND PATH MODELING

(75) Inventors: James T. Lo, Ellicott City, MD (US); Lei Yu, Ashburn, VA (US)

(73) Assignee: Maryland Technology Corporation, Ellicott City, MD (US)

( * ) Notice: Subject to any disclaimer, the term of this patent is extended or adjusted under 35 U.S.C. 154(b) by 436 days.

(21) Appl. No.: 09/637,406

(22) Filed: Aug. 11, 2000

Related U.S. Application Data

(60) Provisional application No. 60/148,724, filed on Aug. 16, 1999.

(51) Int. Cl.[7] .............................................. G06F 15/18
(52) U.S. Cl. ............................. 706/30; 706/23; 706/14
(58) Field of Search .............................. 706/30, 14, 23

(56) References Cited

U.S. PATENT DOCUMENTS

| | | | | |
|---|---|---|---|---|
| 5,367,612 A | * | 11/1994 | Bozich et al. | 706/23 |
| 5,408,424 A | * | 4/1995 | Lo | 706/22 |
| 5,426,720 A | * | 6/1995 | Bozich et al. | 706/23 |
| 5,434,783 A | * | 7/1995 | Pal et al. | 701/36 |
| 5,652,770 A | * | 7/1997 | Eatwell | 375/350 |
| 5,671,336 A | * | 9/1997 | Yoshida et al. | 706/30 |
| 6,005,952 A | * | 12/1999 | Klippel | 381/71.11 |
| 6,137,886 A | * | 10/2000 | Shoreshi | 381/71.2 |
| 6,246,962 B1 | * | 6/2001 | Schultz et al. | 702/6 |
| 6,292,791 B1 | * | 9/2001 | Su et al. | 706/23 |

OTHER PUBLICATIONS

James Ting–Ho Lo, "Synthetic Approach to Optimal Fitering", IEEE Transactions on Neural Networks, Sep. 1994.*

James Ting–Ho Lo "Robust Adaptive Identification of Dynamics Systems By Neural Network", IEEE International Conference on Neural Networks, Jun. 1997.*

Bouchard et al, "Improved Training of Neural Networks for the Nonlinear Active Control of Sound and Vibration", IEEE Transactions on Neural Networks, Mar. 1999.*

Snyder et al, "Active Control of Vibration Using a Neural Network", IEEE Transactions on Neural Networks, Jul. 1995.*

Feldkamp et al, "Training of Robust Neural Controllers", Proceedings of the 33rd Conference on Decision and Control, IEEE, Dec. 1994.*

Maund et al, "Direct Adaptive Control of Flexible Space Structures Using Neural Networks", IEEE IJCNN, Jun. 1992.*

\* cited by examiner

*Primary Examiner*—George B. Davis

(57) ABSTRACT

Active vibration control (AVC) systems without online path modeling and controller adjustment are provided that are able to adapt to an uncertain operating environment. The controller (250, 280, 315, 252, 282, 317, 254, 319) of such an AVC system is an adaptive recursive neural network whose weights are determined in an offline training and are held fixed online during the operation of the system. AVC feedforward, feedback, and feedforward-feedback systems in accordance with the present invention are described. An AVC feedforward system has no error sensor and an AVC feedback system has no reference sensor. All sensor outputs of an AVC system are processed by the controller for generating control signals to drive at least one secondary source (240). While an error sensor (480, 481) must be a vibrational sensor, a reference sensor (230, 270, 295, 305, 330) may be either a vibrational or nonvibrational sensor. The provided AVC systems reduce or eliminate most of such shortcomings of the prior-art AVC systems as use of an error sensor, relatively slow convergence of a weight/waveform adjustment algorithm, frequent adjustment of a path model, use of a high-order adaptive linear transversal filter, instability of an adaptive linear recursive filter, failure to use a useful nonvibrational reference sensor, failure to deal with the nonlinear behavior of a primary or secondary path, weight adjustment using control predicted values, use of an identification neural network, and online adjustment of the weights of a neural network.

27 Claims, 24 Drawing Sheets

ACTIVE ACOUSTIC AND STRUCTURAL VIBRATION CONTROL WITHOUT ONLINE CONTROLLER ADJUSTMENT AND PATH MODELING

This application claims the benefit of Provisional application No. 60/148,724, filed Aug. 16, 1999.

STATEMENT OF GOVERMENT INTEREST

This invention was made in part with United States Government support under contract N68335-94-C-0154 awarded by the U.S. Navy. The Government has certain rights in the claim of this invention concerning an active control system without an error sensor for attenuating engine exhaust noise.

BACKGROUND OF THE INVENTION

This invention relates to active control of acoustic and structural vibrations with an uncertain vibration statistic or propagation path, which control is achieved by attenuating at least one primary (i.e. unwanted) vibration, at least in part, by injecting at least one specially generated cancelling (i.e. secondary) vibration. An acoustic vibration is gas-, liquid- or solid-borne. A structural vibration is usually a solid-borne longitudinal, torsional or flexural vibration; and is also called a mechanical vibration. Active control of acoustic and structural vibrations considered herein emcompasses active noise control, active sound control, active control of vibration, active noise cancellation, active vibration attenuation, active structural acoustic control, active acoustic and structural vibration control, etc. Active control of acoustic and structural vibrations is herein referred to as active vibration control (AVC) or active acoustic and structural vibration control (AASVC).

There is an enormous amount of research results on AVC (or AASVC). Most of these prior-art results and their applications can be found or tracked down from the books by P. A. Nelson and S. J. Elliott, *Active Control of Sound*, Academic Presss (1992); by S. M. Kuo and D. R. Morgan, *Active Noise Control Systems— Algorithms and DSP Implementations*, John Wiley & Sons, Inc. (1996); by C. R. Fuller, *Active Control of Vibration*, Academic Presss (1996); and by C. H. Hansen and S. D. Snyder, *Active Control of Noise and Vibration*, E & F N Spon (1997), and from the articles and journals referred to in these books. To facilitate discussion on the background of the invention, four basic AVC (i.e. AASVC) systems in the prior art for actively controlling acoustic and structural vibrations with an uncertain vibration statistic or propagation path are briefly described and their shortcomings discussed here.

For brevity, signal conditioners for converting the outputs of sensors and controllers into proper signal forms (e.g. digital signals within a certain frequency band and amplitude range) suitable for subsequent processings are omitted in the discussions in this section on the background of the present invention. An example signal conditioner, that for conditioning the output of an acoustic sensor, comprises a preamplifier, an anti-aliasing filter and an A/D converter.

A first basic AVC system, which is usually used for attenuating a broadband primary vibration, comprises a vibrational reference sensor (e.g. a microphone, hydrophone, accelerometer, velocity transducer, displacement transducer, or strain sensor), a secondary source (e.g. a loudspeaker, horn, underwater sound projector, piezoeletric actuator, electromagnetic shaker, hydraulic actuator, pneumatic actuator, proof mass actuator, electrodynamic and electromagnetic actuator, magnetostrictive actuator, or shape memory alloy actuator), an error sensor (e.g. a microphone, hydrophone, accelerometer, velocity transducer, displacement transducer, or strain sensor) and an adaptive linear filter used as a controller to drive the secondary source. The adaptive linear filter inputs the reference signal from the reference sensor and outputs a control signal for driving the seconary source. Using the error signal from the error sensor and a (mathematical) model of the secondary path (from the output of the adaptive linear filter to the output of the error sensor), an FXLMS (i.e. the filtered-x least-mean-square) algorithm is used to adjust the weights of the adaptive linear filter online to reduce the error signal from the error sensor.

A second basic AVC system, which is usually used for attenuating narrowband primary vibration whose waveform is ordinarily periodic or nearly periodic between its changes, comprises a nonvibrational reference sensor (e.g. a magnetic or optical pickup sensing the rotation of a toothed wheel), a seconary source, an error sensor and a waveform synthesizer. The nonvibrational reference sensor provides a synchronization signal for the waveform synthesizer to lock on to. Acting as a controller, the waveform synthesizer inputs the nonvibrational reference signal from the nonvibrational reference sensor and outputs a synthesized waveform for driving the seconary source. Using the error signal from the error sensor, an adaptation unit is used to adjust the synthesized waveform online to reduce the error signal from the error sensor.

A third basic AVC system uses no (vibrational or nonvibrational) reference sensor and is usually used for attenuating colored (e.g. correlated) primary vibration. It comprises a secondary source, an error sensor and an adaptive linear filter used as a controller. An estimate of the primary vibration component of the error signal from the error sensor is obtained by adding the error signal and an estimate of the secondary vibration component of the error signal, which is obtained by passing the control signal from the adaptive linear filter through a model of the secondary path. The adaptive linear filter inputs said estimate of the primary vibration component and outputs a control signal for driving the secondary source. Using the error signal from the error sensor and the model of the secondary path, an FXLMS algorithm is used to adjust the weights of the adaptive linear filter online to reduce the error signal.

A fourth basic AVC system, which is usually used for attenuating primary vibration of a large mechanical system or inside an enclosure or a large-dimension duct, comprises multiple reference sensors, multiple output actuators, multiple error sensors and an adaptive linear filter as a controller. The adaptive linear filter inputs the reference signals from the reference sensors and outputs a control signal for driving each of the output actuators. Using the error signal from each of the error sensors and the models of the secondary paths (from the output of the adaptive linear filter to each output of error sensors), a multiple-channel FXLMS (filtered-x least-mean-square) algorithm is used to adjust the weights of the adaptive linear filter online to reduce the error signals.

These basic and other AVC systems in the prior art for actively controlling acoustic and structural vibrations with an uncertain vibration statistic or propagation path suffer from at least one of the following shortcomings:

1. Use of an error sensor at each objective point: If a primary path (from the output of a reference sensor to the output of an error sensor) or a secondary path is uncertain (i.e. unknown or time-varying) and if either the weights of an adaptive linear filter or a synthesized waveform generated by a waveform synthesizer is adjusted online, one error sensor must be used at each objective point, which adds to the cost of the AVC system and may cause inconvenience. In some applications, an error sensor senses not only primary and secondary vibrations but also a third vibration that is correlated with the primary vibration and thus degrades the AVC performance.

2. Relatively slow convergence of a weight/waveform adjustment algorithm: If a primary path or a secondary path undergoes a relatively rapid change, an LMS algorithm (e.g. an FXLMS algorithm or a filtered-u recursive LMS algorithm), a RLS algorithm or an adaptation unit is not fast enough in adjusting the weights of an adaptive linear filter or the synthesized waveform generated by a waveform synthesizer used as a controller for some applications.

3. Online or frequent modelling of a secondary path: If a secondary path is time-varying, a model of it needs to be adjusted either online or offline from time to time.

4. Use of a high-order adaptive linear transversal filter: If an adaptive linear recursive filter is the natural one to be used as a controller or as a model of a secondary path, but an adaptive linear transversal filter is used instead to approximate it, the order of the adaptive linear transversal filter is usually large and requires much computation for its weight adjustment. In fact, the better the approximation is wanted, the larger the order is required.

5. Instability of an adaptive linear recursive filter: If an adaptive linear recursive filter is used as a controller or as a model of a secondary path, its poles may lie outside of the unit circle during the weight adjustment process, causing instability. Besides, the performance surface of an adaptive linear recursive filter is generally nonconvex and thus has poor local extrema. Furthermore, an adaptive linear recursive filter has a slower convergence rate than an adaptive linear recursive filter.

6. Failure to use a useful nonvibrational reference sensor: A waveform synthesizer usually uses the synchronization information from a nonvibrational reference sensor. Many other forms of information about the primary vibration waveform that can be provided by various different nonvibrational sensors are not effectively used. For example, the electric current drawn by a electric fan or motor; the electric current generated by a power generator; the road surface condition for an automobile; the position of the throttle valve, the intake manifold vacuum and mass air flow in an internal combustion engine, etc.

7. Failure to deal with nonlinearity in a primary or secondary path: If a primary or secondary path has nonlinear behavior, there is room for improvement in the performance of an adaptive linear filter used as a model of a secondary path or as a controller to drive a secondary source.

In U.S. Pat. No. 5,434,783 issued in 1995 to Chinmoy Pal and Kamakura Hagiwara, AVC systems for actively reducing acoustic vibrations in a vehicular compartment and/or vehicular body vibrations, that have uncertain statistics and propagation paths, by the use of neural networks are disclosed. They suffer from the following shortcomings:

1. Use of an error sensor at each objective point: Error sensors add to the cost of the AVC system. In the case of reducing acoustic vibration in a vehicular compartment, some objective points may have to be chosen either at places causing inconvenience to the passengers in the vehicular compartment or at places causing lower AVC performance. Moreover, the error sensors sense not only the primary and secondary vibrations but also the music and/or conversation inside the vehicular compartment, which degrades the AVC performance.

2. Weight adjustment using control predicted values: The weights (e.g. parameters) of a control neural network in a control unit are adjusted by comparing a control predicted value with a control target value. The control predicted value is only an approximate of the the true error signal. Since this approximation error is included in adjusting the weights of the control neural network, the performance of the control neural network is degraded.

3. Use of an identification (i.e. modeling) neural network: If an identification neural network is used to generate a control predicted value, it takes a large amount of additional computation to run and to adapt this identification neural network.

4. Online adjustment of the weights of a neural network: Online weight adjustment for a neural network takes much computation, may fall into a poor local minimum of the performance surface of the control neural network, and needs to wait a large number of time steps to collect sufficient amount of information for determining the weights.

AVC systems for actively controlling acoustic and structural vibrations with an uncertain statistic or propagation path, that use neural networks, are also reported in the journal articles by S. D. Snyder and N. Tanaka, "Active control of vibration using a neural network," *IEEE Transactions on Neural Networks*, Vol. 6, No. 4, 1995; and by M. Bouchard, B. Paillard, and C. T. L. Dinh, "Improved training of neural networks for the nonlinear active control of sound and vibration," *IEEE Transactions on Neural Networks*, Vol. 10, No. 2, 1999. In these articles, two multilayer perceptrons (or feedforward networks) are used respectively as the controller and the secondary path model. No recursive neural network is mentioned. However, the AVC systems therein also suffer from the shortcomings of the use of error sensors, the use of an identification neural network and the online adjustment of the weights of a neural network as stated above for the AVC systems desclosed in U.S. Pat. No. 5,434,783.

Because of the foregoing shortcomings of the AVC systems for actively controlling acoustic and structural vibrations with an uncertain statistic or propagation path from the books by P. A. Nelson and S. J. Elliott, *Active Control of Sound*, Academic Presss (1992) and by S. M. Kuo and D. R. Morgan, *Active Noise Control Systems—Algorithms and DSP Implementations*, John Wiley & Sons, Inc. (1996); the AVC systems from U.S. Pat. No. 5,434,783 issued to Chinmoy Pal and Kamakura Hagiwara (1995); and the AVC systems from the journal articles by S. D. Snyder and N. Tanaka, "Active control of vibration using a neural network," *IEEE Transactions on Neural Networks*, Vol. 6, No. 4, 1995; and by M. Bouchard, B. Paillard, and C. T. L. Dinh, "Improved training of neural networks for the nonlinear active control of sound and vibration," *IEEE Transactions on Neural Networks*, Vol. 10, No. 2, 1999, there is a need for better AVC (i.e. AASVC) systems for actively controlling acoustic and structural vibrations with an uncertain statistic or propagation path.

SUMMARY

It is an object of the present invention to provide an active vibration control (AVC) system for actively controlling acoustic or/and structural vibration(s) with an uncertain statistic or propagation path that requires neither online controller adjustment nor online propagation path modeling and thereby reduces or eliminates some or all of the shortcomings of the prior-art AVC systems. As described in the preceding BACKGROUND section, these shortcomings include use of an error sensor at each objective point, relatively slow convergence of a weight/waveform adjustment algorithm, online or frequent adjustment of a model of a secondary path, use of a high-order adaptive linear transversal filter, instability of an adaptive linear recursive filter, failure to use a useful nonvibrational reference sensor, failure to deal with the nonlinear behavior of a primary or secondary path, weight adjustment using control predicted values, use of an identification neural network, and online adjustment of the weights of a neural network.

The above-stated object can be achieved by providing an AVC (feedforward) system comprising reference sensor means for deriving at least one reference signal containing information about at least one primary vibration; a recursive neural network, comprising a plurality of weights, for processing said at least one reference signal to generate at least one control signal; and secondary source means, comprising at least one secondary source, for converting said at least one control signal into at least one cancelling vibration, wherein said weights are held fixed online during the operation of said AVC feedforward system.

The above-stated object can also be achieved by providing an AVC (feedforward-feedback) system comprising reference sensor means for deriving at least one reference signal containing information about at least one primary vibration; error sensor means for sensing a combination of at least one primary vibration and at least one cancelling vibration to provide at least one error signal; a recursive neural network, comprising a plurality of weights, for processing said at least one reference signal and said at least one error signal to generate at least one control signal; and secondary source means, comprising at least one secondary source, for converting said at least one control signal into said at least one cancelling vibration, wherein said weights are held fixed online during the operation of said feedforward-feedback AVC system.

The above-stated object can also be achieved by providing an AVC (feedback) system comprising error sensor means for sensing a combination of at least one primary vibration and at least one cancelling vibration to provide at least one error signal; a recursive neural network, comprising at least one nonlinear hidden neuron and a plurality of weights, for processing said at least one error signal to generate at least one control signal; and secondary source means, comprising at least one secondary source, for converting said at least one control signal into said at least one cancelling vibration, wherein said weights are held fixed online during the operation of said AVC feedback system.

In every AVC system disclosed herein for actively controlling acoustic and structural vibrations with an uncertain statistic or propagation path, there is no online modeling of a primary, feedback or secondary path, and all weights of the recursive neural network used as a controller are held fixed online during the operation of the AVC system. The recursive neural network, with proper offline a priori training, is able to adapt to every uncertain vibration statistic or propagation path of the AVC system.

DESCRIPTION OF THE DRAWINGS

These and other features, aspects and advantages of the present invention will become better understood with regard to the following description, appended claims, and accompanying drawings where:

DESCRIPTION OF PREFERRED EMBODIMENTS

After proper offline a priori training, a recursive neural network with fixed weights is able to adapt to uncertain environmental parameters (e.g. input statitics). This adaptive ability of a recursive neural network with all its weights held fixed online is called accommodative ability. The accommodative ability is implied by the main theorem proven in "Synthetic approach to optimal filtering," *Proceedings of the 1992 International Simulation Technology and 1992 Workshop on Neural Networks*, pp. 475–481, Clear Lake, Tex., November 1992, and was discussed in the final technical report, *Neural Network Approach to Optimal Filtering*, submitted to the Rome Laboratory, U.S.A.F., on May 27, 1994, by the first-named inventor, James T. Lo. The same ability was also mentioned in L. A. Feldkamp and G. V. Puskorius, "Training of robust neural controller," in *Proceedings of the 33rd Conference on Decision and Control*, pp. 2754–2759, Lake Buena Vista, Fla., 1994, and James T. Lo and Lei Yu, "Adaptive neural filtering by using the innovations process," in *Proceedings of the 1995 World Congress on Neural Networks*, Vol. II, pp. 29–35, Washington, D.C., 1995.

The adaptive capability of recursive neural networks with weights fixed online (i.e. accommodative capability) is exploited in this invention. Thus, the weights of the recursive neural network used as the controller in every AVC system in accordance with this invention are held fixed online during the operation of the AVC system. Therefore, online modeling of secondary, feedback and/or primary paths is not necessary. No online controller weight adjustment and no online modeling of the secondary path are two main advantages of the present invention over the prior-art AVC systems for an operating environment with an uncertain vibration statistic or propagation path, from which other advantages derive.

In the following, elements and structures of neural networks and examples of neural network paradigms are first described. The accommodative capabilities of recursive neural networks are then discussed in more detail, followed by definitions of terminologies for AVC systems. Description of preferred AVC systems in accordance with this invention and their examples are then given for various AVC situations.

Elements and Structures of Neural Networks

Figure 1:
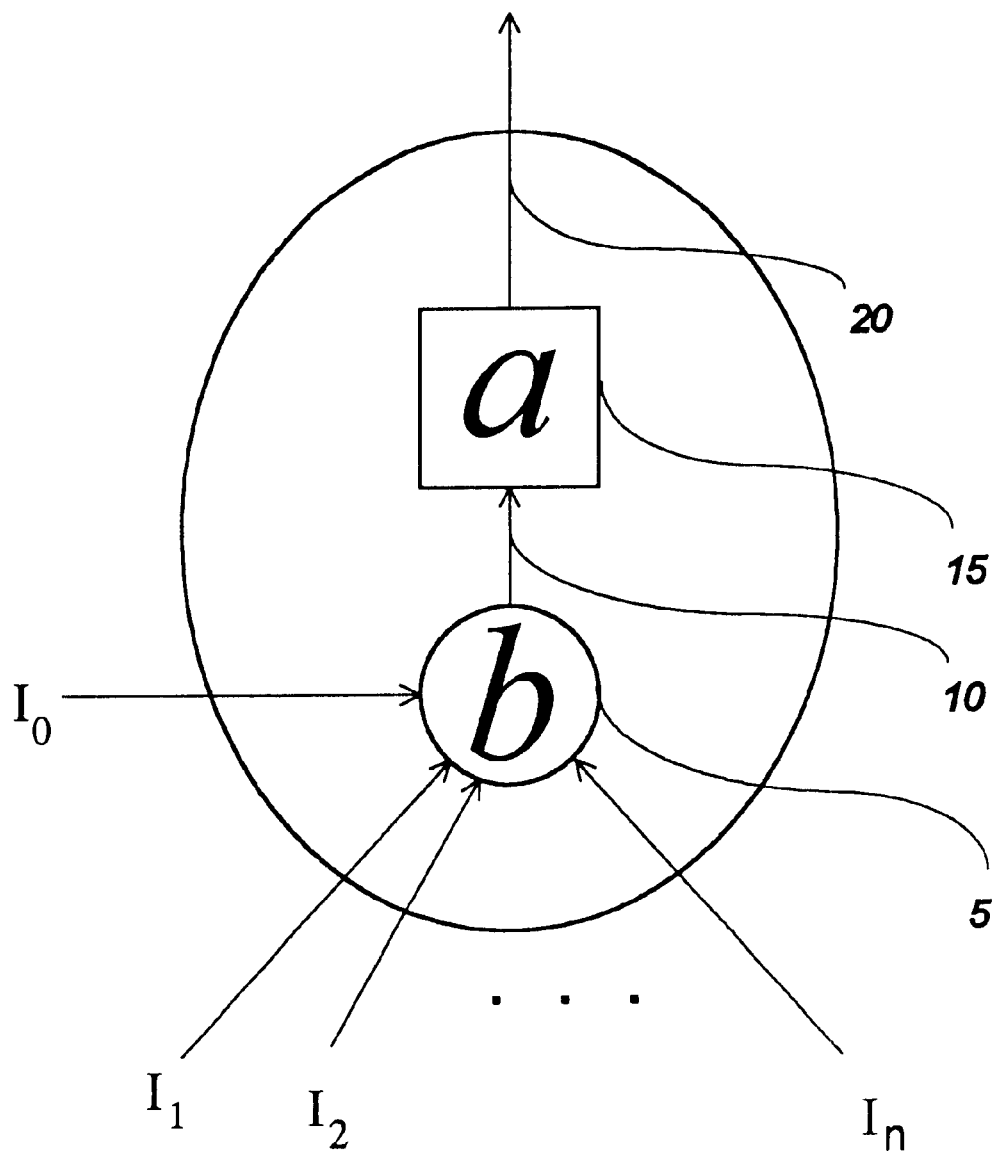
FIG. 1 is a schematic diagram of a typical neuron.

A neuron or node is a processing element that receives input numbers and produces an output number, which is called the activation level of the neuron or node. Referring to FIG. 1, a typical neuron (or node) consists of two functions, a basis function, b, and an activation function, a, forming a function composition. The basis function 5 is usually a finite series expansion of the bias $I_0$ and inputs, $I_1$, ..., $I_n$, to the neuron, which expansion is comprised of polynomial, rational, trigonometric, exponential, logarithmic, hyperbolic, transcendental, wavelet, and/or spline element(s). The value of the basic function at the link 10 is $b(I_0, I_1, ..., I_n)$. The activation function 15 is simply a linear or nonlinear transformation, which is a sigmoidal, exponential, wavelet, spline, polynomial, rational, trigonometric, hyperbolic, logarithmic, other transcendental function or a combination thereof. The activation level 20 of the neuron is thus $a(b(I_0, I_1, ..., I_n))$. If the activation level, $a(b(I_0, I_1, ..., I_n))$, of a neuron is a nonlinear function of $I_0, I_1$, ..., $I_n$, the neuron is called a nonlinear neuron.

Figure 2:
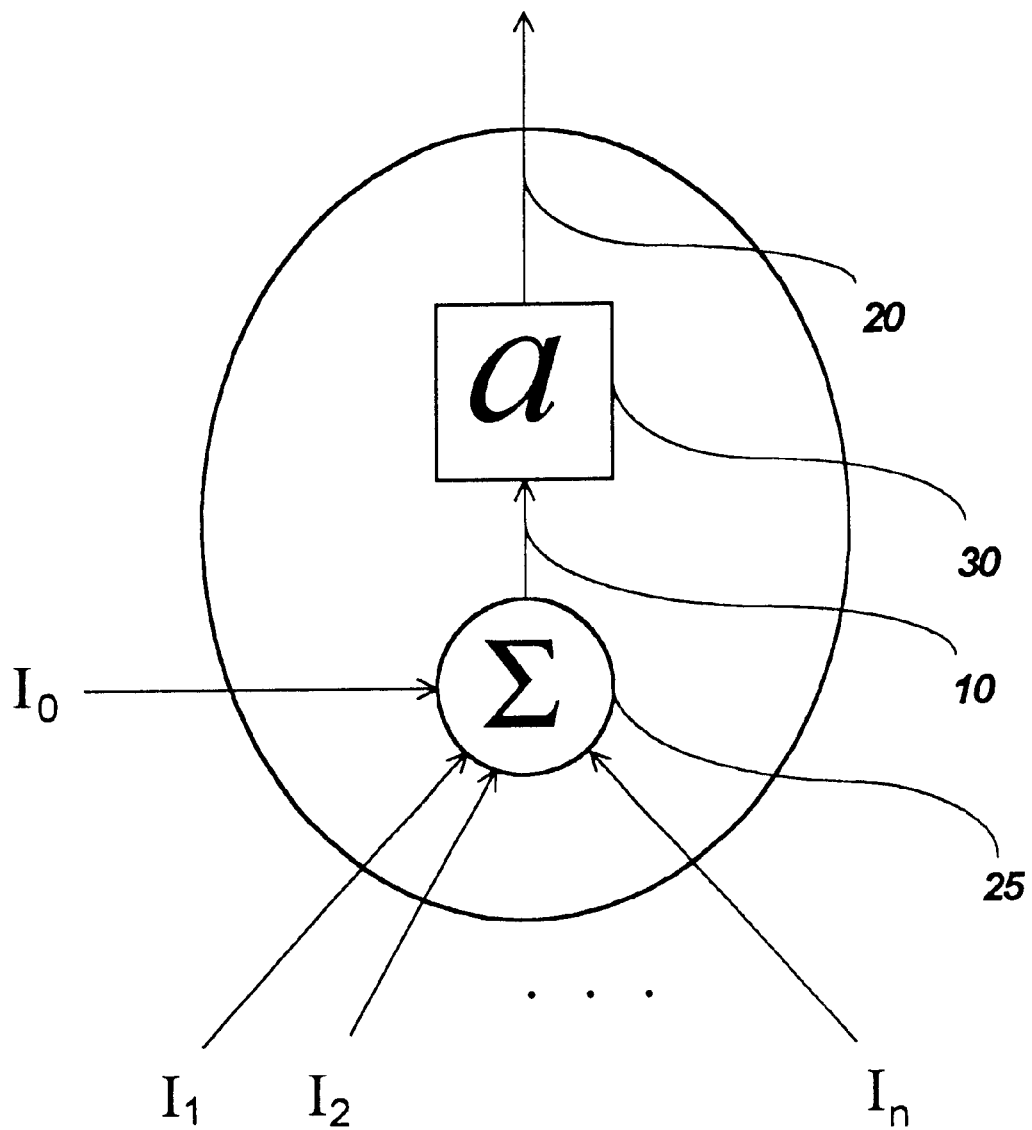
FIG. 2 is a schematic diagram of a widely-used neuron, which is a special case of the typical neuron depicted in FIG. 1.

A widely-used neuron, which is a special case of the above typical neuron, is depicted in FIG. 2. It consists of a summer 25 and an activation function 30 denoted by x and a respectively. The activation function is a sigmoid function such as the hyperbolic tangent function, tan hx, and the logistic function, $1/(1+e^{-x})$. Denoting the inputs to the typical neuron by $I_1, I_2, ..., I_n$, and the bias for the neuron by $I_0$, the basic function here is $\Sigma_{i=0}^{n} I_i$ and the activation level of the neuron at its output terminal 20 is $a(\Sigma_{i=0}^{n} I_i)$.

A constant that affects a neuron's processing such as a constant in the basic and activation functions of the neuron is called a parameter or a weight of the neuron. A delayless connection is means for effecting a weighted signal transfer from one neuron to another neuron. More specifically, a delayless connection is means for multiplying the activation level of a neuron by a number, which is called the weight of the delayless connection, and sending the resulting product to another neuron as one input of this neuron. A weight of a delayless connection is sometimes called a delayless weight. A delay connection is means for multiplying a first neuron's activation level by a number, which is called the weight of the delay connection, holding the resulting product for at least one unit of time, and then sending this product to a second neuron as one input of this second neuron. The second neuron may or may not be the same as the first. A weight of a delay connection is sometimes called a delay weight. By a connection and a weight of a connection, we mean a delayless or delay connection and a weight of a delayless or delay connection, respectively, unless indicated or implied otherwise. The bias for a neuron is a parameter of the neuron, but often treated as the weight of a delayless connection leading into this neuron from a constant activation level 1. A (delayless and/or delay) weight may be set equal to one or some other constant. It may also be determined in a process or procedure called training to be elaborated on later. A weight of a neuron and a weight of a connection leading to said neuron are said to be local to said neuron. It is understood that the word "time" herein refers to the index of a sequence, which may be an index of time or may simply be the numbering or index of patterns or events. In the latter case, the phrases, "a time unit" and "a time step" mean "a change of the numbering or index by one."

A neural network (NN) is a plurality of neurons and a plurality of connections (delay and/or delayless connections), which include one or more neurons receiving inputs from outside the NN (neural network), which neuron(s) are called input neurons; and one or more neurons sending out outputs to outside the NN, which neuron(s) are called output neurons, such that the outputs are nonlinear functions of the inputs. An input from outside the NN is referred to as an input of the NN. Those neurons that are neither input neurons nor output neurons are called hidden neurons of the NN. A nonlinear neuron that is neither an input neuron nor an output neuron is called a hidden nonlinear neuron. (It is understood that if a neuron in an NN is treated as a hidden neuron in the training of the NN, examining the activation level of a hidden neuron or using it for a purpose other than the purpose that the NN is trained for in an operation of the NN do not make the hidden neuron an output neuron.) There may be one or more different types of neuron in an NN. For instance, an input neuron may only serve to distribute its single exogenous input signal through connections to some other neuron(s) and an output neuron may only serve to evaluate the sum of its bias and input signals, which arrive through connections from other neurons.

Consider an NN whose N neurons each have a summer and an activation function. Let the neurons in the NN be numbered 1 through N; the activation function of neuron n be denoted by $a_n$; the set of neurons each having a connection leading to neuron n with a delay of m time units be denoted by $D_m(n)$; the weight of the connection from neuron j to neuron i be denoted by $w_{ij}$; the activation level of neuron n at time t be denoted by $\beta_n(t)$; the exogenous input to neuron n be denoted by $I_n$; the bias for neuron n be denoted by $w_{n0}$; and the maximum connection delay be denoted by M. Then at time t, the processing performed by neuron n is $$\eta_n(t) = I_n + w_{n0} + \sum_{m=0}^{M} \sum_{j \in D_m(n)} w_{nj} \beta_j(t-m),$$

$$\beta_n(t) = a(\eta_n(t)).$$

Figure 3:
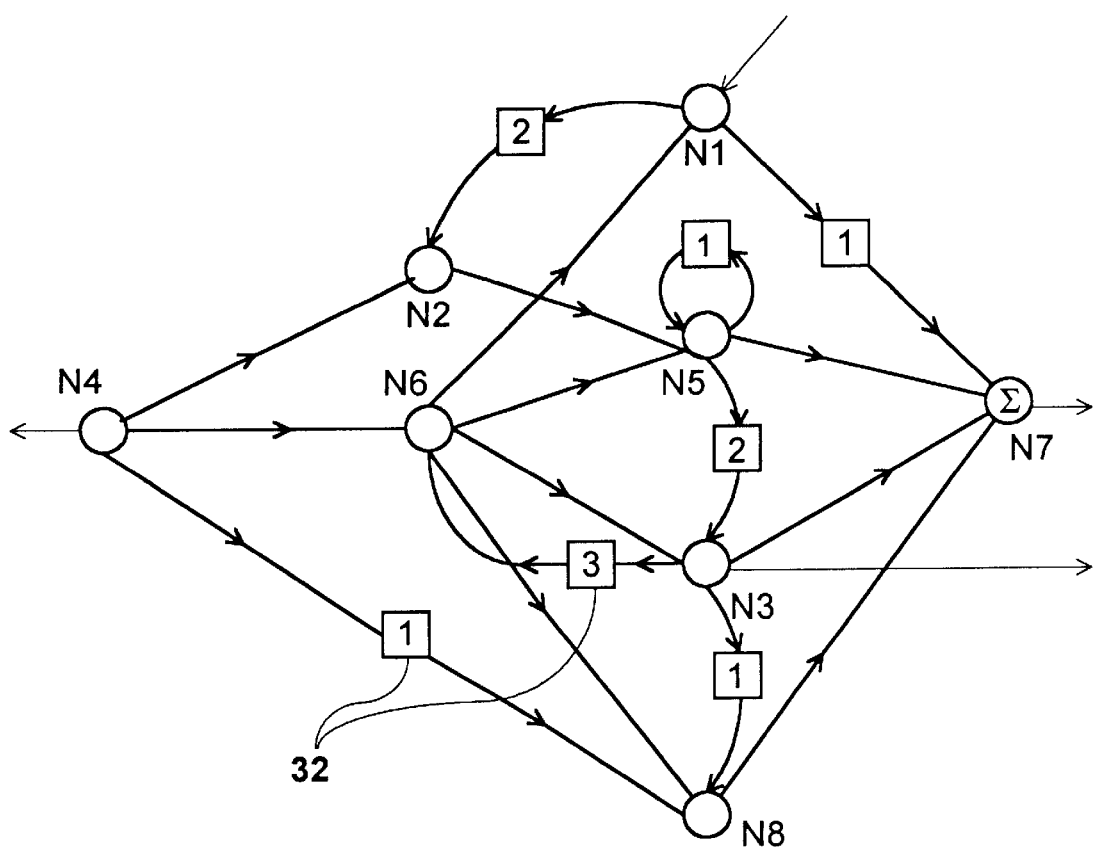
FIG. 3 shows an example neural network (NN).

An example NN is shown in FIG. 3. It contains 8 neurons, which are numbered N1 through N8 and represented by circles in the figure. Neurons N1 and N4 are the input neurons receiving exogenous inputs. Neurons N3 and N7 are the output neurons sending out output signals to outside the NN. Both the basic and activation functions of Neuron N4 are the identity function whose input and output are identical. Neuron N4 simply distributes its single input signal to its succeeding neurons N2, N6 and N8. Neuron N7 is simply a summer, which sums the activation levels of N7's preceding neurons N1, N5, N3 and N8. Neurons N1, N2, N3, N5, N6 and N8 are of the same type, whose basic function is a summer and whose activation function is the hyperbolic tangent function, tan hx. A delayless connection is represented by a line with an arrowhead indicating the direction of the signal transfer. A delay connection is represented by two lines, each with an arrowhead, connected in series with a box 32 in between. The box encloses a number that indicates the number of time steps that the connection holds a signal before it transfers the signal.

The example NN has a layer structure: We observe that at a discrete time, neuron N4's activation level must be available, before all the processings in neurons N2 and N6 can be performed. Although N2 and N6 receive signals from N1 and N3 respectively, these signals are delayed signals and are thus available from preceding discrete times. Therefore, as soon as the activation level of N4 becomes available, N2 and N6 can perform their processings and make their activation levels available for other neurons. Similarly, as soon. as the activation levels of N2 and N6 become available, the processings of neurons N1, N5, N3 and N8 can be performed, whose activation levels are needed in neuron N7's processing. Hence, the 4 sets of neurons, {N4}, {N2, N6}, {N1, N5, N3, N8}, and {N7}, form 4 layers to be called layer 0, layer 1, layer 2, and layer 3, respectively, of the example NN.

This observation can be easily generalized: Given an NN, we ignore the delay connections and examine the order in which the neurons' processings (1) can take place. Those neuron(s) whose processing(s) can be performed simultaneously form a layer. The resulting layers are then numbered layer 0, layer 1, . . . , in their processing order. Notice that a delayless connection must feed forward from a layer to a higher-ordered layer, but a delay connection may either feed forward to a higher-numbered layer or feed back to the same or a lower-numbered layer. A connection is called a feedforward connection or a feedback connection, depending on whether it feeds forward or backward.

Recall from the graph theory that a directed graph G consists of two sets, V and E, V being a finite nonempty set of vertices and E being a set of directed pairs of vertices called edges. An edge is represented by a directed pair ($V_i$, $V_j$), where $V_i$ is the tail and $V_j$ is the head of the edge. A path from vertex $V_p$ to vertex $V_q$ in graph G is a sequence of vertices, $V_p$, $V_{i_1}$, $V_{i_2}$, . . . , $V_{i_n}$, $V_q$, such that ($V_p$, $V_{i_1}$), ($V_{i_1}$, $V_{i_2}$), . . . , and ($V_{i_n}$, $V_q$) are edges in E. A simple path is a path in which all vertices except possibly the first and last are distinct. A cycle is a simple path in which the first and last vertices are the same. A very special case of a cycle is a vertex $V_p$, if ($V_p$, $V_p$) is an edge in E. The terminology of directed graphs used here can be found in the book by E. Horowitz and S. Sahni, *Fundamentals of Data Structure,* Computer Science Press, Inc. (1976).

Ignoring the exogenous inputs and the connection delays of an NN, the NN can be viewed as a directed graph with the neurons as the vertices and the (delay and/or delayless) connections as the edges. A neuron on a cycle is called a cyclic neuron. A neuron that is not a cyclic neuron is called a noncyclic neuron. All the neuron(s) and connection(s) that have a path to a cyclic neuron form the recursive section of the NN. The rest form the nonrecursive section. Expressing the NN's output(s) as a function of the inputs, the delayed activation levels (held by the delay connections), and the (connection and neuron) weights of the NN, a weight from the nonrecursive section that appears linearly is called a linear weight and a connection with a linear weight is called a linear connection. A weight or connection that is not linear is called a nonlinear weight or connection, respectively. The set of all the linear connection(s), the neuron(s) at the tail(s) of these linear connection(s), and the linear weight(s) of neuron(s) with a linear weight is called the linear section of the NN. The rest of the NN is called the nonlinear section of the NN. The intersection of the nonlinear section and the nonrecursive section is called the nonlinear subsection of the nonrecursive section of the NN.

In the example NN shown in FIG. 3, there are two cycles. One cycle is the sequence, N5, N3, N6 and N5, because (N5, N3), (N3, N6) and (N6, N5) are connections of the NN. The other cycle is N5 itself, since (N5, N5) is a self-feedback connection in the example NN. Hence, N5, N3 and N6 are cyclic neurons. Observe that N6, N1, N2 and N5 form a path to a cyclic neuron, N5; that N4, N2 and N3 form another path to a cyclic neuron, N3; and that N4 and N6 form a third path to a cyclic neuron, N6. Therefore, the neurons, N4, N2, N6, N1, N5 and N3, together with the connections, (N4, N2), (N4, N6), (N2, N5), (N2, N3), (N6, N1), (N6, N5), (N6, N3), (N1, N2), (N5, N3), (N3, N6) and (N5, N5), form the recursive section of the example NN. The neurons, N8 and N7, together with the connections, (N4, N8), (N6, N8), (N3, N8), (N1, N7), (N5, N7), (N3, N7) and (N8, N7), form the nonrecursive section of the example NN. Since the activation functions of N1, N5, N3 and N8 are nonlinear, the only linear weights of the example NN are (N1, N7), (N5, N7), (N3, N7) and (N8, N7).

Depending on the structure, there are different types of NN: An NN with at least one delay connection is called a recurrent NN. An NN without a delay connection is called a nonrecurrent NN. An NN with at least one cyclic neuron is called a recursive NN. An NN without a cyclic neuron is called a nonrecursive NN. While a nonrecursive NN has an empty recursive section, a recursive NN has a nonempty recursive section. We note that a recursive NN must be a recurrent NN, but a recurrent NN may not be a recursive NN. A recurrent NN is a discrete-time dynamic system with all the activation levels of the recurrent NN, that are held by the delay connections at a time, as its dynamic state at the time. The dynamic state of a recurrent NN, in which an operation of the recurrent NN is initiated, is called the Initial dynamic state of the recurrent NN for the operation. The components (or activation levels) of an initial dynamic state of a recurrent NN are viewed as weights of the recurrent NN. By the weights of an NN, we refer to the weights of the connections, the parameters of the neurons, and the components of the initial dynamic state, that exist in the NN. Recurrent NNs are usually used to process processes. The sequence of outputs from a recurrent NN is called the output process of the recurrent NN. The sequence of inputs to a recurrent NN is called the Input process of the recurrent NN.

Training a neural network means determining and/or adjusting some or all of the weights of the NN substantially through a process of reducing the value of a training criterion by the variation of these weights. The training criterion is a mathematical function of these weights, that is defined using simulated, experimental, and/or experiential/operational data about the operating environment of the NN to reflect (i.e. bring about the characteristics of) the performance for the NN in its intended application. These data that are used to construct the training criterion are called the training data. Algorithms for training recursive neural networks are discussed in some published books and research papers. Backpropagation through time (BPTT) and real time recurrent learning (RTRL) algorithms for differentiating a training criteria with respect to the weights (including initial activation levels) of an MLPWIN or MLPWOF can be found in U.S. Pat. Nos. 5,408,424 and 5,649,065.

The collection of all the NNs with some common configurational feature(s) is called an NN paradigm. For instance, the existence or nonexistence of a connection among the neurons in a neuron layer is a configurational feature. The collection of all the NNs of the same NN paradigm that have the same number of neurons of each type, the same number of delay connections, the same number of delayless connections, the same number of input neurons, the same number of output neurons, and the same configuration thereof is called an NN architecture. In other words, two NNs are of the same architecture if and only if they are identical except with possibly different weights on the connections, different parameters in the neurons, and/or different initial dynamic states. Whenever these connection weights, neuron parameters, and/or initial dynamic state are specified for an NN architecture, the NN is completely specified. Recall that these connection weights, neuron parameters and/or initial dynamic state of an NN are all called the weights of the NN, unless a distinction between the connection weights, the neuron parameters, and/or initial dynamic state is necessary and made clear in the context.

Example Neural Network Paradigms

Some example NN paradigms are described in the following.

Figure 4:
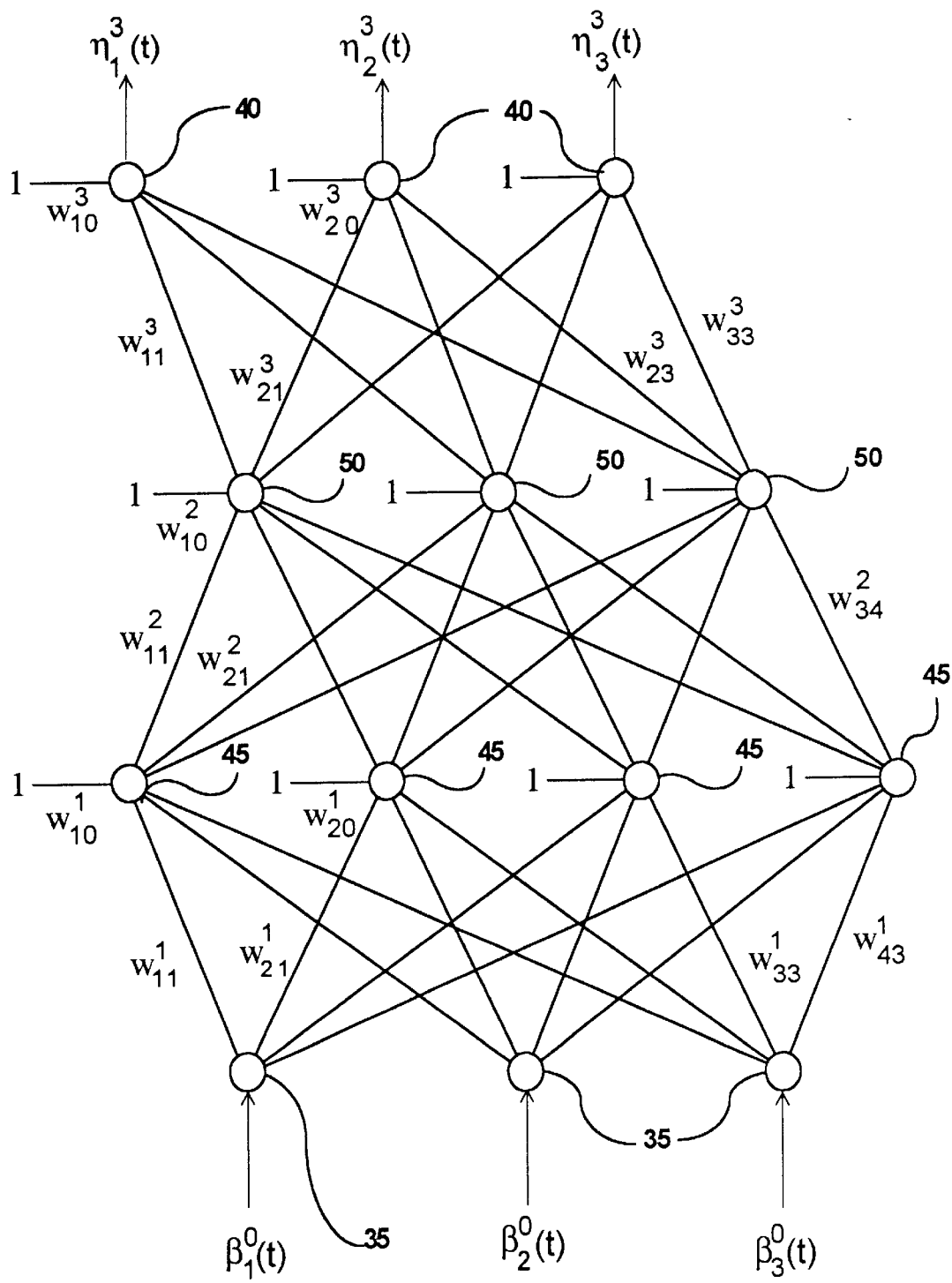
FIG. 4 shows an example multilayer perceptron (MLP).

1. Multilayer perceptrons (MLPs): MLPs are perhaps the most popular NN paradigm. An example MLP is depicted in FIG. 4. It has 3 input neurons 35 in the zeroth layer, 4 hidden neurons 45 in the first layer, 3 hidden neurons 50 in the second layer, and 3 output neurons 40 in the third and last layer. All the neurons are of the kind shown in FIG. 2. The input neurons 35, whose activation functions are the identity function, simply distribute the exogenous input, ($\beta_1^0(t)$, $\beta_2^0(t)$, $\beta_3^0(t)$), to the neurons in the first layer. The output neurons 40, whose activation functions are also the identity function, are summers, producing outward output, ($\eta_1^3(t)$, $\eta_2^3(t)$, $\eta_3^3(t)$). The activation functions of the neurons in the first and second layers are the hyperbolic tangent, tan hx. All the connections in the example MLP are delayless connection.

The neurons in each layer are numbered from left to right in FIG. 4. The "numbering of a neuron" refers to this numbering in the neuron's layer. The symbol $w_{ij}^l$ denotes the weight on the delayless connection from neuron j in layer l−1 to neuron i in layer l. Only a few of the $w_{ij}^l$ are shown in FIG. 4 to avoid cluttering the figure. The bias for neuron i in layer l is denoted by $w_{i0}^l$, which is viewed as "the weight on the delayless connection leading into i in layer l from neuron 0 in layer l−1, whose activation level is set always equal to 1." Layer l of the MLP consists of the neurons in layer l and the connections leading into them. The totality of the weights in layer l is denoted by $w^l$.

Let us now see how the example MLP depicted in FIG. 4 processes information at time t. Recalling that component i of the input at time t is denoted by $\beta_i^0(t)$, the activation level $\beta_i^l(t)$ of neuron i in layer l and the weighted sum $\eta_i^l(t)$ in the same neuron at time t satisfy, for l=1,2, $$\beta_i^l(t) = a_i^l(\eta_i^l(t)), \tag{1}$$

$$\eta_i^l(t) = w_{i0}^l + \sum_{j=1}^{n_{l-1}} w_{ij}^l \beta_j^{l-1}(t), \tag{2}$$

where $n_{l-1}$ denotes the number of neurons in layer l−1 and $a_i^l(x)$ is the activation function of neuron i in layer l. The output $\eta_i^L(t)$ for L=3, at output neuron i is then determined by $$\eta_i^L(t) = w_{i0}^L + \sum_{j=1}^{n_L} w_{ij}^L \beta_j^{L-1}(t). \tag{3}$$

Depending on the application, there can be, in an MLP, any number L of layers, any number $n_0$ of input neurons, any number $n_L$ of output neurons, and any number $n_l$ of neurons in each hidden layer l. Although the hyperbolic tangent function tan hx and the logistic function $1/(1+e^{-x})$ are perhaps most widely used as the activation functions in the MLPs in the literature, another function or functions selected from the group consisting of sigmoidal, wavelet, spline, polynomial, rational, trigonometric and exponential functions can also be used as the activation functions $a_i^l$ in MLPs to make the processors in the adaptive neural systems in accordance with the present invention. It is noted that all the MLPs with one and the same activation function for hidden neurons form one MLP paradigm. It will be appreciated that there may be more than one type of activation function in an MLP paradigm and the activation function of an input neuron does not have to be an identity function. By setting some delayless weights $w_{ij}$ equal to zero, differently configured MLPs, which are not fully connected, can be obtained. Notice that the equations, (1), (2) and (3), for l=1, ..., L−1, possibly with some minor modifications are valid for the processing of most MLPs.

Since there are no delay connections in an MLP, it does not have a recursive section and is thus a nonrecursive NN. If all the output neurons are summers, equation (3) is valid for every output component of an MLP. Hence all the weights, $w_{ij}^L$, in layer L, appear linearly in the MLP's outputs and are thus linear weights of the MLP. Since every other weight appears in the MLP's outputs through nonlinear activation functions, the weights, $w^L$, constitute the linear section of the MLP.

Figure 5:
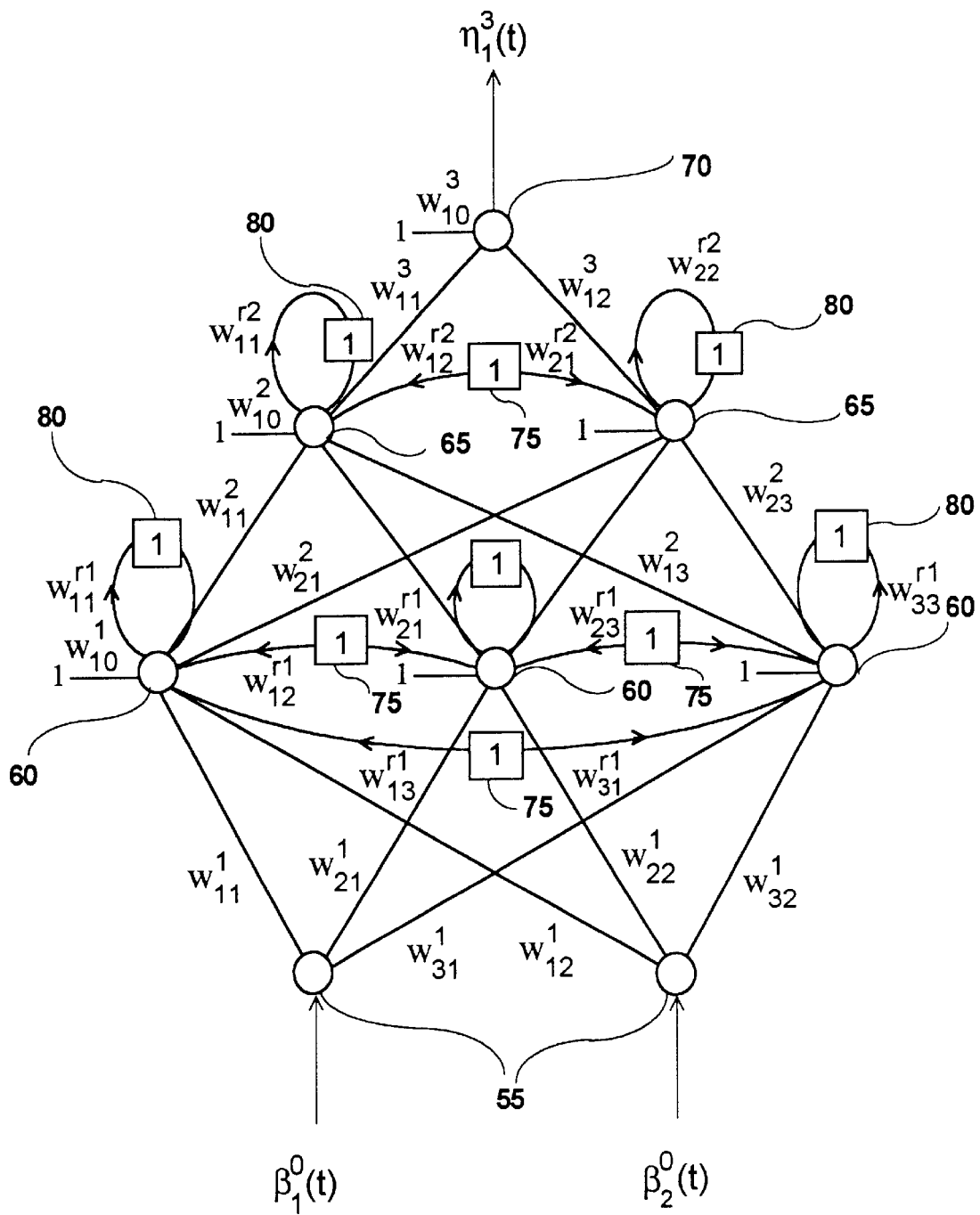
FIG. 5 shows an example multilayer perceptron with interconnected neurons (MLPWIN).

2. Multilayer perceptrons with interconnected neurons (MLPWINs): An MLPWIN is formed with a multilayer perceptron (MLP) by connecting some or all of the neurons in at least one layer of the MLP. There is a unit time delay device on each such connection, making it a delay connection. MLPWINs first appeared in J. L. Elman, "Finding Structures in Time," Cognitive Science, Vol. 14, pp. 179–211 (1990). An example MLPWIN is depicted in FIG. 5. It has 2 input neurons 55, 1 output neuron 70, and 2 layers 60, 65 of neurons. The first layer has 3 neurons 60 and the second layer has 2 neurons 65. The input and output neurons are regarded as the neurons in layer 0 and layer 3 respectively. Since the neurons in layers 1 and 2 do not interact directly with outside the MLPWIN, they are called hidden neurons and their layers are called hidden layers. All the neurons are of the kind shown in FIG. 2. The input neurons 55, whose activation functions are the identity function, simply distribute the exogenous input, $(\beta_1^0(t), \beta_2^0(t))$, to the neurons in the first layer. The output neuron 70, whose activation functions are also the identity function, are summers, producing outward output, $\eta_1^3(t)$. The activation functions of the neurons in the first and second layers are the hyperbolic tangent, tan hx.

The neurons in each layer are numbered from left to right in FIG. 5. The "numbering of a neuron" refers to this numbering in the neuron's layer. The symbol $w_{ij}^l$ denotes the weight on the delayless connection from neuron j in layer l−1 to neuron i in layer l. For notational simplicity, the bias for neuron i in layer l is denoted by $w_{i0}^l$, which is viewed as the "the weight on the delayless connection leading into neuron i in layer l from neuron 0 in layer l−1, the activation level of neuron 0 being set always equal to 1." The symbol $w_{ij}^{rl}$ denotes the weight on the delay connection from neuron j to neuron i in the same layer l. If i≠j, the two delay connections associated with $w_{ij}^{rl}$ and $w_{ji}^{rl}$ between neuron i and neuron j in layer l are indicated in FIG. 5 by the opposite arrow heads on the same line connecting the neurons. The box 75 enclosing the number 1 between the opposite arrow heads denotes a unit time delay device that the weighted activation levels of neuron i and j go through before they are fedback to neurons j and i respectively. The weight for self-feedback of neuron i in layer l is denoted by $w_{ii}^{rl}$. The self-feedback is also delayed by one time unit by a unit time delay device 80 in the FIG. 5. Layer 1 of the MLPWIN consists of the neurons in layer l and the connections leading into them. The totality of the delay weights, $w_{ij}^{rl}$, in layer l is denoted by $w^{rl}$. The totality of the delayless weights, $w_{ij}^l$, in layer l is denoted by $w^l$.

Figure 6:
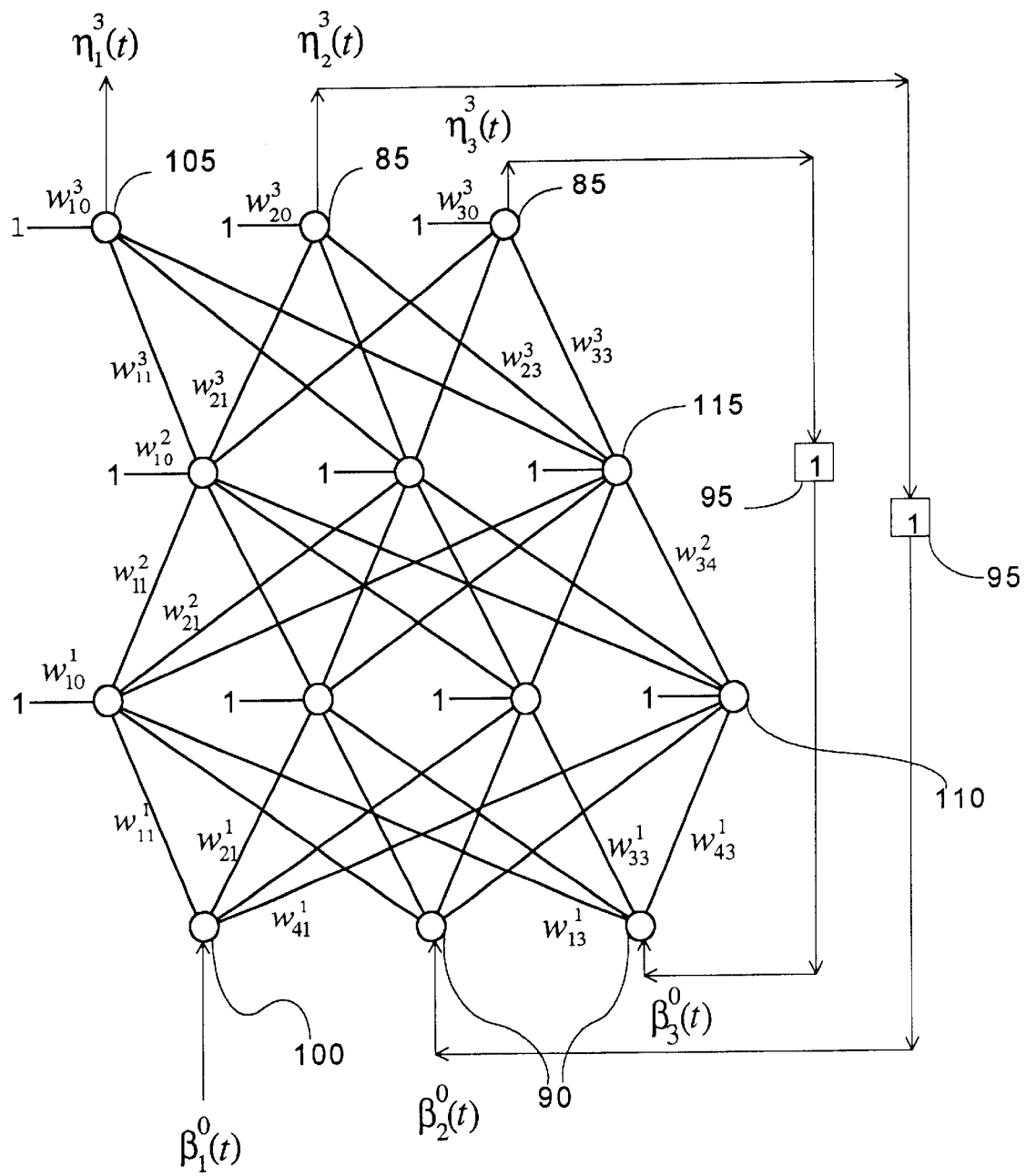
FIG. 6 shows an example multilayer perceptron with output feedbacks (MLPWOF).

Let us now see how the MLPWIN depicted in FIG. 5 processes information at time t. Denoting component i of the input to the MLPWIN at time t by $\beta_i^0(t)$, the activation level $\beta_i^l(t)$ of neuron i in layer l and the weighted sum $\eta_i^l(t)$ in the same neuron at time t satisfy, for l=1,2, $$\beta_i^l(t) = a_i^l(\eta_i^l(t)) \tag{4}$$

$$\eta_i^l(t) = w_{i0}^l + \sum_{j=1}^{n_{l-1}} w_{ij}^l \beta_j^{l-1}(t) + \sum_{j=1}^{n_l} w_{ij}^{rl} \beta_j^l(t-1), \tag{5}$$

where $n_l$ denotes the number of neurons in layer l, $a_i^l(x)$ is the activation function of neuron i in layer l, and $\beta_i^l(t-1)$, for i=1,2, ..., $n_l$ and l=1,2, form the dynamic state of the MLPWIN at time t. The dynamic state at time t=1 or at some other time for the performance of the MLPWIN to start being considered is called the initial dynamic state of the MLPWIN. The output $\eta_1^3(t)$ of the MLPWIN depicted in FIG. 6 is then determined by $$\eta_i^L(t) = w_{i0}^L + \sum_{j=1}^{n_{L-1}} w_{ij}^L \beta_j^{L-1}(t), \tag{6}$$

where L=3, i=1, and $n_{L-1}$=2.

Depending on the application, there can be, in an MLPWIN, any number L of layers, and any number $n_l$ of neurons in each layer l, for l=0, ..., L. Although only the hyperbolic tangent function tan hx and the logistic function $1/(1+e^{-x})$ have been used as the activation functions in the MLPWINs in the literature, other functions such as any wavelet, spline, polynomial, rational, trigonometric and exponential function can also be used as the activation function in accordance with the present invention to make neural systems. Another activation function worth mentioning here is x/(1+|x|), which was recently proposed in D. L. Elliott, "A Better Activation Function for Artificial Neural Networks," ISR Technical Report TR 93-8, Institute for Systems Research, University of Maryland, College Park, Md. (1993). It is noted that all the MLPWINs with one and the same activation function for hidden neurons form one MLPWIN paradigm. It will be appreciated that there may be more than one type of activation function in an MLPWIN paradigm and the activation function of an input neuron does not have to be an identity function. By setting some delayless weights $w_{ij}^l$ and/or delay weights $w_{ij}^{rl}$ equal to zero, differently configured MLPWINs can be obtained. Notice that the equations, (4), (5) and (6), for l=1, ..., L−1, with possibly some minor modifications are valid for the processing of most MLPWINs.

In an MLPWIN, a neuron with a self-feedback delay connection and/or in a cycle within a layer is a cyclic neuron. All such cyclic neurons and those neurons and/or connections that have a path leading to one of these cyclic neurons constitute the recursive section of the MLPWIN. The rest of the neurons and connections of the MLPWIN form the nonrecursive section. If all the output neurons are summers, equation (6) is valid for every output component of the MLPWIN. Hence all the weights, $w_{ij}^L$, in layer L, appear linearly in the MLPWIN's outputs and are thus linear weights of the MLPWIN. If all hidden neurons are nonlinear, every other weight appears in the MLPWIN's outputs through these nonlinear neurons, and hence, the weights, $w_{ij}^L$, constitute the linear section of the MLPWIN.

Figure 7:
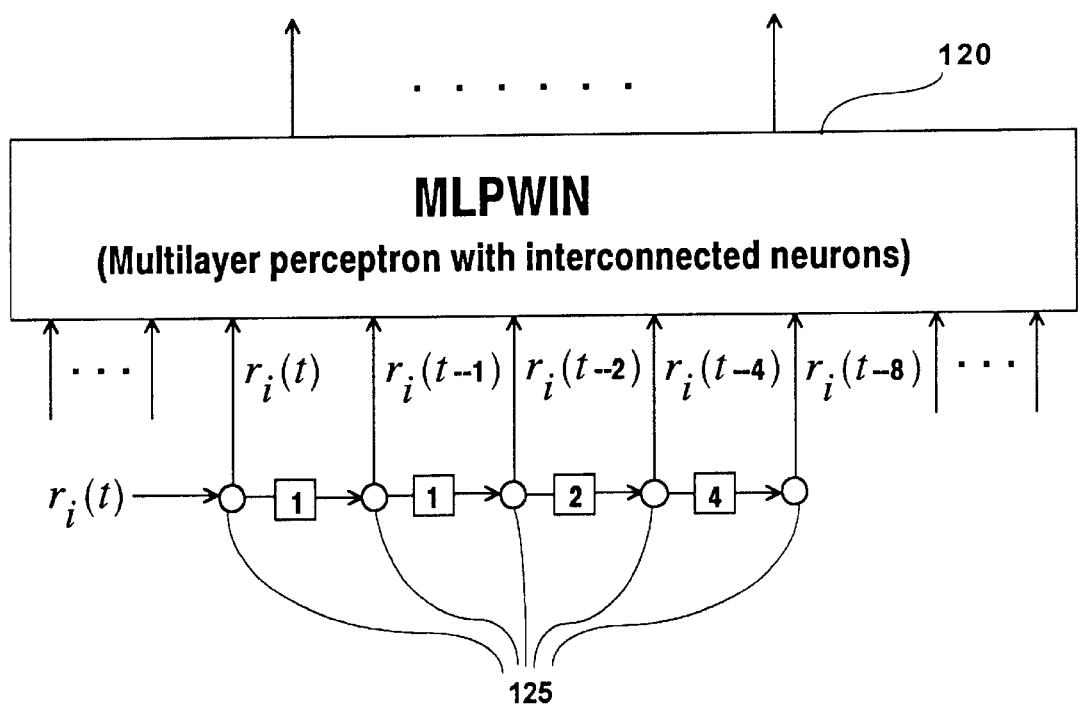
FIG. 7 shows an example multilayer perceptron with interconnected neurons and tapped delay lines (MLPWINTD).

3. Multilayer perceptrons with interconnected neurons and tapped delay lines (MLPWINTDs): An MLPWINTD is a neural network formed with an MLPWIN and tapped delay lines. FIG. 7 shows an MLPWIN 120 with one example tapped delay line consisting of five neurons 125 and four delay connections in an example MLPWINTD. Each of these five neurons has an identity activation function and simply passes (or distributes) its single input to its outputs. Receiving a component $r_i(t)$ of the input process of the MLPWINTD, the example tapped delay line shown in FIG. 7 holds $r_i(t)$, $r_i(t-1)$, $r_i(t-2)$, $r_i(t-4)$, and $r_i(t-8)$ as input components for the MLPWIN 120 at time t.

4. Multilayer perceptrons with output feedbacks (MLPWOFs): An MLPWOF is formed with a multilayer perceptron (MLP) by connecting some or all of its last layer neurons (i.e. the output neurons of the MLP) to some of its zeroth layer neurons (i.e. the input neurons of the MLP). There is a unit time delay device on each such connection. The outputs of an MLPWOF are the processing results of the MLPWOF. They usually enter the training criterion directly and are forced to approach some target (or desired) outputs of the MLPWOF in training.

Those last layer neurons that are connected to some zeroth layer neurons (i.e. the input neurons of the MLP) are called feedback-sending neurons. If a feedback-sending neuron is also an output neuron, it is called an output-feedback-sending neuron. Otherwise, it is called a free-feedback-sending neuron. Similarly, a zeroth layer neuron is called an output-feedback-receiving neuron or a free-feedback-receiving neuron, depending on whether the zeroth layer neuron is connected to an output-feedback-sending or a free-feedback-sending neuron. Those zeroth layer neurons that receive inputs from outside the MLPWOF are called input neurons.

MLPWOFs first appeared in M. I. Jordan, "Attractor Dynamics and Parallelism in a Connectionist Sequential Machine," In *Proceedings of the Eighth Annual Conference of the Cognitive Science Society*, pp. 531–546, Erlbaum (1986). However, in all of the MLPWOFs' applications to system identification/control and signal processing, that can be found in the literature, the feedback-sending neurons of an MLPWOF include all of the output neurons.

Preferred MLPWOFs for making neural systems, in accordance with the teaching of this invention, have only free feedbacks. A typical MLPWOF with only free feedbacks is depicted in FIG. 6. The MLPWOF has 2 free-feedback-sending neurons 85 each connected to a free-feedback-receiving neuron 90 through a unit time delay device 95, which is indicated by a solid square as before. The free feedback-sending neurons 85 shown in FIG. 6 are summers. However, free-feedback-sending neurons may also be neurons (or neurons) of another type or types. There is one input neuron 100 in the MLPWOF, which receives input data from outside the network, and one output neuron 105, which sends output data to outside the network.

The MLPWOF in FIG. 6 has 4 neurons 110 in the first layer of neurons and 3 neurons 115 in the second layer. The internal function of a neuron in layers 1 and 2 is shown in FIG. 7 and explained previously. In short, the weighted sum 108 in the neuron is $w_0 + \sum_{i=1}^{n} w_i I_i$ and the activation level 110 of the neuron is $a(w_0 + \sum_{i=1}^{n} w_i I_i)$, where the activation function $a(x)$ is a sigmoid function such as the hyperbolic tangent function tan hx and the logistic function $1/(1+e^{-x})$.

The 3 neurons 90, 100 and 3 neurons 85, 105 are regarded as neurons in layer 0 and layer 3 respectively. The neurons in layers 1 and 2 are regarded as neurons in their respective layers. Since the neurons in layers 1 and 2 do not interact directly with outside the MLPWOF, they are called hidden neurons or neurons, and their layers are called hidden layers. The 3 neurons in layer 0 simply distribute the feedbacks to the neurons in layer 1. Each of the 3 neurons in layer 3 evaluates the weighted sum of the activation levels of the neurons in layer 2. All neurons in each layer are numbered from left to right. An input neuron here can be viewed as a neuron, that has only a single input and whose activation function is the identity function, $a(x)=x$. An output neuron here can be viewed as a neuron whose activation function is also the identity function. Therefore, the words, "neuron" and "neuron", are interchangeable.

The neurons in each layer are numbered from left to right here. The "numbering of a neuron" refers to this numbering in the neuron's layer. The symbol $w_{ij}^l$ denotes the weight on the delayless connection from neuron j in layer l−1 to neuron i in layer l. Only a few of the $w_{ij}^l$ are shown in FIG. 6 to avoid cluttering the figure. The bias for neuron i in layer l is denoted by $w_{i0}^l$, which is viewed as "the weight on the delayless connection leading into i in layer l from neuron 0 in layer l−1, whose activation level is set always equal to 1."

Let us now see how the MLPWOF depicted in FIG. 6 processes information at time t. Denoting input i at time t by $\beta_i^0(t)$, the activation level $\beta_i^l(t)$ of neuron i in layer l and the weighted sum $\eta_i^l(t)$ in the same neuron at time t satisfy, for l=1,2, $$\beta_i^l(t) = a(\eta_i^l(t)), \tag{7}$$

$$\eta_i^l(t) = w_{i0}^l + \sum_{j=1}^{n_{l-1}} w_{ij}^l \beta_j^{l-1}(t), \tag{8}$$

where $n_{l-1}$ denotes the number of neurons in layer l−1 and $a(x)$ is the activation function. The output $\eta_i^3(t)$ at output terminal i is then determined by $$\eta_i^3(t) = w_{i0}^3 + \sum_{j=1}^{3} w_{ij}^3 \beta_j^2(t). \tag{9}$$

The feedbacks, $\eta_2^3(t)$ and $\eta_3^3(t)$, are fedback to the feedback-receiving terminals 90 after a unit time delay. Therefore the feedbacks at these terminal, $\beta_2^0(t)$ and $\beta_3^0(t)$, are equal to $\eta_2^3(t-1)$ and $\eta_3^3(t-1)$ respectively. The activation levels, $\eta_2^3(0)$ and $\eta_3^3(0)$, of the feedback-sending neurons 85 at time t=0 form the initial dynamic state of the MLPWOF.

Depending on the application, there can be, in an MLPWOF, any number of input neurons, output neurons, free feedbacks, output feedbacks, and layers, and any number of neurons in each hidden layer. Although only the hyperbolic tangent function tan hx and the logistic function $1/(1+e^{-x})$ have been used as the activation function in the MLPWOFs in the literature, other functions such as any wavelet, spline, polynomial, rational, trigonometric and exponential function can also be used as the activation function, in accordance with the present invention, to make the neural systems. It is noted that all the MLPWOFs with one and the same activation function for hidden neurons form one MLPWOF paradigm. It will be appreciated that there may be more than one type of activation function in an MLPWOF paradigm and the activation function of an input neuron does not have to be an identity function.

Figure 8:
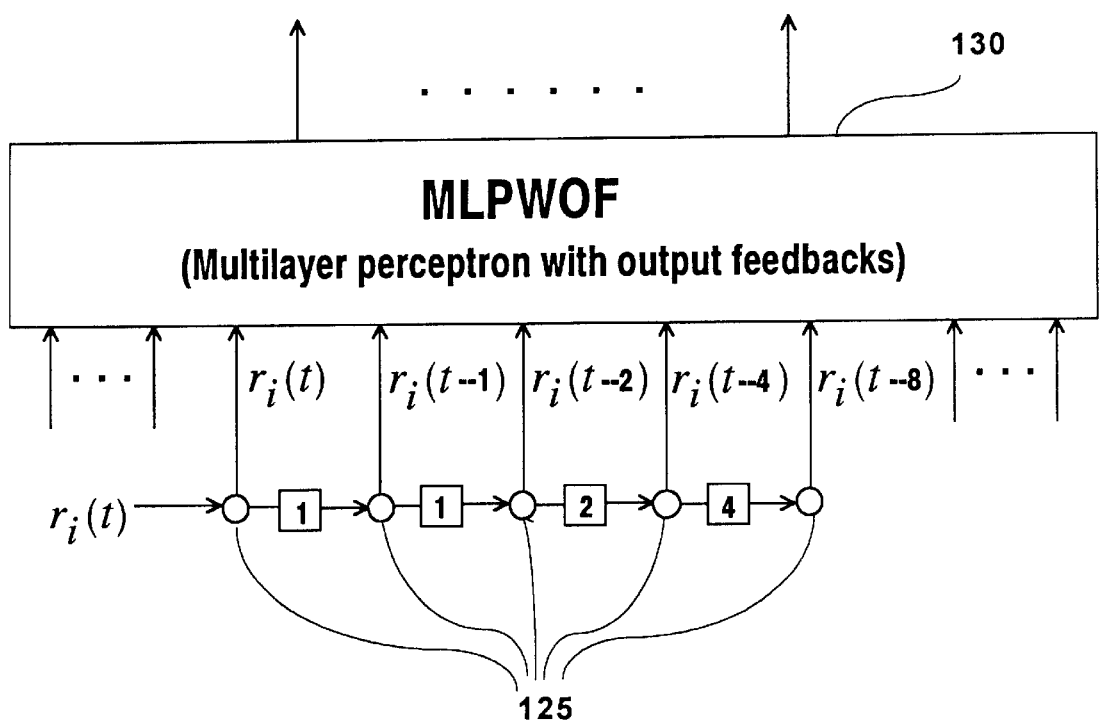
FIG. 8 shows an example multilayer perceptron with output feedbacks and tapped delay lines (MLPWOFTD).

5. Multilayer perceptrons with output feedbacks and tapped delay lines (MLPWOFTDs): An MLPWOFTD is a neural network formed with an MLPWOF and tapped delay lines. FIG. 8 shows an MLPWOF 130 with one example tapped delay line consisting of five neurons 125 and four delay connections in an example MLPWOFTD. Each of these five neurons has an identity activation function and simply passes (or distributes) its single input to its outputs. Receiving a component $r_i(t)$ of the input process of the MLPWOFTD, the example tapped delay line shown in FIG. 8 holds $r_i(t)$, $r_i(t-1)$, $r_i(t-2)$, $r_i(t-4)$, and $r_i(t-8)$ as input components for the MLPWOF 130 at time t. An MLPWOFTD may also have tapped delay lines for holding delayed components of the MLPWOF's output process as input components for the same MLPWOF in the MLPWOFTD.

Figure 9:
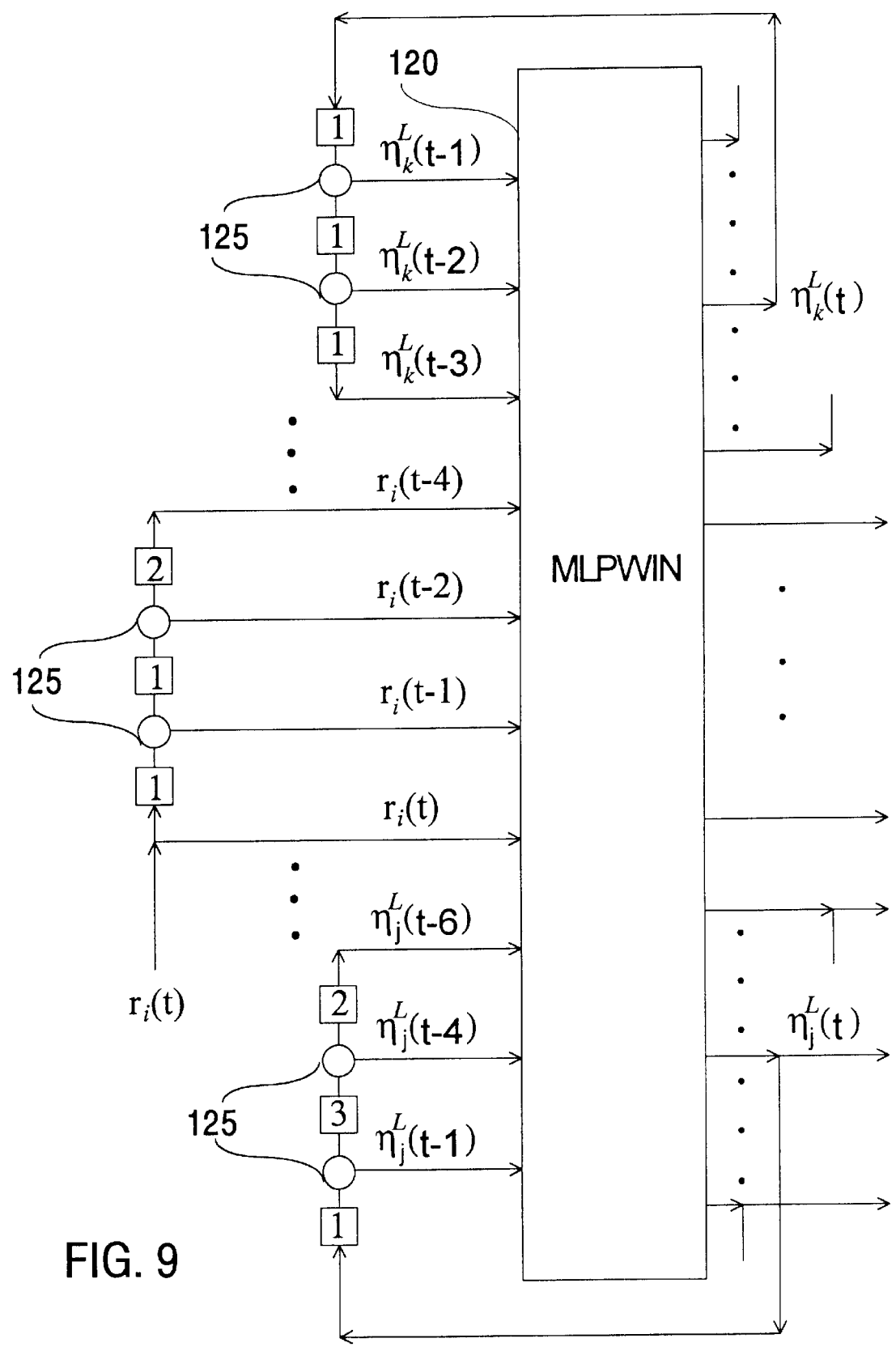
FIG. 9 shows an example multilayer perceptron with interconnected neurons, output feedbacks and tapped delay lines (MLPWINOFTD).

6. Multilayer perceptrons with interconnected neurons, output feedbacks and tapped delay lines (MLPWINOFTDs): An MLPWINOFTD is a neural network formed with an MLPWINTD and tapped delay lines for holding its delayed outputs. An MLPWINOFTD can be viewed as a generalization of an MLPWINTD and an MLPWOFTD. FIG. 9 shows an example MLPWINOFTD with three example tapped delay lines. One example tapped delay line shown in FIG. 9 holds $r_i(t)$, $r_i(t-1)$, $r_i(t-2)$ and $r_i(t-4)$ as input components for the MLPWIN 120 at time t. Another example tapped delay line receives a free feedback $\eta_k^L(t)$ and holds $\eta_k^L(t-1)$, $\eta_k^L(t-2)$ and $\eta_k^L(t-3)$ as input components for the MLPWIN 130 at time t. The third example tapped delay line receives an output feedback $\eta_j^L(t)$ and holds $\eta_j^L(t-1)$, $\eta_j^L(t-4)$ and $\eta_j^L(t-6)$ as input components for the MLPWIN 120 at time t. An MLPWINOFTD can be viewed as a combination of an MLPWINTD and an MLPWOFTD.

7. Radial basis function networks (RBFNs): Radial basis function networks (RBFNs) were first proposed to approximate probability density functions in the 1960s. Only Gaussian activation functions were used then, but numerous other activation functions have been used in a large number of research papers ever since. Nevertheless, all the RBFNs in the literature are neural networks without delay connections and with a single layer of hidden neurons (or processing units).

A typical neuron of an RBFN is depicted in FIG. 1. It is a composition of a basis function 5 and an activation function 15, which are denoted by b and a respectively. If the inputs to the neuron are $I_1, I_2, \ldots, I_n$ as shown in FIG. 1, the basis function 5 with parameters $w_1, w_2, \ldots, w_n$, is usually the Euclidean distance between the vectors $(I_1, I_2, \ldots I_n)$ and $(w_1, w_2, \ldots, w_n)$, i.e.

$$b(I_1, I_2, \ldots, I_n, w_1, w_2, \ldots, w_n) = \sqrt{\sum_{i=1}^{n} (I_i - w_i)^2},$$

whose value appears at 10. The activation function 15 can be any one of many functions such as the Gaussian function, $$a(x, w_0) = \exp(-x^2/w_0^2),$$

the thin-plate-spline function, $$a(x, w_0) = x^2 \log x,$$

the multiquadric function, $$a(x, w_0) = (x^2 + w_0^2)^{1/2},$$

and the inverse multiquadric function, $$a(x, w_0) = (x^2 + w_0^2)^{-1/2},$$

where $w_0$ is another parameter of the neuron. The activation level of the neuron is its output at 20.

If we replace the MLP neurons with the RBFN neurons in the hidden layers of an MLP (e.g. FIG. 4), we obtain an RBFN. Thus the NNs in FIG. 4 can be viewed as an example RBFN. Here we note that $w_{ij}^l$ denotes a parameter of the i-th neuron in the l-th layer and that the weights on the connections are set equal to one.

Let us now see how the RBFN depicted in FIG. 4 processes information at time t. Denoting component i of the exogenous input at time t by $\beta_i^0(t)$, the activation level $\beta_i^l(t)$ of neuron i in layer l and the basis function output $\eta_{il}(t)$ in the same neuron at time t satisfy, for l=1,2, $$\beta_i^l(t) = a(\eta_i^l(t), w_{i0}^l) = \exp\left[-(\eta_i^l(t))^2 / (w_{i0}^l)^2\right], \quad (10)$$

$$\eta_i^l(t) = \left[\sum_{j=1}^{n_{l-1}} (\beta_j^{l-1}(t) - w_{ij}^l)^2\right]^{1/2}, \quad (11)$$

where $n_{l-1}$ denotes the number of neurons in layer l–1. The output $\eta_i^3(t)$ at output neuron i is then determined by $$\eta_i^L(t) = w_{i0}^L + \sum_{j=1}^{n_{L-1}} w_{ij}^L \beta_j^{L-1}(t), \quad (12)$$

where L=3, $n_{L-1}$=3, and i=1,2,3.

Depending on the application, there can be, in an RBFN, any number L of layers, any number $n_0$ of input neurons, any number $n_L$ of output neurons, and any number $n_l$ of neurons in each hidden layer l. It is noted that all the RBFNs with one and the same activation function for hidden neurons form one RBFN paradigm. It will be appreciated that there may be more than one type of activation function in an RBFN paradigm and the activation function of an input neuron does not have to be an identity function. By setting some delayless weights $w_{ij}$ equal to zero, differently configured RBFNs, which are not fully connected, can be obtained. Notice that the equations, (10), (11) and (12), for l=1, ..., L–1, possibly with some minor modifications are valid for the processing of most RBFNs.

Since there are no delay connections in an RBFN, it does not have a recursive section and is thus a nonrecursive NN. If all the output neurons are summers, equation (12) is valid for every output component of an RBFN. Hence all the weights, $w_{ij}^L$, in layer L, appear linearly in the RBFN's outputs and are thus linear weights of the RBFN. Since every other weight appears in the RBFN's outputs through nonlinear activation functions, the weights, $w_{ij}^L$, constitute the linear section of the RBFN.

8. Radial basis function networks with interconnected neurons (RBFNWINs): If we replace the MLPWIN neurons with the RBFN neurons in the hidden layers of an MLPWIN (e.g. FIG. 5) we obtain an RBFNWIN. Let us now see how the example RBFNWIN shown in FIG. 5 processes information at time t. Here we assume that the basis function is the Euclidean distance and the activation function is the Gaussian function. Denoting component i of the input to the RBFNWIN at time t by $\beta_i^0(t)$, the activation level $\beta_i^l(t)$ of neuron i in layer l and the basis function output $\eta_i^l(t)$ in the same neuron at time t satisfy, for l=1,2, $$\beta_i^l(t) = a(\eta_i^l(t), w_{i0}^l) = \exp\left[-(\eta_i^l(t))^2 / (w_{i0}^l)^2\right] \quad (13)$$

-continued $$\eta_i^l(t) = \left[\sum_{j=1}^{n_{l-1}} (\beta_j^{l-1}(t) - w_{ij}^l)^2 + \sum_{j=1}^{n_l} (\beta_j^l(t-1) - w_{ij}^{rl})^2\right]^{1/2}, \quad (14)$$

where $n_l$ denotes the number of neurons in layer l, and $\beta_i^l(t-1)$, for $i=1, \ldots, n_l$ and $l=1,2$, form the dynamic state of the example RBFNWIF at time t. The output $\eta_1^3(t)$ of the example RBFNWN in FIG. 5 is then determined by $$\eta_i^L(t) = w_{i0}^L + \sum_{j=1}^L w_{ij}^L \beta_j^{L-1}(t). \quad (15)$$

Depending on the application, there can be, in an RBFNWIN, any number L of layers, and any number $n_l$ of neurons in each layer l, for $l=0, \ldots, L$. It is noted that all the RBFNWINs with one and the same activation function for hidden neurons form one RBFNWIN paradigm. It will be appreciated that there may be more than one type of activation function in an RBFNWIN paradigm and the activation function of an input neuron does not have to be an identity function. By setting some delayless weights $w_{ij}^l$ and/or delay weights $w_{ij}^{rl}$ equal to zero, differently configured RBFNWINs can be obtained. Notice that the equations, (13), (14) and (15), for $l=1, \ldots, L-1$, with possibly some minor modifications are valid for the processing of most RBFNWINs.

In an RBFNWIN, a neuron with a self-feedback delay connection and/or in a cycle within a layer is a cyclic neuron. All such cyclic neurons and those neurons and/or connections that have a path leading to one of these cyclic neurons constitute the recursive section of the RBFNWIN. The rest of the neurons and connections of the RBFNWIN form the nonrecursive section. If all the output neurons are summers, equation (6) is valid for every output component of the RBFNWIN. Hence all the weights, $w_{ij}^L$, in layer L, appear linearly in the RBFNWIN's outputs and are thus linear weights of the RBFNWIN. Since every other weight appears in the RBFNWIN's outputs through nonlinear activation functions, the weights, $w_{ij}^L$, constitute the linear section of the RBFNWIN.

Adaptive Recursive Neural Networks with Fixed Weights

If the information that has been input online to a neural network is insufficient to completely specify an environmental parameter characterizing the neural network's operating environment over its entire operating time period(s), before the same period(s), or if the environmental parameter changes from time to time, the operating environment is called an uncertain operating environment. This information about the operating environment may be in the form of a mathematical (e.g. statistical) model with completely or partially specified functional forms, some simulation data, or some true data, or a combination thereof. The insufficiency of information may be unknown parameters that are quantifiable mathematical, statistical and/or physical variables (e.g. temperature, air flow velocity, humidity, sensor calibration parameters, and/or stochastic process statistics) with unknown values, or may only be viewed or conceived as an unknown number of parameters (e.g. aging, changing, and/or manufacturing variability of mechanical components), which are not easy to quantify, or may be a combination thereof. All these parameters, quantifiable or not, are called environmental parameters. An environmental parameter over time, to be called the environmental parameter function, may be treated as an unknown deterministic function (e.g. constant) or a stochastic process (e.g. random variable) with known or unknown statistics, which may be time-invariant or time-variant. In the rest of this description, the vector of all the environmental parameters of the operating environment of an NN (neural network), that are to be adapted to by the NN are called the (vector-valued) environmental parameter for the NN and denoted by θ.

Environmental parameters can be treated by adaptive, robust, and robust adaptive NNs as discussed in the papers by the first-named inventor, James T. Lo, "Robust adaptive identification of dynamic systems by neural networks," *Proceedings of the* 1997 *International Conference on Neural Networks,* Vol. 2, pp. 1121–1126, Houston, Tex. (1997), and "Robust adaptive neurofilters with or without online weight adjustment," *Proceedings of the* 1997 *International Conference on Neural Networks,* Vol. 2, pp. 2245–2250, Houston, Tex. (1997), and U.S. patent application Ser. No. 08/935, 839. In this description of the present invention, only adaptive processing is considered for simplicity and clarity of the description. It is easy for a person skilled in the art to extend this description to robust adaptive processing by the use of risk-sensitive criteria.

Assume that sufficient information is accumulated online by the sensors available about an environmental parameter θ for adapting to it beneficially, and that a training data set, that contains enough data for each of a set Θ of typical values of an environmental parameter θ, is given. Then a recursive neural network, that is synthesized from the training data set, has ability to adapt to the environmental parameter θ, even if all the weights of the recursive NN are fixed online during the operation of the recursive NN. (If an environmental parameter is not even quantified, its "typical values" may only be the numberings of its typical settings or conditions.) This adaptive ability of a recursive NN with all its weights held fixed online is implied by the main theorem proven by the first-named inventor, James T. Lo, in "Synthetic approach to optimal filtering," *Proceedings of the* 1992 *International Simulation Technology and* 1992 *Workshop on Neural Networks,* pp. 475–481, Clear Lake, Tex., November 1992. This ability was discussed by the first-named inventor, James T. Lo, in the final technical report, *Neural Network Approach to Optimal Filtering,* submitted to the Rome Laboratory, U.S.A.F., on May 27, 1994, and mentioned in L. A. Feldkamp and G. V. Puskorius, "Training of robust neural controller," in *Proceedings of the* 33rd *Conference on Decision and Control,* pp. 2754–2759, Lake Buena Vista, Fla., 1994. The foregoing discussion in the final technical report was included by James T. Lo and Lei Yu in their paper, "Adaptive neural filtering by using the innovations process," in *Proceedings of the* 1995 *World Congress on Neural Networks,* Vol. II, pp. 29–35, Washington, D.C., 1995. This adaptive capability of a recursive neural network with fixed weights is exploited in the AVC systems in accordance with the present invention for active control of acoustic and structural vibrations with an uncertain vibration statistic or propagation path.

Terminologies for Active Vibration Control

Throughout this invention disclosure including the claims, a vibration is an acoustic or structural vibration. An acoustic vibration is gas-, liquid- or solid-borne. A structural vibration is also known as a mechanical vibration. A primary vibration is an unwanted or undesirable acoustic or structural vibration that is to be attenuated or cancelled at least in part by an AVC (active vibration control) system. A primary vibration is also called an unwanted vibration. A source of a primary vibration is called a primary source. A cancelling vibration is an acoustic or structural vibration generated by an AVC system to attenuate or cancel at least one primary vibration. A cancelling vibration is also called a secondary vibration. A source of a cancelling vibration is called a secondary source. Examples of a secondary source are a loudspeaker, an underwater sound projector, a hydraulic actuator, a pneumatic actuator, a proof mass actuator, an electrodynamic/electromagnetic actuator, a magnetostrictive actuator, a shape memory alloy actuator, and a piezoelectric actuator. When an AVC system is in operation, the combination (e.g. superposition) of all primary and cancelling vibrations involved is called the residual vibration. If the objective of the AVC system is to reduce the residual vibration in a region, the region is called an objective region. In or near the objective region, one or more points are usually selected such that reduction of the residual vibration at such point(s) helps achieve the objective of reducing the residual vibration in the objective region. A point so selected is called an objective point.

A reference sensor is a sensor that is not placed at an objective point and is intended to take measurements containing information about at least one primary vibration. A reference sensor is either a (acoustic or structural) vibrational sensor or a nonvibrational sensor. An error sensor is a sensor that is placed at an objective point and is intended to take measurements of the residual vibration at the objective point. An error sensor is usually a (acoustic or structural) vibrational sensor.

Some examples of a vibrational sensor are a microphone, a hydrophone, an accelerometer, a velocity transducer, a displacement transducer, and a strain sensor. Some examples of a nonvibrational sensor are a magnetic or optical pickup sensing the rotation of a toothed wheel, an ammeter for measuring the electric current drawn by a electric fan or motor or the electric current generated by a power generator, an optical sensor for sensing the road surface condition for an automobile, a sensor for picking up the position of the throttle valve, a gauge for measuring the intake manifold vacuum and mass air flow in an internal combustion engine.

A device that converts a signal in one form into a signal in another form more suitable for subsequent processing is called a signal conditioner. For example, a typical signal conditioner for converting the output of a microphone into a digital signal suitable for being input to a digital signal processor comprises a preamplifier, an anti-aliasing filter, and an A/D converter.

Depending on whether a sensor is a reference sensor or an error sensor, the digital signal resulting from passing the output of the sensor through a signal conditioner is called a reference signal or an error signal respectively. Typical reference sensor means comprises at least one reference sensor and at least one signal conditioner. Typical error sensor means comprises at least one error sensor and at least one signal conditioner.

A controller is a digital signal processor such as an adaptive linear filter or a neural network that inputs at least one reference signal or/and at least one error signal, and outputs at least one digital signal, each of which is called a control signal. The weights. of an adaptive linear filter used as a controller are adjusted online usually by an LMS, an RLS, a filtered-x LMS, or a filtered-u recursive LMS algorithm to reduce at least one error signal. The weights of a neural network used as a controller may be determined in an offline training and held fixed online, or may be adjusted in an online training. The goal of determining or adjusting the weights of a controller is reduction of the residual vibrations at at least one objective point.

Each control signal is converted by a signal conditioner, usually comprising a D/A converter; a lowpass filter; and a power amplifier, into an analog signal for driving at least one secondary source. Typical secondary source means comprises at least one secondary source and at least one signal conditioner, each usually comprising a D/A converter, a low-pass filter, and a power amplifier.

Figure 10:
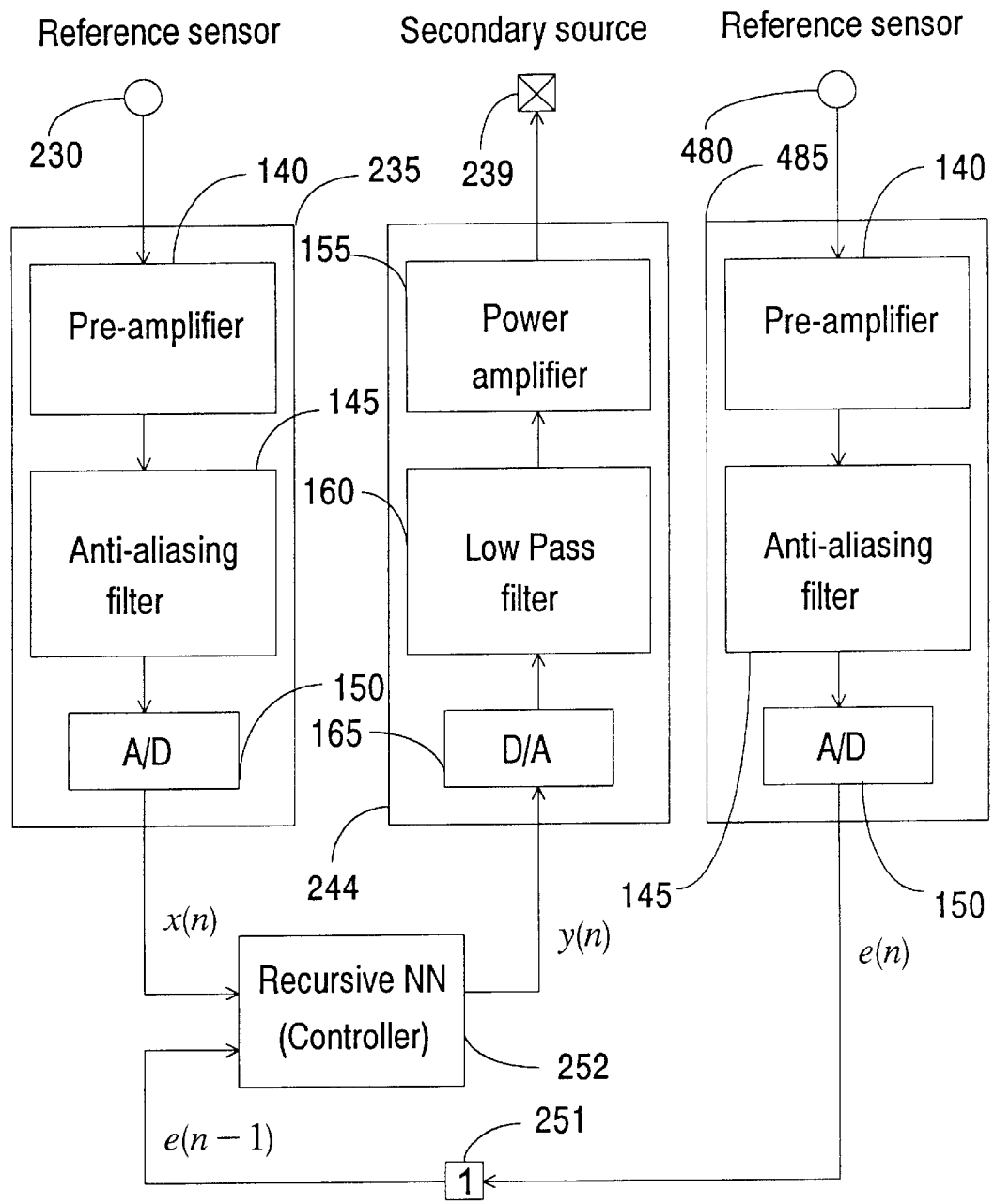
FIG. 10 is a block diagram for an example AVC system in accordance with this invention for illustrating the terminologies.

To illustrate the above-defined terminologies, FIG. 10 shows a block diagram of an example AVC system in accordance with this invention, which has reference sensor means, error sensor means, secondary source means, and a controller. The reference sensor means comprises a reference sensor (e.g. microphone or accelerometer) 230 and a signal conditioner 235 comprising a pre-amplifier 140, an anti-aliasing filter 145, and an A/D converter 150. The error sensor means comprises an error sensor (e.g. microphone or accelerometer) 480 and a signal conditioner 485 also comprising a preamplifier 140, an anti-aliasing filter 145, and an A/D converter 150. The secondary source means comprises a secondary actuator (e.g. loudspeaker or electromagnetic shaker) 239 and a signal conditioner 244 comprising a D/A converter 165, a low-pass filter 160, and a power amplifier 155. The controller 252 processes the reference signal x(n) from the reference sensor 230 and the delayed error signal e(n−1) from the error sensor 480 to generate a control signal y(n) for driving the secondary source 239. The block 251 represents a unit-time delay device.

A primary path is the total path from an output (or an output terminal) of reference sensor means to an output (or an output terminal) of error sensor means, including all the reflective and refractive propagation paths. A secondary path is the total path from an output (or an output terminal) of the controller to a output (or an output terminal) of the error sensor means for an objective point, including all the reflective and refractive propagation paths, if there is an error sensor in the AVC system at the objective point. If there is no error sensor at the objective point in the AVC system, a secondary path is the total path from an output (or an output terminal) of the controller to an objective point or to an output (or an output terminal) of some experimental error sensor means used only during training data collection and controller training, depending on the context. A secondary path always includes all the reflective and refractive propagation paths. If there is a secondary vibration feedback from a secondary source to a reference sensor, a feedback path is the total path from an output of the controller through the secondary source to the output of the reference sensor, including all the reflective and refractive propagation paths. The input/output relationship in the system-theoretic sense of a total path is also referred to as a path. A model of a path is a linear system (or filter) or a neural network modeling the input/output relationship of the path. A joint model of the primary and secondary paths is a linear system (or filter) or a neural network modeling the joint input/output relationship of the paths.

Offline and online methods of modeling linear secondary, feedback, primary and overall paths by linear systems (or filters) are available in the open literature (e.g. S. M. Kuo and D. R. Morgan, *Active Noise Control Systems—Algorithms and DSP Implementations,* John Wiley & Sons, Inc., 1996). In fact, modeling a path, secondary; feedback; primary; or overall, is called system identification. There are a large number of books and articles (e.g. L. Ljung, System Identification: *Theory for the User,* Prentice-Hall, Englewood Cliffs, N.J., 1987; and P. G. Stoica and T. Soderstrom, *System Identification,* Prentice-Hall, Englewood Cliffs, N.J., 1988) on offline as well as online identification of linear systems. Methods of identifying nonlinear systems by neural networks can also be found in the open literature (e.g. K. S.

Narendra and K. Parthasarathy, "Identification and control of dynamic systems using neural networks," *IEEE Transactions on Neural Networks,* Vol. 1, No. 1, pp. 4–27, 1990, and by Puskorius and L. A. Feldcamp, "Neurocontrol of nonlinear dynamical systems with Kalman filter trained recurrent networks," *IEEE Transactions on Neural Networks,* Vol. 5, No. 2, pp. 279–297, 1994).

The operating environment of an AVC system consists of the primary vibration(s), primary path(s), secondary path(s), and feedback path(s) that are involved in the operation of the AVC system. The operating environment of an AVC system is also the operating environment of the controller of the AVC system. If the information available to the controller of an AVC system online is insufficient to completely specify the statistics of the primary vibration(s) or the models of the primary vibration(s), primary path(s), secondary path(s) and feedback path(s) that are involved in the operation of the AVC system over its entire operating vtime period(s), before the same period(s), or if these statistics and models change from time to time, the operating environment of the AVC system is called an uncertain operating environment.

The primary vibration statistics and the models of the primary path(s), feedback path(s) and secondary path(s), that are involved in the operation of an AVC system, are usually affected by many quantifiable factors such as temperature, air flow velocity, humidity, and sensor calibration parameters; and many not-so-easily quantifiable factors such as aging, changing, and/or manufacturing variability of mechanical components. A collection of all the factors that determine these statistics and models is called an environmental parameter of an AVC system, which may thus contain more than one component.

If this collection is difficult to identify for an AVC system, the environmental parameter is symbolically denoted by $\theta$. A "value" of the environmental parameter $\theta$ is often thought of as an operating condition of the AVC system. For instance, for an AVC system for controlling the exhaust noise of an internal combustion engine, an operating condition is defined by the engine RPM (rotations per minute), the engine loading, the surrounding air temperature, the engine mechanical conditions, etc.

If typical conditions of the operating environment for an AVC system are relatively easy to identify. These typical conditions, symbolically denoted by $\theta_1, \theta_2, \ldots, \theta_N$, can be used in collecting training data for training a controller or modeling various (propagation) paths for an AVC system. These typical conditions are viewed as typical values of the environmental parameter $\theta$. The set of all these typical values or conditions is denoted by $\Theta$.

Of course, if an environmental parameter (with perhaps more than one component) is identified, its typical values and/or settings can be used inr collecting training data for training a controller or modeling various propagation paths for an AVC system.

In the following, three types of AVC system in accordance with this invention and their design procedures are described. These three types are called AVC feedforward systems without online controller adjustment and path modeling, AVC uncertain systems without online controller adjustment and path modeling, and AVC feedback systems without online controller adjustment and path modeling. In the following descriptions, the data for determining the path model(s) and training a neural network into a controller for an AVC system in accordance with this invention are obtained by actual experiments. However, it is understood that computer simulation data can be used instead in part or in whole, if a good mathematical model to describe part or all of the AVC system's operating environment is available.

AVC Feedforward Systems without Online Controller Adjustment and Path Modeling

If the models of the primary, secondary and/or feedback paths in the operating environment of a prior-art AVC (active vibration control) feedforward system are uncertain, then the weights (or parameters) of the controller in the prior-art AVC feedforward system are adjusted to adapt to the operating environmental, and hence at least one error sensor is required to facilitate the adjustment. However, including an error sensor in an AVC feedforward system adds to its manufacturing and maintainence costs and, in some applications, degrades the AVC performance if a third vibration (in addition to the primary and secondary vibrations) that is correlated with the primary vibration is also picked up by the error sensor. Furthermore, in some applications, it is difficult or impossible to have an error sensor placed at a desired location during the operation of an AVC feedforward system.

The present invention exploits the adaptive capability of a recursive neural network with fixed weights, which was recently discovered and is discussed: earlier on in this invention disclosure, to do away with error sensors, online controller weight adjustment and online secondary path modeling, if one or more reference signals accumulate sufficient information in finite time about the changes of the primary vibration statisics, the primary, feedback and/or secondary paths for achieving the AVC objective. Thus, an AVC feedforward system in accordance with the present invention, for attenuating at least one primary vibration by injecting at least one cancelling vibration, comprises reference sensor means, comprising at least one reference sensor; a recursive neural network, comprising a plurality of weights; and secondary source means, comprising at least one secondary source. The reference sensor means derives at least one reference signal containing information about the at least one primary vibration. The recursive NN (neural network) processes at least the at least one reference signal to generate at least one control signal, which is converted by the secondary source means into the at least one cancelling signal. The weights of the recursive NN are held fixed online during the operation of said AVC system.

This AVC system is called an AVC feedforward systems without online controller adjustment and path modeling. Note that this AVC feedforward system does not have such shortcomings of the prior-art AVC systems as use of an error sensor, relatively slow weight/waveform adjustment, frequent adjustment of a model of a secondary path, use of a high-order adaptive linear transversal filter, instability of an adaptive linear recursive filter, failure to use a useful non-vibrational reference sensor, failure to deal with the nonlinear behavior of a primary or secondary path, weight adjustment using control predicted values, use of an identification neural network, and adjustment of all weights of a neural network, which are discussed in the section on the background of the present invention.

Figure 11:
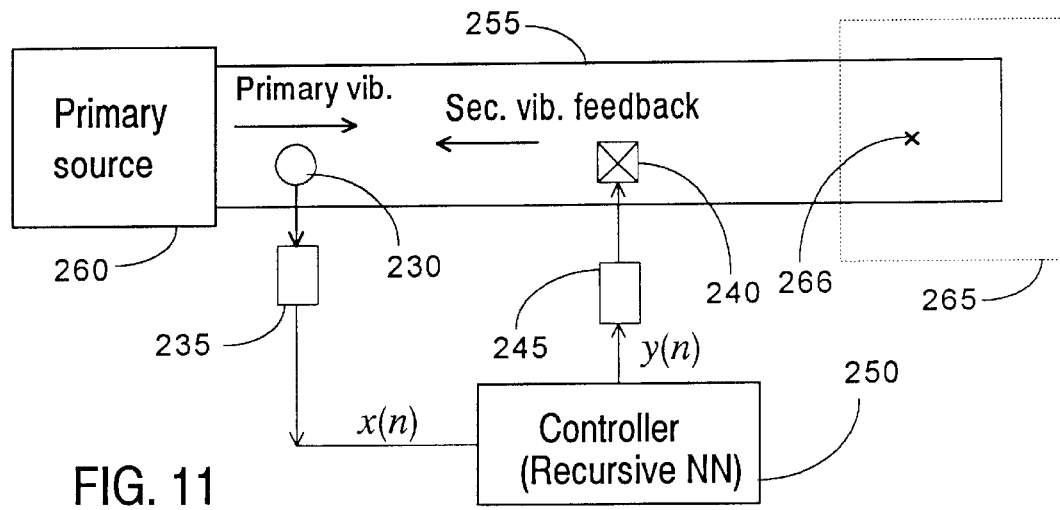
FIG. 11 is a schematic diagram of a first example AVC feedforward system without online controller adjustment and path modeling.

Descriptions of three examples of such an AVC feedforward system follow:

1. FIG. 11 shows an AVC feedforward system with one vibrational reference sensor 230 (e.g. a microphone, a hydrophone, an accelerometer, a velocity transducer, a displacement transducer, or a strain sensor), one secondary source 240 (e.g. a loudspeaker, an underwater sound projector, a hydraulic actuator, a pneumatic actuator, a proof mass actuator, an electrodynamic/electromagnetic actuator, a magnetostrictive actuator, a shape memory alloy actuator, or a piezoelectric actuator) and a controller 250 (i.e. a recursive NN). A rectangular block 255 is shown here to represent an acoustic or structural vibration channel or medium (e.g. a gas-filled or liquid-filled duct or space, a beam, a flexible structure or a mechanical system). It is assumed that the reference signal x(n) from the reference sensor 230 contains sufficient information about the changes that the primary, feedback and secondary paths undergo for the recursive NN 250 to properly drive the secondary source to attenuate the primary vibration in the objective region 265. Here the secondary path is the path from the output (or the output terminal) of the controller to an objective point 266. The primary source 260 may be an electric fan with frequently changing rotational speed, an air conditioner or heater, an internal combustion engine, a vibrating structure, an electric motor, or any other vibration source. The block 235 represents a signal conditioner (e.g. a signal conditioner comprising a preamplifier, an anti-aliasing filter, and an A/D converter). This block 235 and the reference sensor 230 are the main components of the reference sensor means of the AVC feedforward system. The block 245 represents a signal conditioner (e.g. a signal conditioner comprising an D/A converter, a low-pass filter and a power amplifier). This signal conditioner 245 and the secondary source 240 are the main components of the secondary source means of the AVC feedforward system.

During the operation of the AVC feedforward system, the primary vibration and a feedback of the secondary vibration from the secondary source are sensed by the reference sensor means, which outputs a reference signal x(n). This reference signal is a discrete-time digital signal. The recursive neural network 250 processes x(n) and generates a discrete-time digital control signal y(n). This control signal is then converted into the secondary vibration by the secondary source means.

Figure 12:
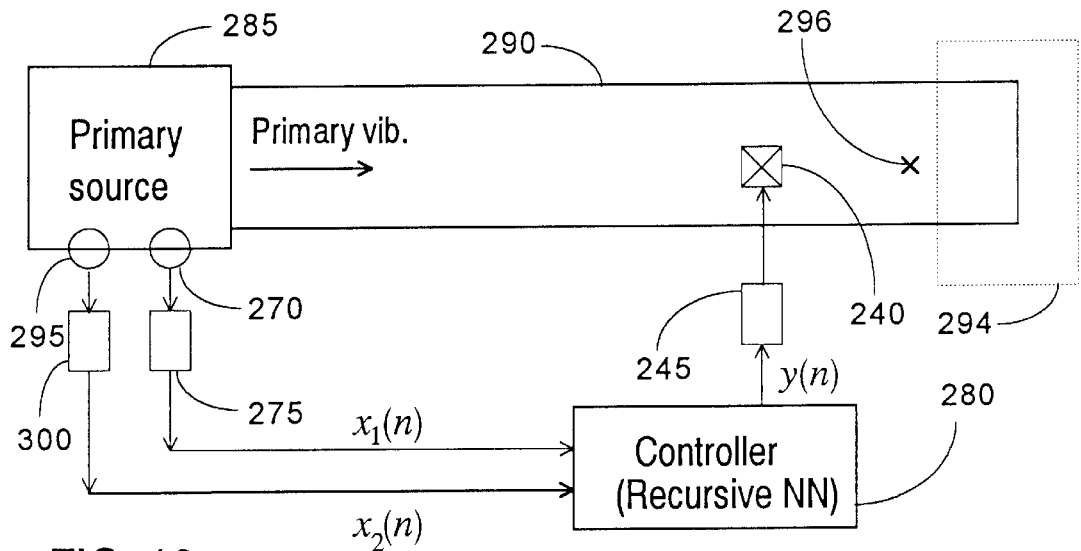
FIG. 12 is a schematic diagram of a second example AVC feedforward system without online controller adjustment and path modeling.

2. FIG. 12 shows an AVC feedforward system with two nonvibrational reference sensors 270 and 295 (e.g. two sensors selected from the group of a tachometer sensing the tooth passage rate of a wheel geared to the crankshaft or a position sensor indicating the position of the air intake throttle valve, an ammeter for measuring the electric current drawn by a electric motor or the electric current generated by a power generator, an optical sensor for sensing the road surface condition for an automobile, a sensor for picking up the position of the throttle valve, and a gauge for measuring the intake manifold vacuum and mass air flow in an internal combustion engine), one secondary source 240 (e.g. a loudspeaker, an underwater sound projector, a hydraulic actuator, a pneumatic actuator, a proof mass actuator, an electrodynamic/electromagnetic actuator, a magnetostrictive actuator, a shape memory alloy actuator, or a piezoelectric actuator) and a controller 280 (i.e. a recursive neural network) for a vibration channel or medium 290 (e.g. a gas-filled or liquid-filled pipe or space, a beam, a flexible structure or a mechanical system) with a primary source 285 (e.g. an internal combustion engine, an electric fan with frequently changing rotational speed, an air conditioner or heater, a vibrating structure, a vibrating mechnical system, or an electric motor). The blocks, 275 and 300, represent signal conditioners converting the reference sensor outputs (e.g. tachometer and position sensor readings) respectively into the reference signals, $x_1(n)$ and $x_2(n)$, which are discrete-time digital signals. These signal conditioners 275, 300 and the reference sensors 270, 295 are the main components of the reference sensor means of the AVC feedforward system. It is assumed that these reference signals contain sufficient information about the changes that the operating environment including the secondary paths undergoes for the recursive NN 280 to properly drive the secondary source to attenuate the primary vibration in the objective region 294. Here the secondary path is the path from the output (or the output terminal) of the controller to an objective point 26. The block 245 represents another signal conditioner (e.g. a signal conditioner comprising an D/A converter, a low-pass filter and a power amplifier). This signal conditioner 245 and the secondary source are the main components of the secondary source means of the AVC feedforward system.

During the operation of the AVC feedforward system, the recursive neural network 280 processes the reference signals, $x_1(n)$ and $x_2(n)$, and generates a discrete-time digital control signal y(n). The control signal y(n) is then converted into a secondary vibration by the secondary source means.

Figure 13:
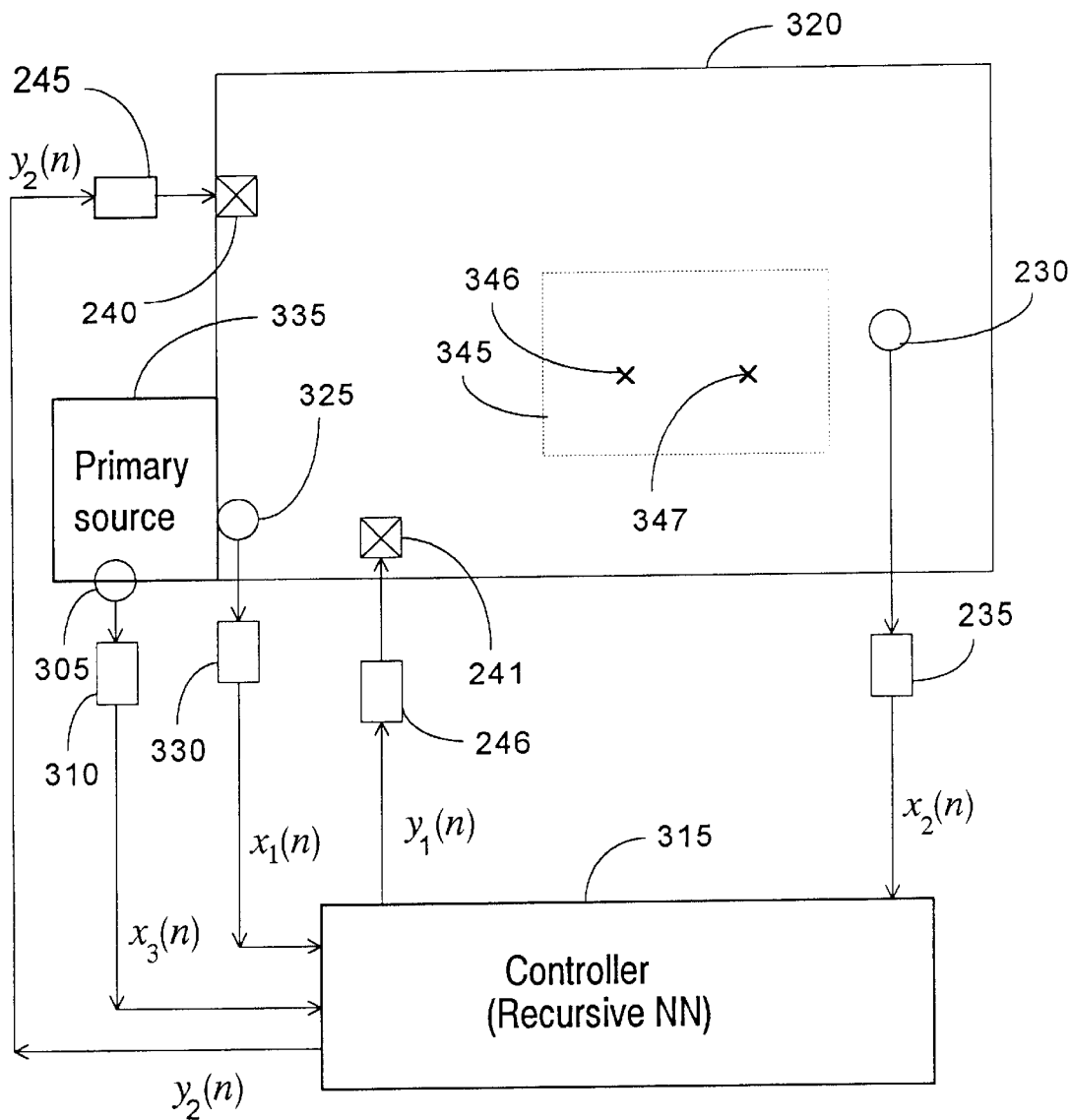
FIG. 13 is a schematic diagram of a third example AVC feedforward system without online controller adjustment and path modeling.

3. FIG. 13 shows an AVC feedforward system with two vibrational reference sensors 230 and 325 (e.g. two sensors selected from the group of microphones, hydrophones, accelerometers, velocity transducers, displacement transducers, and strain sensors); a nonvibrational reference sensor 305 (e.g. a tachometer, a electric current meter, or a fuel flow rate monitor); two secondary sources 240, 241 (e.g. two actuators selected from the group of loudspeakers, underwater sound projectors, hydraulic actuators, pneumatic actuators, proof mass actuators, electrodynamic/electromagnetic actuators, magnetostrictive actuators, shape memory alloy actuators, and piezoelectric actuators); and a controller 315 (i.e. a recursive neural network). The rectangular block 320 represents a vibration channel or medium 320 (e.g. a gas-filled or liquid-filled enclosure/space, a flexible structure, or a mechanical system). The block 335 represents a primary source (e.g. an internal combustion engine, an electric motor, automobile wheels, a vibrating structure, a vibrating mechanical system, a jet engine, an electric fan, or a loudspeaker). The blocks 235, 310, and 330 represent reference signal conditioners. The reference sensors 230, 325, and 305 and their signal conditioners 235, 330 and 310 are the main components of the reference sensor means of the AVG system. The blocks 245, 246 represent signal conditioners for the secondary sources 240, 241. These two signal conditioners 245, 246 and two secondary sources 240, 241 are the main components of the secondary source means of the AVC feedforward system. It is assumed that these reference signals contain sufficient information about the changes that the primary, feedback and secondary paths undergo for the recursive NN 315 to properly drive the secondary source to attenuate the primary vibration in the objective region 345. Here the secondary paths are the paths from the outputs (or, the output terminals) of the controller to an objective points 346, 347.

It is noted that the number of sensors of each type, the number of secondary sources of each type and their respective locations depicted in FIG. 13 are selected here only for the ease in illustrating a multiple channel AVC feedforward system in accordance with the present invention. In designing a real AVC feedforward system, the selection should be made with great care to have a good AVC performance.

During the operation of the AVC feedforward system, the primary vibration and feedbacks of the secondary vibrations from the two secondary sources are sensed by the reference sensor means, which outputs discrete-time digital reference signals $x_1(n)$, $x_2(n)$, and $x_3(n)$ as shown in FIG. 13. These reference signals form the reference signal vector x(n). The recursive neural network 315 processes x(n) and generates discrete-time digital control signals $y_1(n)$ and $y_2(n)$. These control signals form the control signal vector y(n) and are converted into two secondary vibrations by the secondary source means.

The above three example AVC feedforward systems are referred to as FIG. 11 example, FIG. 12 example and FIG. 13 example respectively. It is stressed that there is no error sensor in these example AVC feedforward systems and that the weights of the recursive neural networks therein are held fixed during the operation of these examples.

Figure 14:
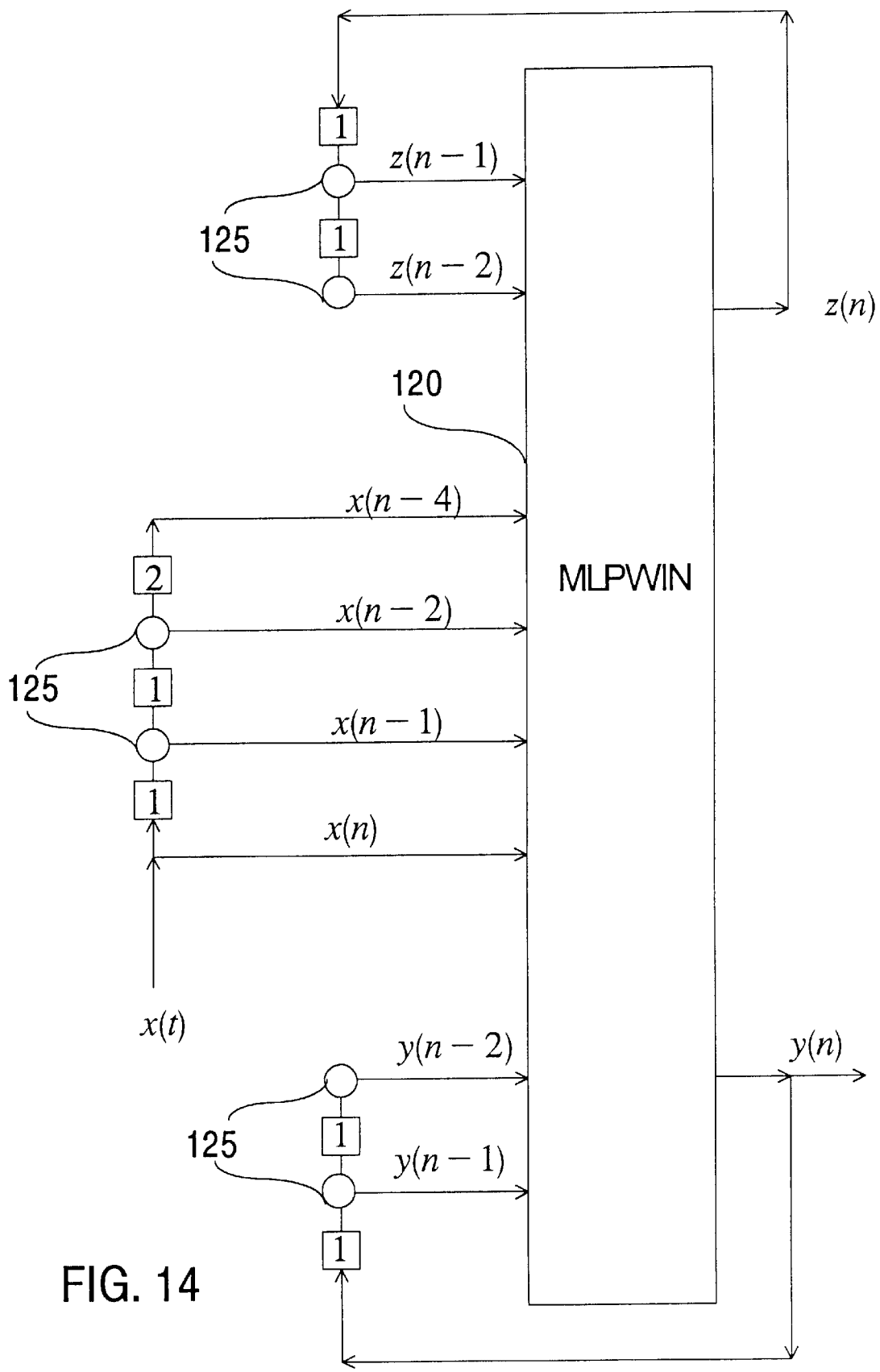
FIG. 14 shows an example MLPWINOFTD used as a controller for an AVC system.

A preferred recursive neural network for an AVC feedforward system without online controller adjustment and path modeling is MLPWINOFTD (multilayer perceptron with interconnected neurons, output feeebacks and tapped delay lines). FIG. 14 shows an example MLPWINOFTD as a controller for the FIG. 11 example, which has one reference signal x(n) and one control signal y(n). There are three tapped delay lines. The neurons 125 in the tapped delay lines have identity activation functions. Each square box represents a time delay device with the number of time steps delayed written in the square box. The delayed reference signals, x(n), x(n−1), x(n−2), x(n−4), are held by one tapped delay line. The delayed control signals, y(n−1), y(n−2), are held by another tapped delay line. The delayed free feedbacks, z(n−1), z(n−2), are held by the third tapped delay line. It is noted that z(n) is an output of the MLPWIN 120, but not an output of the whole MLPWINOFTD depicted in FIG. 14.

The weights of the recursive NN (neural network) in an AVC feedforward system without online controller adjustment and path modeling are determined in an offline training. The recursive NN must be trained to be able to adapt to all typical values, $\theta_1, \theta_2, \ldots, \theta_K$, of the environmental parameter $\theta$ for the AVC feedforward system so that all possible values of $\theta$ can be satisfactorily adapted to by the recursive NN. Recall that these typical values represent typical conditions of the operating environment for an AVC feedforward system that can be identified.

Although no error sensor is used in the operation of the AVC feedforward system, one or more experimental error sensors are used to facilitate the training of a recursive NN into a controller. These experimental error sensors are placed at objective points, where residual vibration reductions can best achieve the overall purpose of the AVC feedforward system.

Before starting to train a recursive NN into a controller, models of the secondary and feedback paths or an overall path model involved is first obtained. As mentioned earlier, offline methods of modeling linear secondary, feedback and overall paths by linear systems (or filters) are available in the open literature (e.g. S. M. Kuo and D. R. Morgan, *Active Noise Control Systems—Algorithms and DSP Implementations,* John Wiley & Sons, Inc. (1996)).

Figure 15:
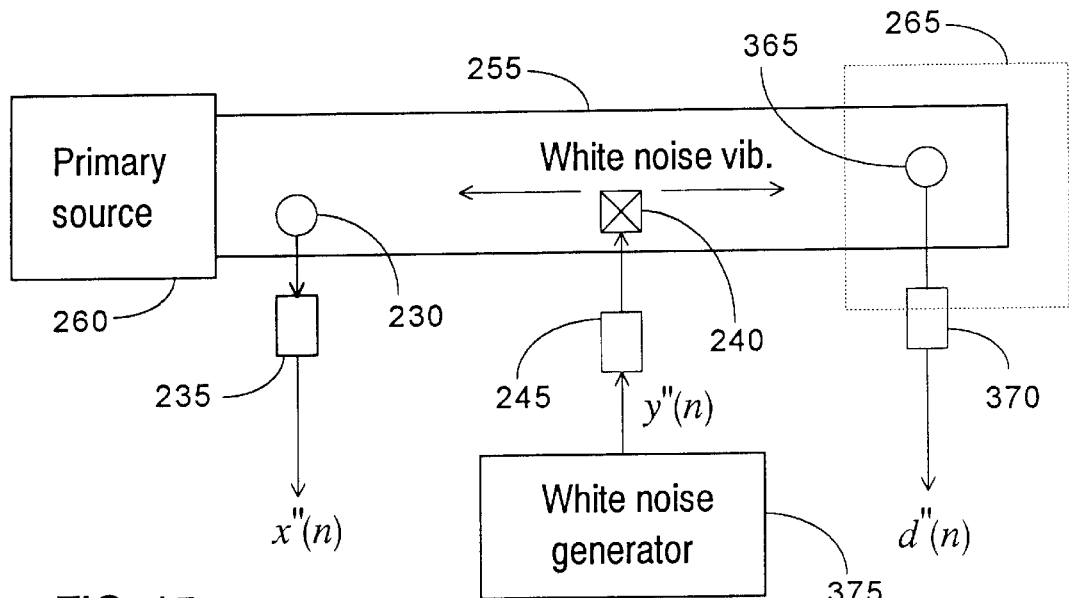
FIG. 15 shows an experimental setup for collecting data for modeling the feedback and secondary paths in FIG. 11.

To illustrate a procedure of synthesizing a recursive NN into a controller for the AVC feedforward system without online controller adjustment and path modeling, the procedure is described for the FIG. 11 and FIG. 13 examples in the following:

FIG. 15 shows an experimental setup to collect data for modeling the secondary and feedback paths in the FIG. 11 example. Note that an experimental error sensor 365 (e.g. a microphone or a hydrophone for acoustic vibration control; or an accelerometer, a velocity transducer, a displacement transducer, or a strain sensor for structural vibration control) with a signal conditioner 370, and a white noise generator 375 are used, but the controller 250 is not. The experimental error sensor 365 is placed at the objective point 266 in the FIG. 11 example. For each typical value $\theta_k$ of the environmental parameter $\theta$, set the operating environment to the condition corresponding to the typical value $\theta_k$, allowing the primary vibration if necessary, turn on the white noise generator, and record the digital signal sequences, x"(n,$\omega$), y"(n,$\omega$) and d"(n,$\omega$), for n=1, ..., N, for each sample realization $\omega$ of x"(n), y"(n) and d"(n) under condition $\theta_k$. N is chosen to be sufficiently large that the dynamics of the secondary and feedback paths are adequately represented over a time period of length N. The collection of all sample realizations $\omega$ under condition $\theta_k$ is denoted by $\Omega''_k$. For each $\theta_k$, a model $\hat{S}_k(z)$ of (the input/output relationship for) the secondary path is developed by training a linear system (or filter) on the data set $\{(y"(n,\omega),d"(n,\omega)), \omega \in \Omega''_k\}$. Similarly, for each $\theta_k$, a model $\hat{F}_k(z)$ of (the input/output relationship for) the feedback path is developed by training another linear system (or filter) on the data set $\{(y"(n,\omega),x"(n,\omega)), \omega \in \Omega''_k\}$. $\hat{S}_k(z)$ and $\hat{F}_k(z)$ denote the transfer functions of the linear system models under condition $\theta_k$. Notice that the secondary path here is the path from the output (or the output terminal) of the controller to the output of the experimental error sensor and its signal conditioner 370.

Now, turn off the white noise generator 375. For each typical value $\theta_k$, turn on the primary source 260 and record the digital signal sequences, x'(n,$\omega$) and d(n,$\omega$), for n=1, ...,N, for each sample realization $\omega$ of x'(n) and d(n) under condition $\theta_k$. The collection of all sample realizations $\omega$ under condition $\theta_k$ is denoted by $\Omega_k$.

Figure 16:
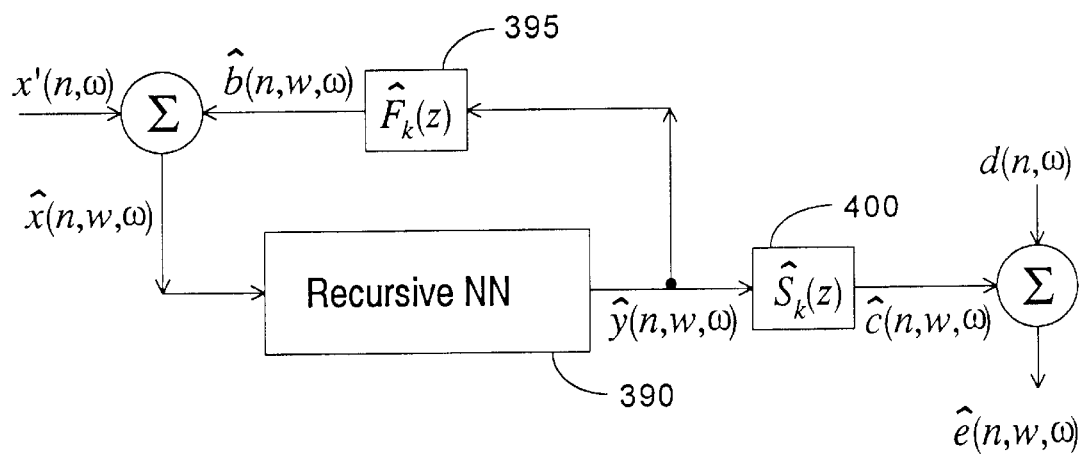
FIG. 16 shows how the estimated error signals, that appear in the training criterion for training a recursive neural network into a controller for the AVC system in FIG. 11, are defined in terms of the feedback and secondary path models and the training data.

FIG. 16 shows how the estimated error signals, that appear in a training criterion below for training a recursive neural network into a controller for the AVC feedforward system in FIG. 11, are defined in terms of the feedback and secondary path models and the training data: For each $\omega \in \Omega_k$, the digital signal sequences, x'(n,$\omega$) and d(n,$\omega$), are processed by the recursive NN with weights w and the path models, $\hat{S}_k(z)$ and $\hat{F}_k(z)$, in producing an estimate $\hat{c}(n,w,\omega)$ of the cancelling (i.e. secondary) vibration and an estimate error signal $\hat{e}(n,w,\omega)$. More specifically, for each $\omega \in \Omega_k$, the estimated reference signal $\hat{x}(n,w,\omega)$, which is the sum of x'(n,$\omega$) and the estimate $\hat{b}(n,w,\omega)$ of the secondary vibration feedback, is processed through a recursive NN 390 with weights w and the linear system model 400, $\hat{S}_k(z)$, of the secondary path, to generate an estimate $\hat{c}(n,w,\omega)$ of the cancelling (i.e. secondary) vibration. The estimate $\hat{b}(n,w,\omega)$ is obtained by passing the estimated output $\hat{y}(n,w,\omega)$ of the recursive NN through the linear system model 395, $\hat{F}_k(z)$, of the feedback path. The estimated error signal $\hat{e}(n,w,\omega)$=d(n,$\omega$)+$\hat{c}(n,w,\omega)$ is obtained through the summing junction.

A training criterion for determining the weights w in the recursive NN is $$Q(w) = \sum_{k=1}^{K} \sum_{\omega \in \Omega_k} Q_\omega(w) \quad (16)$$

$$Q_\omega(w) := \frac{1}{N|\Omega|} \sum_{n=1}^{N} [d(n, \omega) + \hat{c}(n, w, \omega)]^2$$

where $|\Omega|$ is the number of elements in $\Omega := \cup_{k=1}^{K} \Omega_k$. Note that depending on the type of experimental error sensor 365 used, the estimated error signal $\hat{e}(n,w,\omega)$ may be an estimated error in pressure, velocity, acceleration, displacement, force or a combination thereof. Of course, different types of training criterion (e.g. an estimated average power of the residual vibration) can be used and the power consumption for AVC can be incorporated into the training criterion.

Algorithms for training recursive neural networks with respect to a training criterion are discussed in some published books and research papers. Backpropagation through time (BPTT) and real time recurrent learning (RTRL) algorithms for differentiating a training criteria with respect to the weights (including initial activation levels) of an MLP-WIN or MLPWOF can be found in U.S. Pat. Nos. 5,408,424 and 5,649,065. Algorithms for training a recursive NN with respect to the above training criterion can be obtained by modifying existing algorithms.

The "multistream" training method reported in L. A. Feldkamp and G. V. Puskorius, "Training of robust neural controller," in *Proceedings of the 33rd Conference on Decision and Control*, pp. 2754–2759, Lake Buena Vista, Fla., 1994, after some modification, is expected to be effective here.

In synthesizing a controller, at least one recursive NN is trained and the best one in terms of AVC performance and online computational cost is selected as a candidate for the controller. If the recursive NN thus obtained needs to be improved, an online training method can be applied to adjust the weights of the recursive NN to reduce the error signal. The training and adjusting may be repeated before a recursive NN is selected as the controller. Then the experimental error sensor is removed, and the AVC feedforward system deployed.

For the FIG. 12 example, since there is no feedback of the secondary vibration to the reference sensors, there is no feedback path to model. However, an error sensor is still needed to facilitate the modeling of the secondary path and the synthesis of a controller. The way to synthesize a controller for the FIG. 12 example is similar to that for the FIG. 11 example described above and hence is not described here.

Figure 17:
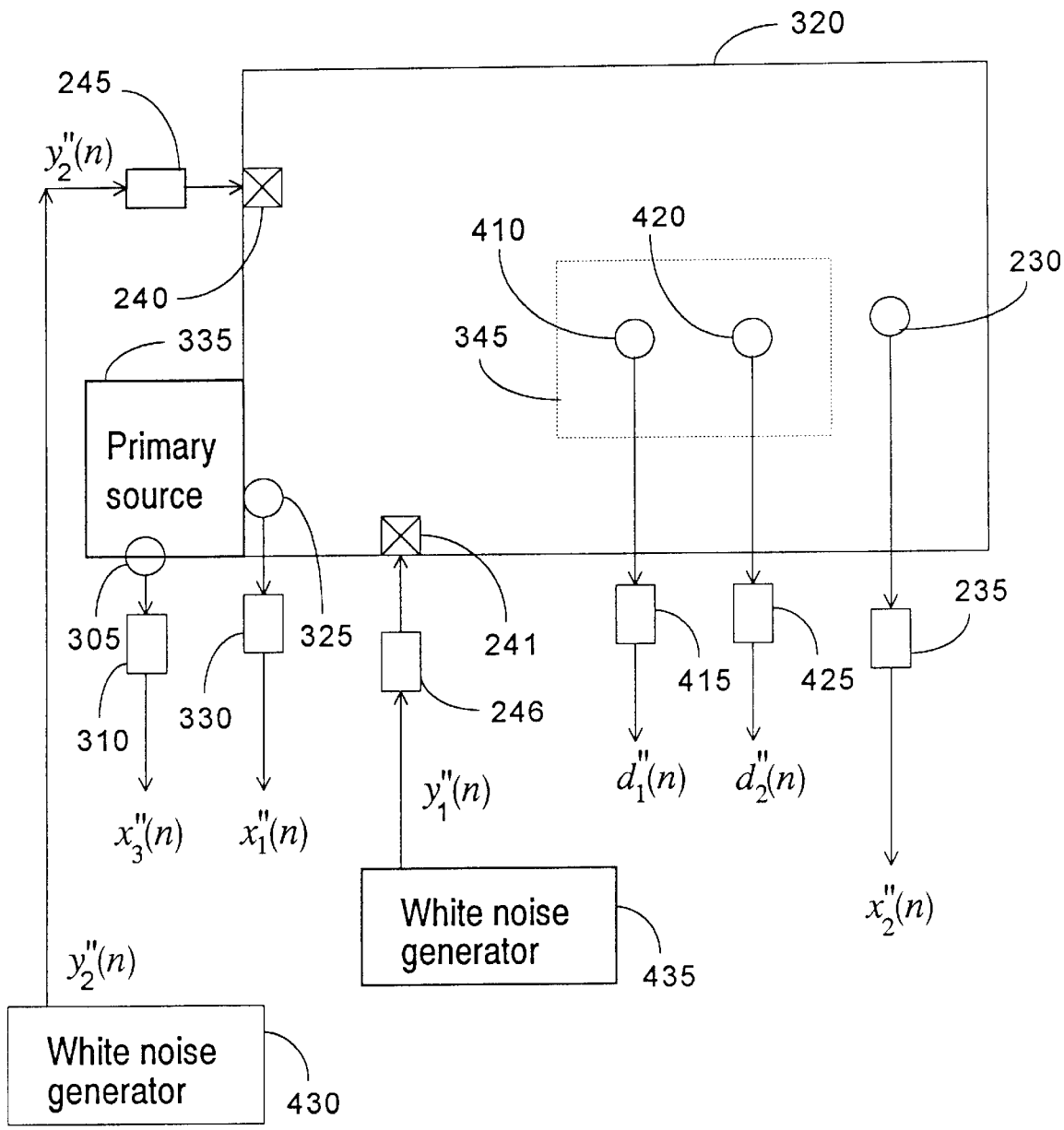
FIG. 17 shows an experimental setup for collecting data for modeling the feedback and secondary paths in FIG. 13.

FIG. 17 shows an experimental setup to collect data for modeling the secondary and feedback paths in the FIG. 13 example. Note that two experimental error sensors 410, 420 (e.g. microphones, hydrophones, accelerometers, velocity transducers, displacement transducers, and strain sensors) with signal conditioners 415, 425 respectively and two statistically independent white noise generators 430, 435 are used, but the controller 315 is not. The experimental error sensors 410, 420 are placed at the objective points 346, 347 in the FIG. 13 example. For each typical value $\theta_k$ of the environmental parameter $\theta$, set the operating environment to the condition corresponding to the typical value $\theta_k$, allowing the primary vibration, if necessary, turn on the statistically independent white noise generators, and record the digital signal sequences, $x''_1(n,\omega)$, $x''_2(n,\omega)$, $y''_1(n,\omega)$, $y''_2(n,\omega)$, $d''_1(n,\omega)$, and $d''_2(n,\omega)$, for $n=1,\ldots,N$, for each sample realization $\omega$ of $x''_1(n)$, $x''_2(n)$, $y''_1(n)$, $y''_2(n)$, $d''_1(n)$, and $d''_2(n)$ under condition $\theta_k$. N is chosen to be sufficiently large that the dynamics of the secondary and feedback paths are adequately represented over a time period of length N. The collection of all sample realizations $\omega$ under condition $\theta_k$ is denoted by $\Omega''_k$. The (input/output relationship for) secondary path from $y''_j(n)$ to $d''_i(n)$ under $\theta_k$ is denoted by $S_k^{ij}(z)$. For each $\theta_k$, a model $\hat{S}_k^{ij}(z)$ of the secondary path $S_k^{ij}(z)$ is developed by training a linear system (or filter) on the data set $\{(y''_j(n,\omega), d''_i(n,\omega)), \omega \in \Omega''_k\}$ for $i=1,2$, $j=1,2$, and $k=1,\ldots,K$. Similarly, for each $\theta_k$, a model $\hat{F}_k^{ij}(z)$ of (the input/output relationship for) the feedback path $F_k^{ij}(z)$ is developed by training another linear system (or filter) on the data set $\{(y''_j(n,\omega), x''_i(n,\omega)), \omega \in \Omega''_k\}$ for $i=1,2$, $j=1,2$, and $k=1,\ldots,K$. $\hat{S}_k^{ij}(z)$ and $\hat{F}_k^{ij}(z)$ denote the transfer functions of the linear system models. Notice that the secondary paths here are the paths from the outputs (or the output terminals) of the controller to the outputs of the experimental error sensors and their signal conditioners 415, 425.

Now, turn off the white noise generators. For each typical value $\theta_k$, turn on the primary source 335 and record the digital signal sequences, $x'_1(n,\omega)$, $x'_2(n,\omega)$, $x'_3(n,\omega)$, $d_1(n,\omega)$, and $d_2(n,\omega)$, for $n=1,\ldots,N$, for each sample realization $\omega$ of $x'_1(n)$, $x'_2(n)$, $x'_3(n)$, $d_1(n)$, and $d_2(n)$ under condition $\theta_k$. The collection of all sample realizations $\omega$ under condition $\theta_k$ is denoted by $\Omega_k$.

Figure 18:
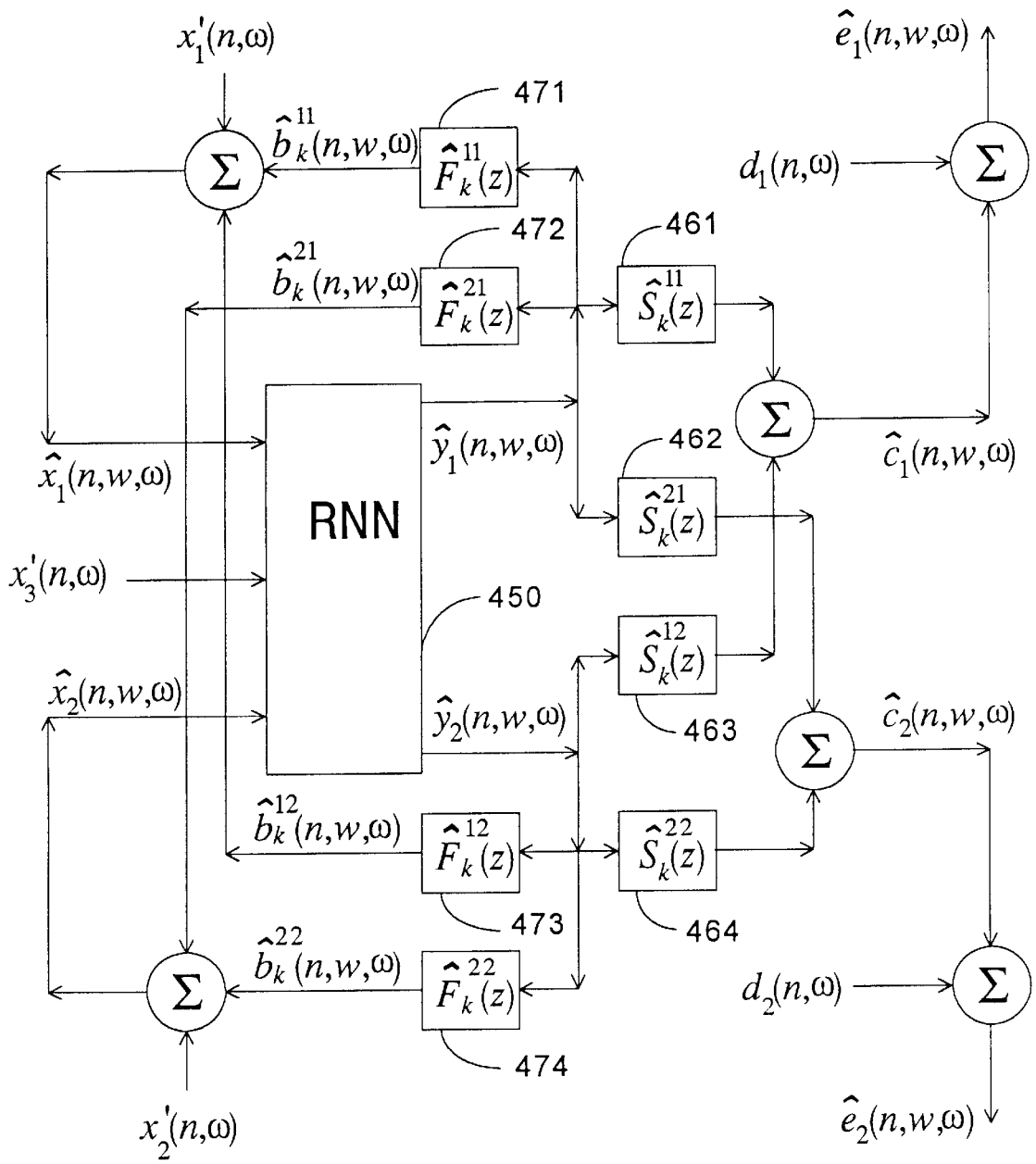
FIG. 18 shows how the estimated error signals, that appear in the training criterion for training a recursive neural network into a controller for the AVC system in FIG. 13, are defined in terms of the feedback and secondary path models and the training data.

FIG. 18 shows how the estimated error signals, that appear in a training criterion below for training a recursive neural network into a controller for the AVC system in FIG. 13, are defined in terms of the feedback and secondary path models and the training data: For $\omega \in \Omega_k$, the digital signal sequence, $x'_1(n,\omega)$, $x'_2(n,\omega)$, $x'_3(n,\omega)$, $d_1(n,\omega)$, and $d_2(n,\omega)$, are processed by the recursive NN; the path models, $\hat{S}_k^{ij}(z)$ and $\hat{F}_k^{ij}(z)$; and the summing junctions in producing estimates $\hat{c}_m(n,w,\omega)$ of the cancelling (i.e. secondary) vibrations and estimated error signals $\hat{e}_m(n,w,\omega)$ for $m=1,2$. More specifically, for $\omega \in \Omega_k$, $x'_3(n,\omega)$ and the estimated reference signals $\hat{x}_m(n,w,\omega)$, which are the sums of $x'_m(n,\omega)$ and estimates $\hat{b}_k^{mj}(n,w,\omega)$, $j=1,2$, of the secondary vibration feedbacks, are processed through a recursive NN 450 with weights w and the linear system models 461, 462, 463, 464, $\hat{S}_k^{ij}(z)$, of the secondary paths, to generate estimates $\hat{c}_m(n,w,\omega)$ of the cancelling (i.e. secondary) vibrations for $m=1,2$. The estimates $\hat{b}_k^{ij}(n,w,\omega)$ are obtained by passing the estimated outputs $\hat{y}_j(n,w,\omega)$ of the recursive NN 450 through the linear system models 471, 472, 473, 474, $\hat{F}_k(z)$, of the feedback paths. The estimated error signals $\hat{e}_m(n,w,\omega) = d_m(n,\omega) + \hat{c}_m(n,w,\omega)$, $m=1,2$, are obtained through summing junctions.

A training criterion for determining the weights w in the recursive NN is $$Q(w) = \sum_{k=1}^{K} \sum_{\omega \in \Omega_k} Q_\omega(w) \qquad (17)$$

$$Q_\omega(w) := \frac{1}{N|\Omega|} \sum_{n=1}^{N} \sum_{m=1}^{2} [d_m(n,\omega) + \hat{c}_m(n,w,\omega)]^2$$

where $|\Omega|$ is the number of elements in $\Omega := \cup_{k=1}^{K} \Omega_k$. Note that depending on the type(s) of experimental error sensor 410, 420 used, the estimated error signal $\hat{e}_m(n,w,\omega)$ may be an estimated error in pressure, velocity, acceleration, displacement, force, or a combination thereof. Of course, different types of training criterion (e.g. an estimated average power of the residual vibration) can be used and the power consumption for AVC can be incorporated into the training criterion.

Algorithms for training recursive neural networks with respect to a training criterion are discussed in some published books and research papers. Backpropagation through time (BPTT) and real time recurrent learning (RTRL) algorithms for differentiating a training criteria with respect to the weights (including initial activation levels) of an MLP-WIN or MLPWOF can be found in U.S. Pat. Nos. 5,408,424 and 5,649,065. Algorithms for training a recursive NN with respect to the above training criterion can be obtained by modifying existing algorithms.

The "multistream" training method reported in L. A. Feldkamp and G. V. Puskorius, "Training of robust neural controller," in *Proceedings of the 33rd Conference on Decision and Control*, pp. 2754–2759, Lake Buena Vista, Fla., 1994, after some modification, is expected to be effective here.

At least one recursive NN is trained and the best one in terms of AVC performance and online computational cost is selected as a candidate for the controller. If the candidate thus obtained needs to be improved, an online training method can be applied to adjust the weights of the recursive NN to reduce the error signal. The training and adjusting may be repeated before a recursive NN is selected as the controller. Then the two experimental error sensors 410, 420 are removed, and the AVC feedforward system deployed.

AVC Feedforward-Feedback Systems without Online Controller Adjustment and Path Modeling If sufficient information about the uncertain primary vibration statistics and the uncertain primary, feedback and secondary paths involved in the operation of an AVC system cannot be obtained from either reference signals or error signals for achieving the AVC objective, both reference and error sensors have to be used. The weights of the controller in a prior-art AVC feedforward system, which use both reference and error sensors, are adjusted online to reduce the error signals and thereby to adapt to the uncertain operating environment of the AVC feedforward system. Online adjustment of controller weights causes poor transient AVC performance right after a change of the operating environment and requires much online computation.

The present invention exploits the adaptive capability of a recursive neural network with fixed weights, which was recently discovered and is discussed earlier on in this invention disclosure, to do away with online controller adjustment and path modeling, if one or more reference and error signals accumulate sufficient information in finite time about the changes of the uncertain primary vibration statistics and the uncertain primary, feedback and secondary paths involved in the operation of an AVC system for achieving the AVC objective. Thus, an AVC system in accordance with the present invention, for attenuating at least one primary vibration by injecting at least one cancelling vibration, comprises reference sensor means, comprising at least one reference sensor; a recursive neural network, comprising a plurality of weights; secondary source means, comprising at least one secondary source; and error sensor means, comprising at least one error sensor. The reference sensor means derives at least one reference signal containing information about the at least one primary vibration. The error sensor means senses at least one combination of at least one primary signal and at least one cancelling signal and produces at least one error signal. This at least one error signal and the at least one reference signal are processed by the recursive NN (neural network) to generate at least one control signal, which is converted by the secondary source means into the at least one cancelling signal. The weights of the recursive NN are held fixed online during the operation of said AVC system.

This AVC system is called an AVC feedforward-feedback system without online controller adjustment and path modeling. Note that this AVC feedforward-feedback system does not have such shortcomings of the prior-art AVC feedforward systems as use of an error sensor at each objective point, relatively slow weight/waveform adjustment, frequent adjustment of a model of a secondary path, use of a high-order adaptive linear transversal filter, instability of an adaptive linear recursive filter, failure to use a useful nonvibrational reference sensor, failure to deal with the nonlinear behavior of a primary or secondary path, weight adjustment using control predicted values, use of an identification neural network, and adjustment of all weights of a neural network, which are discussed in the section on the background of the present invention.

Figure 19:
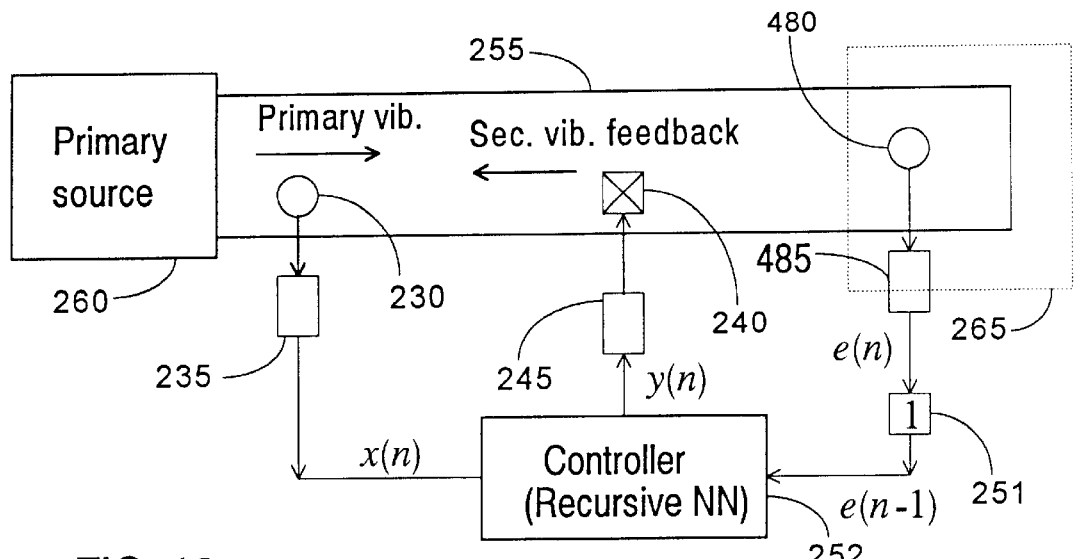
FIG. 19 is a schematic diagram of a first example AVC uncertain system without online controller adjustment and path modeling.

Descriptions of three examples of such an AVC feedforward-feedback system follow:

1. FIG. 19 shows an AVC feedforward-feedback system with one vibrational reference sensor 230 (e.g. a microphone, a hydrophone, an accelerometer, a velocity transducer, a displacement transducer, or a strain sensor), one secondary source 240 (e.g. a loudspeaker, an underwater sound projector, a hydraulic actuator, a pneumatic actuator, a proof mass actuator, an electrodynamic/electromagnetic actuator, a magnetostrictive actuator, a shape memory alloy actuator, or a piezoelectric actuator), one error sensor 480 (e.g. a microphone or a hydrophone for acoustic vibration control; or an accelerometer, a velocity transducer, a displacement transducer, or a strain sensor for structural vibration control) and a controller 252 (i.e. a recursive NN). A rectangular block 255 is shown here to represent an acoustic or structural vibration channel or medium (e.g. a gas-filled or liquid-filled duct or space, a beam, a flexible structure or a mechanical system). It is assumed that the reference and error signals, x(n) and e(n), contain sufficient information about the changes that the primary, feedback and secondary paths undergo for the recursive NN 252 to properly drive the secondary source 240 to attenuate the primary vibration in the objective region 265. The AVC feedforward-feedback system in FIG. 19 is very similar to the FIG. 11 example. The only differences in FIG. 19 are the addition of an error sensor 480 and its signal conditioner 485, whose delayed output e(n−1) is an additional input to the recursive NN 250. The error sensor 480 is placed at an objective point, which is the same as the objection point 266 in the FIG. 11 example. The box 251 represents a delay device with the number inside the box indicating the number of time steps that a signal passing through the device is delayed.

Figure 20:
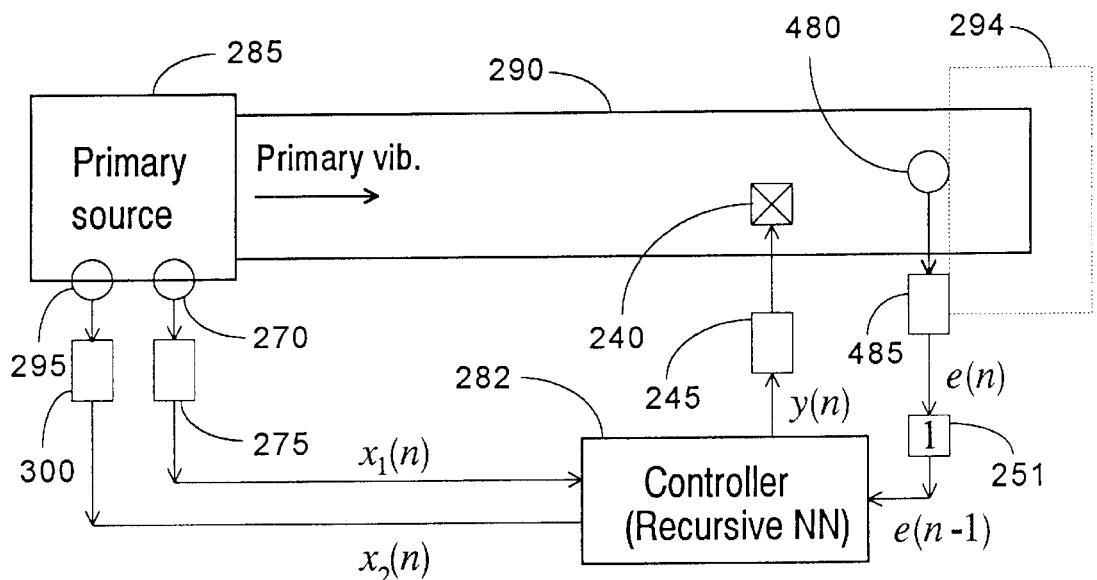
FIG. 20 is a schematic diagram of a second example AVC uncertain system without online controller adjustment and path modeling.

2. FIG. 20 shows an AVC feedforward-feedback system with two nonvibrational reference sensors 270 and 295 (e.g. two sensors selected from the group of a tachometer sensing the tooth passage rate of a wheel geared to the crankshaft or a position sensor indicating the position of the air intake throttle valve, an ammeter for measuring the electric current drawn by a electric motor or the electric current generated by a power generater, an optical sensor for sensing the road surface condition for an automobile, a sensor for picking up the position of the throttle valve, and a gauge for measuring the intake manifold vacuum and mass air flow in an internal combustion engine), one secondary source 240 (e.g. a loudspeaker, an underwater sound projector, a hydraulic actuator, a pneumatic actuator, a proof mass actuator, an electrodynamic/electromagnetic actuator, a magnetostrictive actuator, a shape memory alloy actuator, or a piezoelectric actuator), one error sensor 480 (e.g. a microphone or a hydrophone for acoustic vibration control; or an accelerometer, a velocity transducer, a displacement transducer, or a strain sensor for structural vibration control) and a controller 282 (i.e. a recursive neural network). A rectangular block 290 is shown here to represent an acoustic or structural vibration channel or medium (e.g. a gas-filled or liquid-filled duct or space, a beam, a flexible structure or a mechanical system). A primary source 285 may be an internal combustion engine, an electric fan with frequently changing rotational speed, an air conditioner or heater, a vibrating structure, a vibrating mechnical system, or an electric motor. It is assumed that the reference signals, $x_1(n)$ and $x_2(n)$, from the reference sensors 270, 295 and the error signal e(n) from the error sensor 480 contain sufficient information about the changes that the uncertain primary and secondary paths undergo for the recursive NN 282 to properly drive the secondary source to attenuate the primary vibration in the objective region 295. The AVC feedforward-feedback system in FIG. 20 is very similar to the FIG. 12 example. The only differences in FIG. 20 are the addition of an error sensor 480 and its signal conditioner 485, whose delayed output e(n−1) is an additional input to the recursive NN 280. The error sensor 480 is placed at an objective point, which is the same as the objection point 296 in the FIG. 12 example. The box 251 represents a delay device with the number inside the box indicating the number of time steps that a signal passing through the device is delayed.

Figure 21:
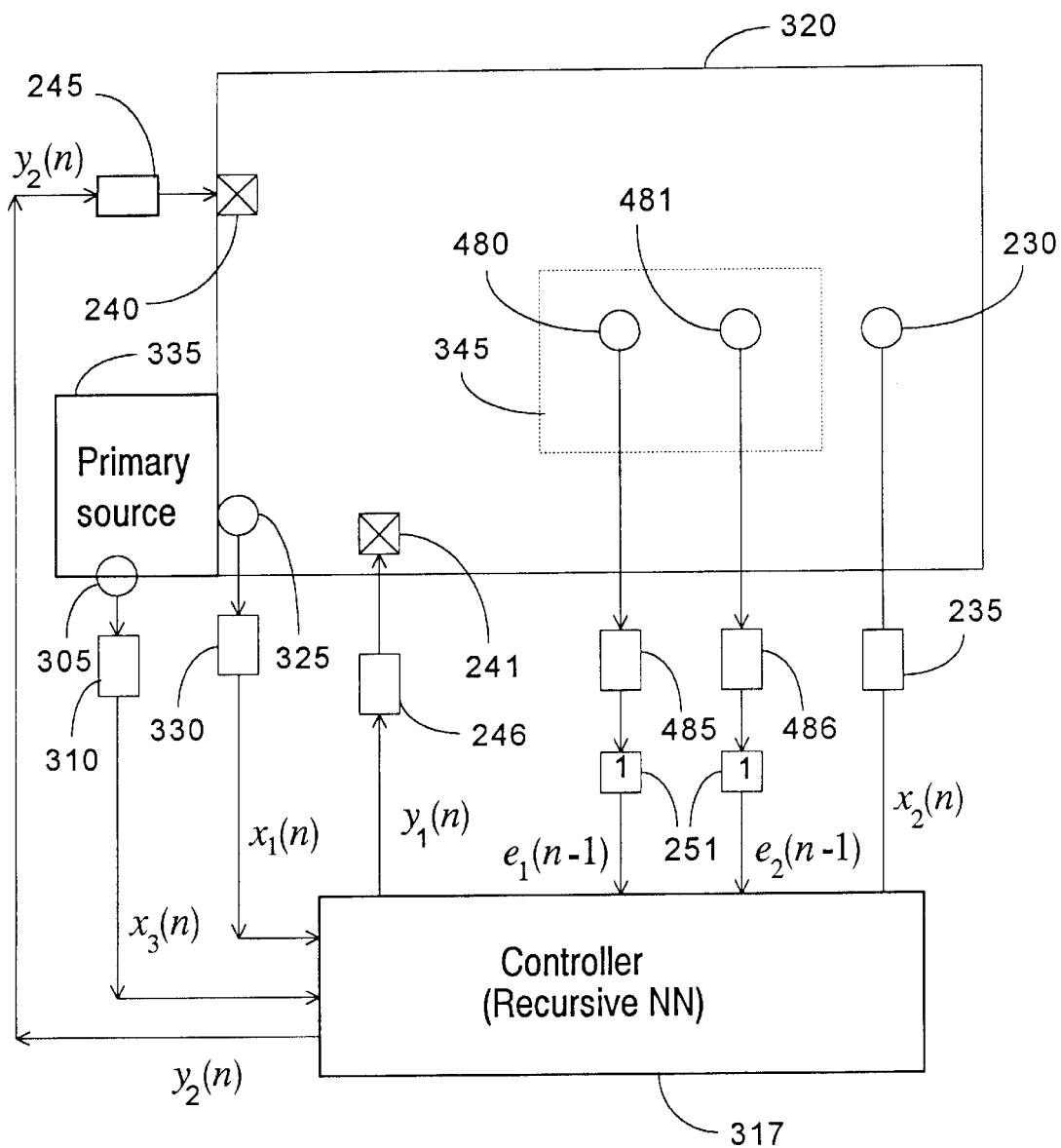
FIG. 21 is a schematic diagram of a third example AVC uncertain system without online controller adjustment and path modeling.

3. FIG. 21 shows an AVC feedforward-feedback system with two vibrational reference sensors 230 and 325 (e.g. two sensors selected from the group of microphones, hydrophones, accelerometers, velocity transducers, displacement transducers, and strain sensors); a nonvibrational reference sensor 305 (e.g. a tachometer sensing the tooth passage rate of a wheel geared to the crankshaft or a position sensor indicating the position of the air intake throttle valve, an ammeter for measuring the electric current drawn by a electric motor or the electric current generated by a power generator, an optical sensor for sensing the road surface condition for an automobile, a sensor for picking up the position of the throttle valve, or a gauge for measuring the intake manifold vacuum and mass air flow in an internal combustion engine); two secondary sources 240, 241 (e.g. two actuators selected from the group of loudspeakers, underwater sound projectors, hydraulic actuators, pneumatic actuators, proof mass actuators, electrodynamic/electromagnetic actuators, magnetostrictive actuators, shape memory alloy actuators, and piezoelectric actuators); two error sensors 480, 481 (e.g. two selected from the group g of microphones and hydrophones for acoustic vibration control; or two selected from the group of accelerometers, velocity transducers, displacement transducers and strain sensors for structural vibration control) and a controller 317 (i.e. a recursive neural network). The rectangular block 320 represents a vibration channel or medium 320 (e.g. a gas-filled or liquid-filled enclosure/space, a flexible structure, or a mechanical system). FIG. 21 is similar to FIG. 13. The only differences in FIG. 21 are the additions of two error sensors 480, 481 and their signal conditioners 485, 486, whose delayed outputs $e_1(n-1)$ and $e_2(n-1)$ are additional inputs to the recursive NN 317. The error sensors 480, 481 are placed at objective points, which are the same as the objection points 346, 347 in the FIG. 13 example. It is assumed that the three reference signals, $x_1(n)$, $x_2(n)$ and $x_3(n)$, and the two error signals, $e_1(n)$ and $e_2(n)$, contain sufficient information about the changes that the operating environment undergoes for the recursive NN 317 to properly drive the two secondary sources to achieve the purpose of the AVC feedforward-feedback system. Each of the boxes 251 represents a delay device with the number inside the box indicating the number of time steps that a signal passing through the device is delayed.

The above three example AVC feedforward-feedback systems are referred to as FIG. 19 example, FIG. 20 example and FIG. 21 example respectively. In these examples, the number of time steps in every delay device is 1, but it is understood that other numbers of time steps can be used. It is also understood that there can be an objective point or objective points at which no error sensor is placed. It is stressed that the weights of the recursive neural networks in these example AVC feedforward-feedback systems are held fixed during their operations. A preferred recursive NN for an AVC feedforward-feedback system without online controller adjustment and path modeling described above is an MLPWINOFTD.

The afore-described procedure of synthesizing a controller for an AVC feedforward system without online controller adjustment and path modeling can be applied here with only slight modifications. Recall that in collecting training data for synthesizing models of the secondary and feedback paths and for synthesizing controllers for AVC feedforward systems without online controller adjustment and path modeling (e.g. FIG. 11–FIG. 13 examples), experimental error sensors are used. Since an AVC feedforward-feedback system without online controller adjustment and path modeling described above has at least one error sensor, said at least one error sensor can be used instead of the corresponding experimental error sensor(s) in collecting training data. Other than this, data collection and path model synthesis for designing an AVC feedforward system without online controller adjustment and path modeling are exactly the same as those for an AVC feedforward system without online controller adjustment and path modeling (e.g. FIG. 11–FIG. 13 examples).

Figure 22:
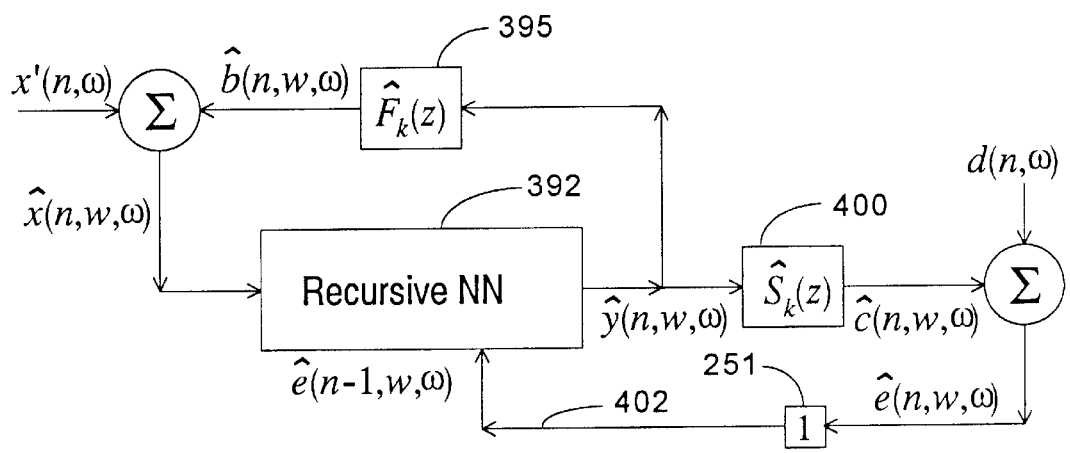
FIG. 22 shows how the estimated error signals, that appear in the training criterion for training a recursive neural network into a controller for the AVC system in FIG. 19, are defined in terms of the feedback and secondary path models and the training data.
Figure 23:
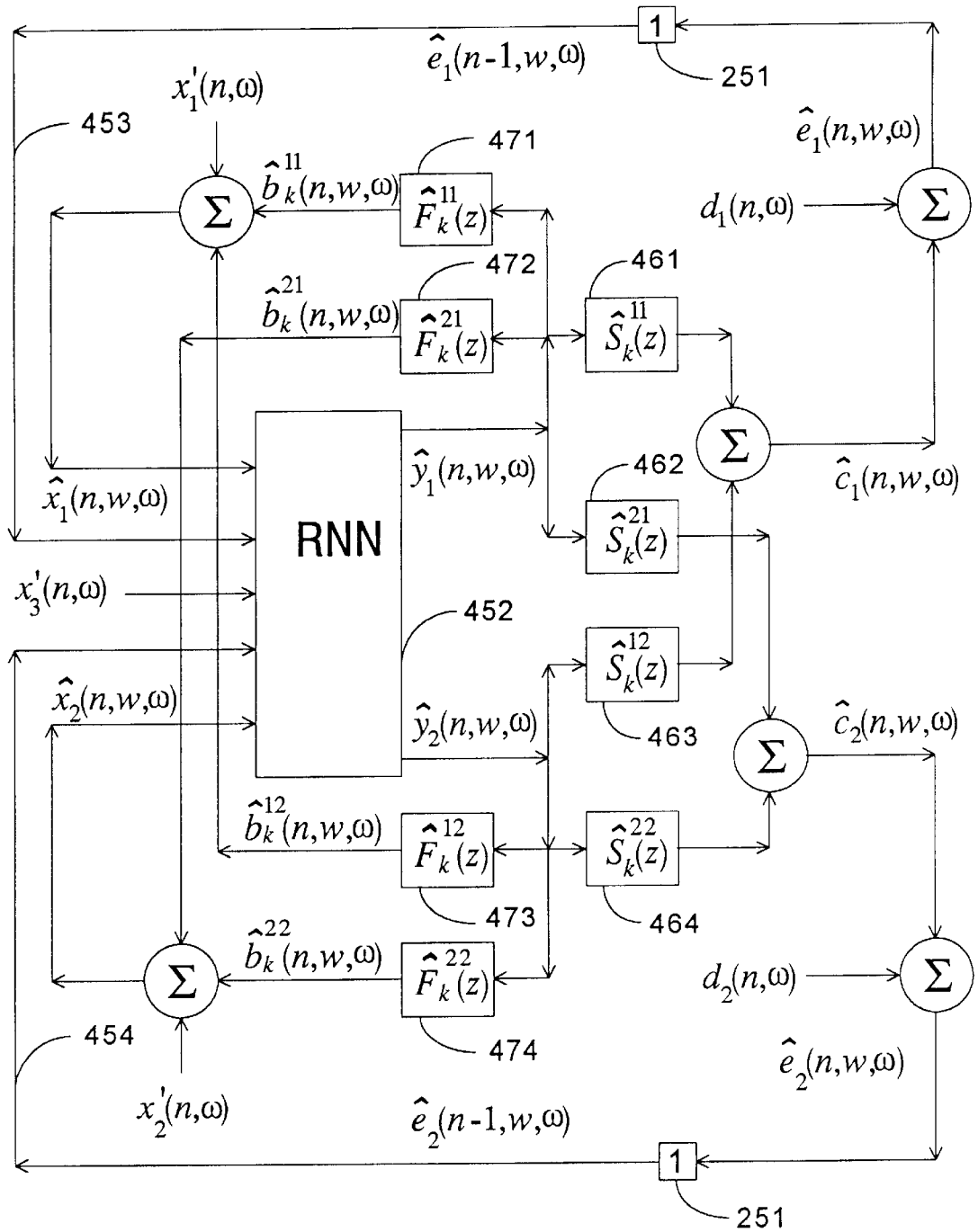
FIG. 23 shows how the estimated error signals, that appear in the training criterion for training a recursive neural network into a controller for the AVC system in FIG. 21, are defined in terms of the feedback and secondary path models and the training data.

Nevertheless, one must not forget to input the error signal(s), after a time delay(s), to the recursive NN in training it into a controller for an AVC feedforward-feedback system without online controller adjustment and path modeling (e.g. FIG. 19–FIG. 21 examples). FIG. 16 and FIG. 18 for the FIG. 11 and FIG. 13 examples must be replaced by FIG. 22 and FIG. 23 for the FIG. 19 and FIG. 21 examples respectively. FIG. 22 is the same as FIG. 16 except that the recursive NN 392 in FIG. 22 has the delayed estimated error signal $ê(n-1,w,\omega)$ as an input 402 in addition to the estimated reference signal $\hat{x}(n,w,\omega)$. FIG. 23 is the same as FIG. 18 except that the recursive NN 452 in FIG. 23 has the estimated error signals $ê_1(n-1,w,\omega)$ and $ê_2(n-1,w,\omega)$ as inputs 453, 454 in addition to the estimated reference signals $\hat{x}_m(n,w,\omega)$, m=1,2, and $x'_3(n,\omega)$.

The criteria for training recursive NNs into controllers for the FIG. 19 and FIG. 21 examples have exactly the same forms as the criteria, (16) and (17), for training recursive NNs into controllers for the FIG. 11 and FIG. 13 examples.

AVC Feedback Systems without Online Controller Adjustment and Path Modeling

An AVC system without a reference sensor is called an AVC feedback system. AVC feedback systems are used for applications in which it is not possible or practical to sense or internally generate a coherent reference signal.

The present invention exploits the adaptive capability of a recursive neural network with fixed weights to do away with online controller weight adjustment and online secondary path modeling in an AVC feedback system, if one or more error signals accumulate, in finite time, sufficient information about the changes of the operating environment (including mainly the secondary path) for achieving the AVC objective. Thus, an AVC feedback system in accordance with the present invention, for attenuating at least one primary vibration by injecting at least one cancelling vibration, comprises error sensor means, comprising at least one error sensor; a recursive neural network, comprising a plurality of weights; and secondary source means, comprising at least one secondary source. The error sensor means senses at least one combination of the at least one primary vibration and the at least one cancelling vibration to provide at least one error signal. The recursive NN (neural network)

processes the at least one error signal to generate at least one control signal, which is converted by the secondary source means into the at least one cancelling signal. The weights of the recursive NN are held fixed online during the operation of said AVC feedback system.

This AVC feedback system is called an AVC feedback system without online controller adjustment and path modeling. Note that this AVC feedback system does not have such shortcomings of the prior-art AVC feedback systems as use of an error sensor at each objective point, relatively slow weight/waveform adjustment, frequent adjustment of a model of a secondary path, use of a high-order adaptive linear transversal filter, instability of an adaptive linear recursive filter, failure to deal with the nonlinear behavior of a primary or secondary path, weight adjustment using control predicted values, use of an identification neural network, and online adjustment of all weights of a neural network, which are discussed in the section on the background of the present invention.

Figure 24:
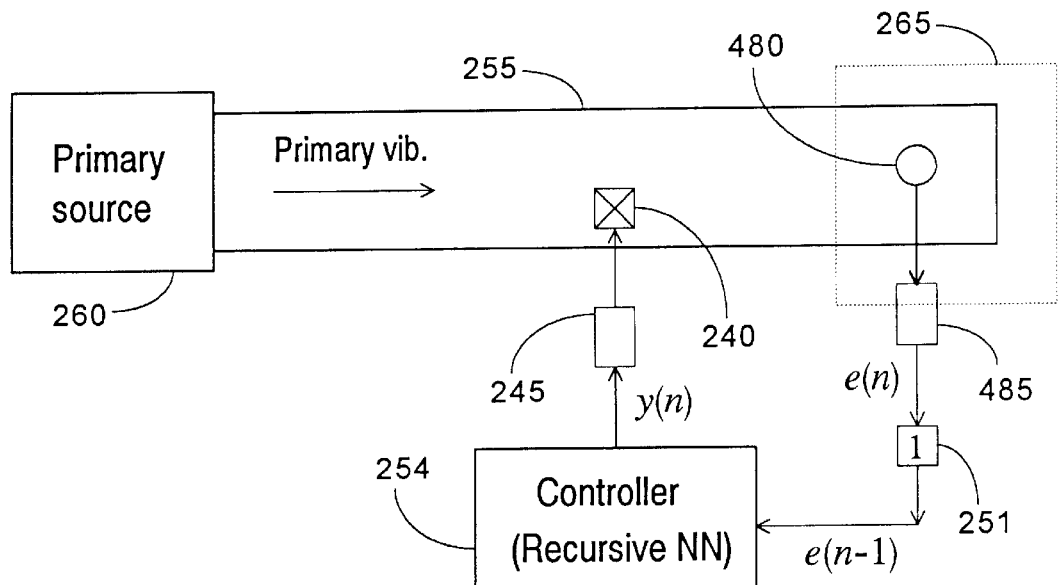
FIG. 24 is a schematic diagram of a first example AVC feedback system without online controller adjustment and path modeling.

Descriptions of three examples of such an AVC feedback system follow:

1. FIG. 24 shows an AVC feedback system with one error sensor 480 (e.g. a microphone or hydrophone for acoustic vibration attenuation; or an accelerometer, velocity transducer, displacement transducer, or strain sensor for structural vibration attenuation), one secondary source 240 (e.g. a loudspeaker, an underwater sound projector, a hydraulic actuator, a pneumatic actuator, a proof mass actuator, an electrodynamic/electromagnetic actuator, a magnetostrictive actuator, a shape memory alloy actuator, or a piezoelectric actuator) and a controller 254 (i.e. a recursive NN). A rectangular block 255 is shown here to represent an acoustic or structural vibration channel or medium (e.g. a gas-filled or liquid-filled duct or space, a beam, a flexible structure or a mechanical system). It is assumed that the error signal e(n) from the error sensor 480 contains sufficient information about the changes that the operating environment (including the statistics of the primary vibration and the primary and secondary paths) undergoes for the recursive NN 254 to properly drive the secondary source to attenuate the primary vibration in the objective region 265. The error sensor 480 is placed at an objective point. The primary source 260 may be a speaker, a structural vibration actuator, an electric fan with frequently changing rotational speed, an air conditioner or heater, an internal combustion engine, a vibrating structure, or a vibrating mechanical system. The block 485 represents a signal conditioner (e.g. a signal conditioner comprising a pre-amplifier, an anti-aliasing filter, and an A/D converter). This block 485 and the error sensor 480 are the main components of the error sensor means of the AVC feedback system. The block 245 represents a signal conditioner (e.g. a signal conditioner comprising an D/A converter, a low-pass filter and a power amplifier). This signal conditioner 245 and the secondary source 240 are the main components of the secondary source means of the AVC feedback system.

During the operation of the AVC feedback system, a combination of the primary vibration and the secondary vibration from the secondary source is sensed by the error sensor means, which outputs an error signal e(n). This error signal is a discrete-time digital signal. The recursive neural network 254 processes the time delayed error signal e(n−1) and generates a discrete-time digital control signal y(n). This control signal is then converted into the secondary vibration by the secondary source means.

Figure 25:
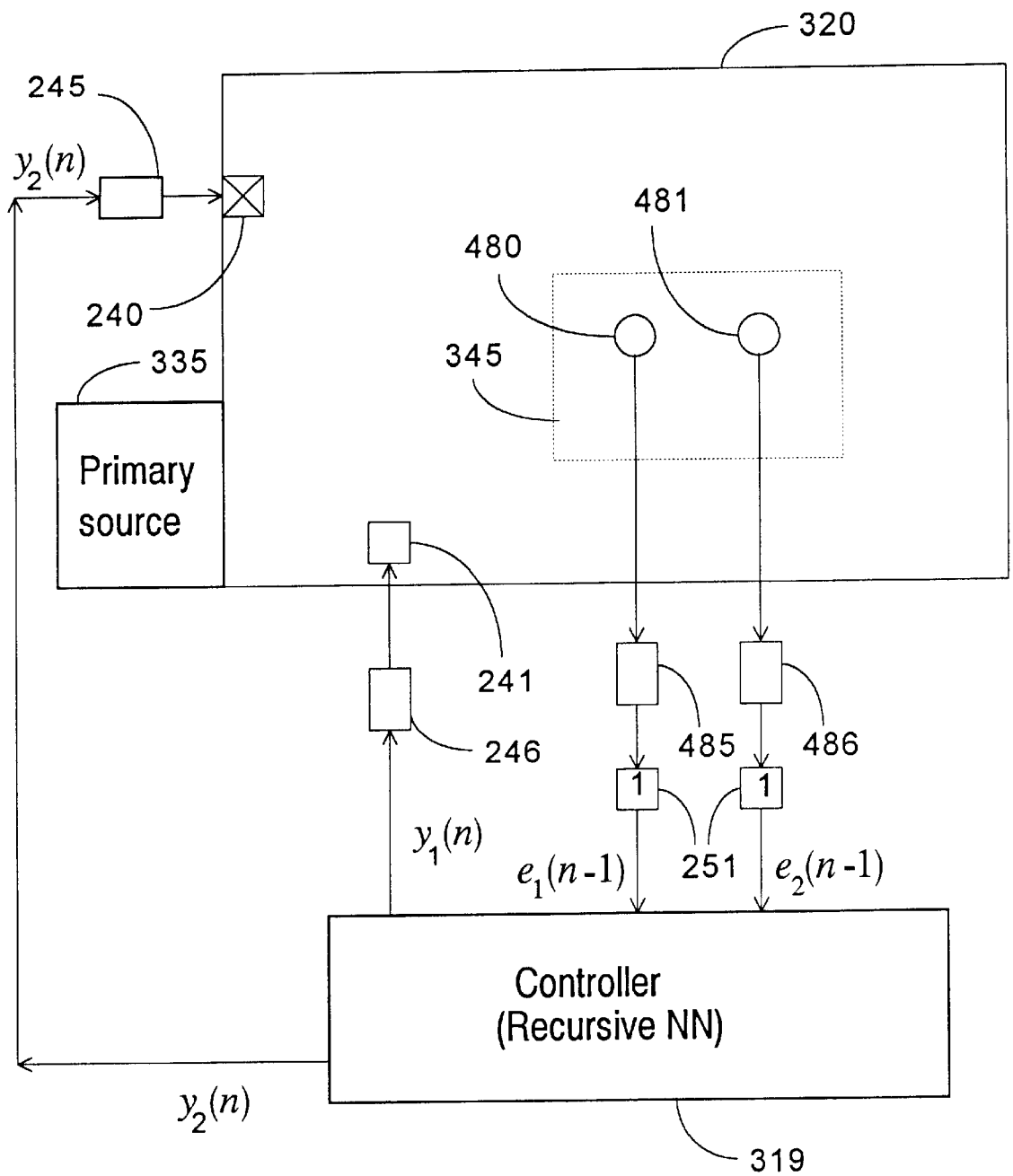
FIG. 25 is a schematic diagram of a second example AVC feedback system without online controller adjustment and path modeling.

2. FIG. 25 shows an AVC feedback system with two error sensors 480, 481 (e.g. two sensors selected from the group of microphones, hydrophones, accelerometers, velocity transducers, displacement transducers, and strain sensors); two secondary sources 240, 241 (e.g. two actuators selected from the group of loudspeakers, underwater sound projectors, hydraulic actuators, pneumatic actuators, proof mass actuators, electrodynamic/electromagnetic actuators, magnetostrictive actuators, shape memory alloy actuators, and piezoelectric actuators); and a controller 319 (i.e. a recursive neural network). The rectangular block 320 represents a vibration channel or medium 320 (e.g. a gas-filled or liquid-filled enclosure/space, a flexible structure, or a mechanical system). The block 335 represents a primary source (e.g. an internal combustion engine, an electric motor, automobile wheels, a vibrating structure, a vibrating mechanical system, a jet engine, an electric fan, a structural vibration actuator or a loudspeaker). The blocks 485, 486 represent error signal conditioners. The error sensors 480, 481, which are placed at objective points, and their signal conditioners 485, 486 are the main components of the error sensor means of the AVC feedback system. The blocks 245, 246 represent signal conditioners for the secondary sources 240, 241. These two signal conditioners 245, 246 and two secondary sources 240, 241 are the main components of the secondary source means of the AVC feedback system. It is assumed that the error signals contain sufficient information about the changes that the operating environment undergoes for the recursive NN 319 to properly drive the secondary sources to attenuate the primary vibration in the objective region 345.

It is noted that the number of error sensors of each type, the number of secondary sources of each type and their respective locations depicted in FIG. 25 are selected here only for the ease in illustrating a multiple channel AVC feedback system in accordance with the present invention. In designing a real AVC feedback system for a given application, the selection should be made with great care to have a good AVC performance for the given application.

During the operation of the AVC feedback system, a combination of the primary and the secondary vibrations are sensed by the error sensor means, which outputs discrete-time digital error signals, $e_1(n)$ and $e_2(n)$. These error signals form the error signal vector e(n). The recursive neural network 319 processes delayed error signal vector e(n−1) and generates discretetime digital control signals $y_1(n)$ and $y_2(n)$. These control signals form the control signal vector y(n) and are converted into two secondary vibrations by the secondary source means.

These two example AVC feedback systems are referred to as FIG. 24 example and FIG. 25 example respectively. Although in these examples, there is an error sensor at each objective point, An AVC feedback system without online controller adjustment and path modeling in accordance with this invention can have no error sensor placed at an objective point(s), if the error sensor(s) used provide(s) sufficient information online about the operating environment for the AVC feedback system to achieve satisfactory AVC performance. It is stressed that there is no reference sensor in these example AVC feedback systems and that the weights of the recursive neural networks therein are held fixed during the operation of these examples. A preferred recursive neural network for an AVC feedback system without online controller adjustment and path modeling is MLPWINOFTD (multilayer perceptron with interconnected neurons, output feebacks and tapped delay lines).

The weights of the recursive NN (neural network) in an above-described AVC feedback system without online controller adjustment and path modeling are determined in an omine training and are fixed online. The recursive NN must be trained to be adaptive to all typical values, $\theta_1, \theta_2, \ldots, \theta_K$, of the environmental parameter $\theta$ for the AVC feedback system in the hope that all possible values of $\theta$ can be adapted to by the recursive NN. Recall that these typical values may represent typical conditions of the operating environment for an AVC feedback system that can be identified.

Figure 26:
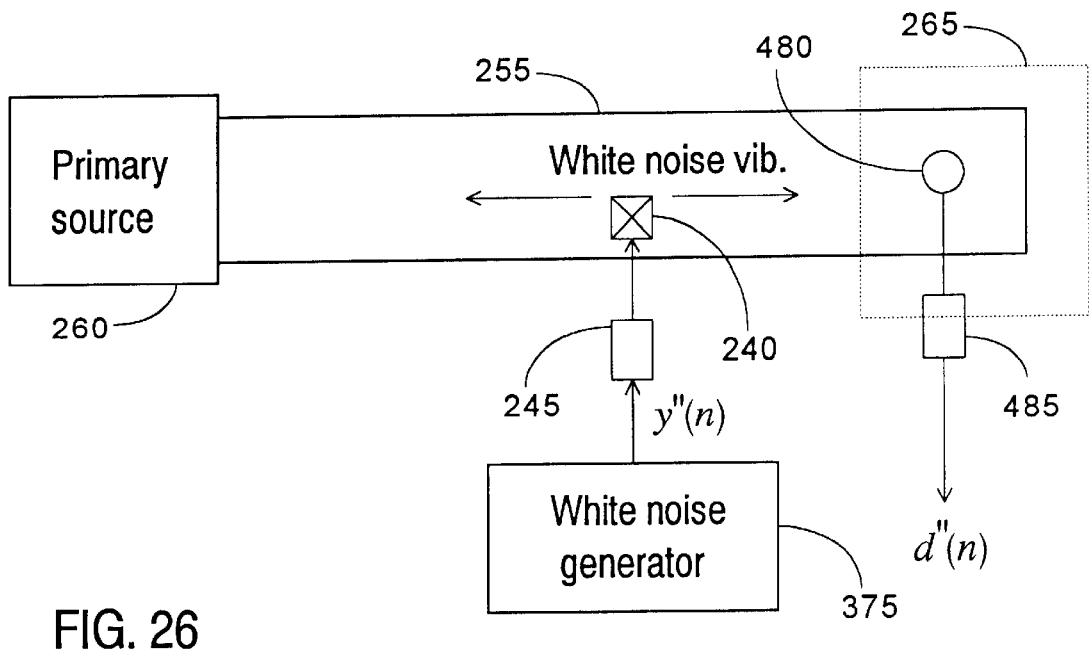
FIG. 26 shows an experimental setup for collecting data for modeling the secondary path in FIG. 24.

To illustrate a procedure of synthesizing a recursive NN into a controller for the afore-described AVC feedback system, the procedure is described for the FIG. 24 and FIG. 25 examples in the following:

FIG. 26 shows an experimental setup to collect data for modeling the secondary path. Note that a white noise generator 375 is used, but the controller 254 is not. For each typical value $\theta_k$ of the environmental parameter $\theta$, set the operating environment to the condition corresponding to the typical value $\theta_k$, allowing the primary vibration if necessary, turn on the white noise generator, and record the digital signal sequences, y"(n,ω) and d"(n,ω), for n=1, ..., N, for each sample realization ω of y"(n) and d"(n) under condition $\theta_k$. The white noise generated by the white noise generator should be statistically independent to the primary vibration. N is chosen to be sufficiently large that the dynamics of the secondary path is adequately represented over a time period of length N. The collection of all sample realizations ω under condition $\theta_k$ is denoted by $\Omega_k$. For each $\theta_k$, a model $\hat{S}_k(z)$ of (the input/output relationship for) the secondary path is developed by training a linear system (or filter) on the data set {(y"(n,ω),d"(n,ω)), ω∈Ω"$_k$}. Note that $\hat{S}_k(z)$ denotes the transfer function of the linear system model of the secondary path for $\theta=\theta_k$.

Now, turn off the white noise generator 375. For each typical value $\theta_k$, turn on the primary source 260 (or leave it on) and record the output sequence, d(n,ω), n=1, ..., N, of the error signal conditioner for each sample realization ω of d(n) under condition $\theta_k$. The collection of all sample realizations ω under condition $\theta_k$ is denoted by $\Omega_k$.

Figure 27:
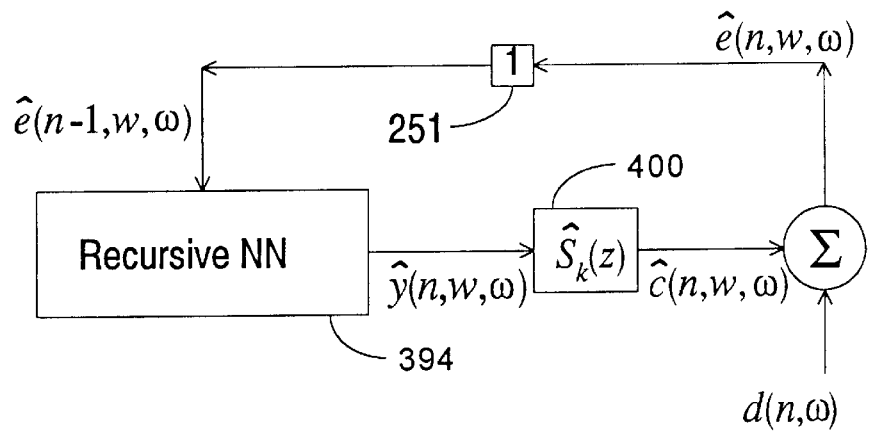
FIG. 27 shows how the estimated error signals, that appear in the training criterion for training a recursive neural network into a controller for the AVC system in FIG. 24, are defined in terms of the secondary path models and the training data.

FIG. 27 shows how the estimated error signals, that appear in a training criterion below for training a recursive neural network into a controller for the AVC feedback system in FIG. 24, are defined in terms of the secondary path models and the training data: For each ω∈Ω$_k$, the delayed estimated error signal sequence ê(n−1,w,ω) is processed by the recursive NN 394 with weights w and the secondary path model 400 $\hat{S}_k(z)$ in producing an estimate ĉ(n,w,ω) of the cancelling (i.e. secondary) vibration. An estimated error signal ê(n,w,ω)=d(n,ω)+ĉ(n,w,ω) is obtained through the summing junction.

A training criterion for determining the weights w in the recursive NN is $$Q(w) = \sum_{k=1}^{K} \sum_{\omega \in \Omega_k} Q_\omega(w) \tag{18}$$

$$Q_\omega(w) := \frac{1}{N|\Omega|} \sum_{n=1}^{N} [d(n, \omega) + \hat{c}(n, w, \omega)]^2$$

where $|\Omega|$ is the number of elements in $\Omega := \cup_{k=1}^{K} \Omega_k$. Note that depending on the type of experimental error sensor 365 used, the estimated error signal ê(n,w,ω) may be an estimated error in pressure, velocity, acceleration, displacement, or force. Of course, different types of training criterion (e.g. an estimated average power of the residual vibration) can be used and the power consumption for AVC can be incorporated into the training criterion.

Algorithms for training recursive neural networks with respect to a training criterion are discussed in some published books and research papers. Backpropagation through time (BPTT) and real time recurrent learning (RTRL) algorithms for differentiating a training criteria with respect to the weights (including initial activation levels) of an MLP-WIN or MLPWOF can be found in U.S. Pat. Nos. 5,408,424 and 5,649,065. Algorithms for training a recursive NN with respect to the above training criterion can be obtained by modifying existing algorithms.

The "multistream" training method reported in L. A. Feldkamp and G. V. Puskorius, "Training of robust neural controller," in *Proceedings of the 33rd Conference on Decision and Control*, pp. 2754–2759, Lake Buena Vista, Fla., 1994, after some modification, is expected to be effective here.

In synthesizing a controller, at least one recursive NN is trained and the best one in terms of the AVC performance and online computational cost is selected as a candidate for the controller. If the recursive NN thus obtained needs to be improved, an online training method can be applied to adjust the weights of the recursive NN to reduce the error signal. Such training and adjusting may be repeated before a recursive NN is selected as the controller, and the AVC feedback system deployed.

Figure 28:
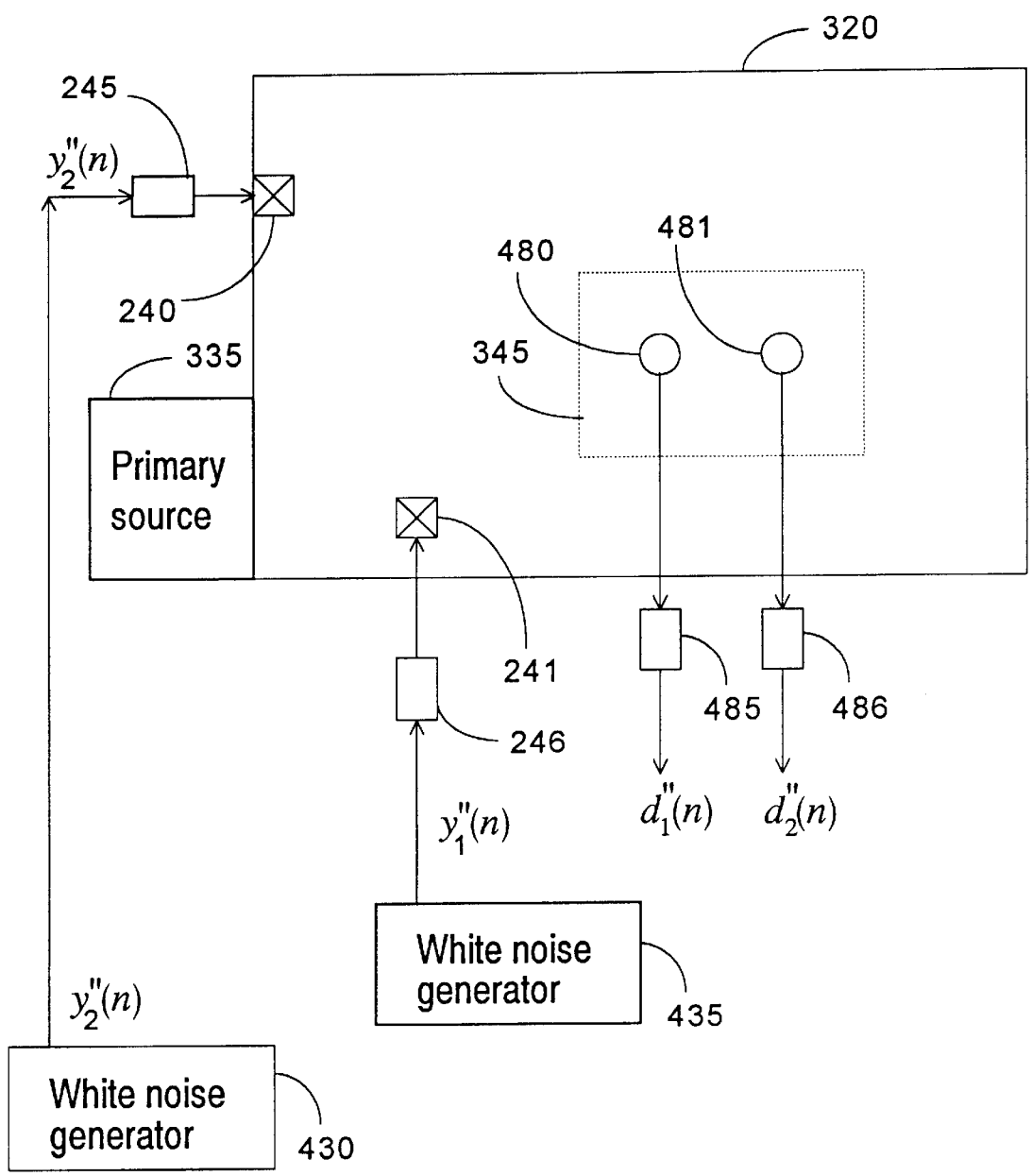
FIG. 28 shows an experimental setup for collecting data for modeling the secondary paths in FIG. 25.

FIG. 28 shows an experimental setup to collect data for modeling the secondary paths. Note that two error sensors 480, 481 with signal conditioners 485, 486 and two white noise generators 430, 435 are used, but the controller 319 is not. For each typical value $\theta_k$ of the environmental parameter $\theta$, set the operating environment to the condition corresponding to the typical value $\theta_k$, allowing the primary source, turn on the white noise generators, and record the digital signal sequences, y"$_1$(n,ω), y"$_2$(n,ω), d"$_1$(n,ω), and d"$_2$(n,ω), for n=1, ..., N, for each sample realization ω of y"$_1$(n), y"$_2$(n), d"$_1$(n), and d"$_2$(n) under condition $\theta_k$. N is chosen to be sufficiently large that the dynamics of the secondary and feedback paths are adequately represented over a time period of length N. The collection of all sample realizations ω under condition $\theta_k$ is denoted by $\Omega"_k$. The (input/output relationship for) secondary path from y"$_j$(n) to d"$_i$(n) under $\theta_k$ is denoted by $S_k^{ij}(z)$. For each $\theta_k$, a model $\hat{S}_k^{ij}(z)$ of the secondary path $S_k^{ij}(z)$ is developed by training a linear system (or filter) on the data set {(y"$_j$(n,ω), d"$_i$(n,ω)), ω∈Ω"$_k$} for i=1,2, j=1,2, and k=1, ..., K. Note that $\hat{S}_k^{ij}(z)$ denote the transfer functions of the linear system models.

Now, turn off the white noise generators. For each typical value $\theta_k$, turn on the primary source 335 and record the digital signal sequences, $d_1(n,\omega)$, and $d_2(n,\omega)$, for n=1, ..., N, for each sample realization ω of $d_1(n)$, and $d_2(n)$ under condition $\theta_k$. The collection of all sample realizations ω under condition $\theta_k$ is denoted by $\Omega_k$.

Figure 29:
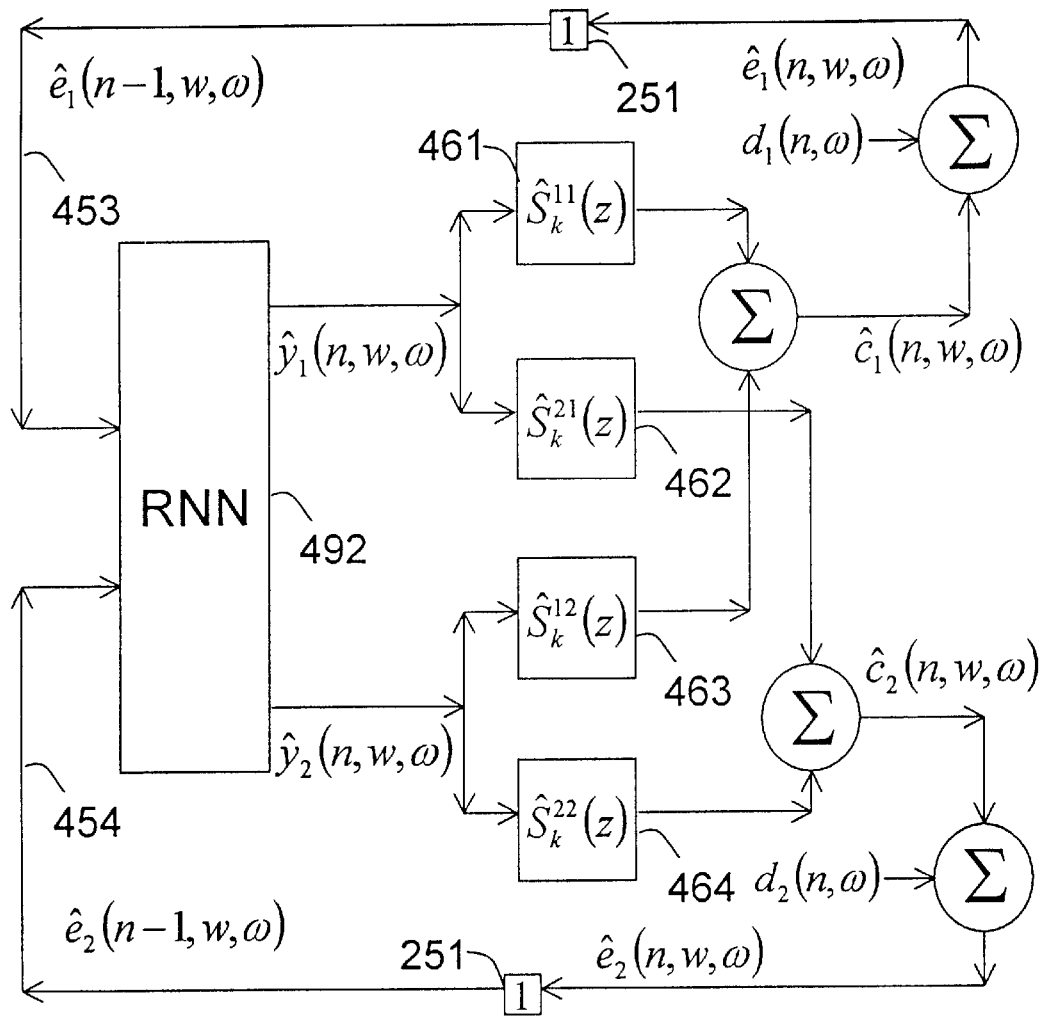
FIG. 29 shows how the estimated error signals, that appear in the training criterion for training a recursive neural network into a controller for the AVC system in FIG. 25, are defined in terms of the secondary path models and the training data.

FIG. 29 shows how the estimated error signals, that appear in a training criterion below for training a recursive neural network into a controller for the AVC feedback system in FIG. 25, are defined in terms of the secondary path models and the training data: For ω∈Ω$_k$, the delayed estimated error signals, ê$_m$(n−1,w,ω), m=1,2, are processed by the recursive NN 492 with weights w to generate estimated control signals, ŷ$_m$(n,w,ω), m=1,2, which in turn are processed by the secondary path model 461, 462, 463, 464, $\hat{S}_k^{ij}(z)$, i=1,2, j=1,2, to produce estimates, ĉ$_m$(n,w,ω), m=1,2, of the cancelling (i.e. secondary) vibrations. The estimated error signal ê$_m$(n,w,ω) is the sum of ĉ$_m$(n,w,ω) and d$_m$(n,ω) for m=1,2. The blocks 251 represent a unit-time delay device.

A training criterion for determining the weights w in the recursive NN is $$Q(w) = \sum_{k=1}^{K} \sum_{\omega \in \Omega_k} Q_\omega(w) \quad (19)$$

$$Q_\omega(w) := \frac{1}{N|\Omega|} \sum_{n=1}^{N} \sum_{m=1}^{2} [d_m(n, \omega) + \hat{c}_m(n, w, \omega)]^2$$

where $|\Omega|$ is the number of elements in $\Omega := \cup_k$. Note that depending on the type of experimental error sensor 365 used, the estimated error signal $\hat{e}_m(n,w,\omega)$ may be an estimated error in pressure, velocity, acceleration, displacement, or force. Of course, different types of training criterion (e.g. an estimated average power of the residual vibration) can be used and the power consumption for AVC can be incorporated into the training criterion.

If there is no error sensor at an objective point(s) for an AVC feedback system without online controller adjustment and path modeling, an experimental error sensor(s) must be used at the objective point(s) in collecting the training data, which are in turn used to construct the training criterion.

Algorithms for training recursive neural networks with respect to a training criterion are discussed in some published books and research papers. Backpropagation through time (BPTT) and real time recurrent learning (RTRL) algorithms for differentiating a training criteria with respect to the weights (including initial activation levels) of an MLP-WIN or MLPWOF can be found in U.S. Pat. Nos. 5,408,424 and 5,649,065. Algorithms for training a recursive NN with respect to the above training criterion can be obtained by modifying existing algorithms.

The "multistream" training method reported in L. A. Feldkamp and G. V. Puskorius, "Training of robust neural controller," in *Proceedings of the 33rd Conference on Decision and Control,* pp. 2754–2759, Lake Buena Vista, Fla., 1994, after some modification, is expected to be effective here.

In synthesizing a controller, at least one recursive NN is trained and the best one in terms of AVC performance and online computational cost is selected as a candidate for the controller. If the recursive NN thus obtained needs to be improved, an online training method can be applied to adjust the weights of the recursive NN to reduce the error signal. Such training and adjusting may be repeated before a recursive NN is selected as the controller, and the AVC feedback system deployed.

Conclusion, Ramification, and Scope of Invention

While our descriptions hereinabove contain many specificities, these should not be construed as limitations on the scope of the invention, but rather as an exemplification of preferred embodiments. In addition to these embodiments, those skilled in the art will recognize that other embodiments are possible within the teachings of the present invention. Accordingly, the scope of the present invention should be limited only by the appended claims and their appropriately construed legal equivalents.

What is claimed is:

1. An active vibration control system for attenuating at least one primary vibration by injecting at least one cancelling vibration in an uncertain operating environment, comprising
    (a). reference sensor means, comprising at least one reference sensor, for deriving at least one reference signal containing information about said at least one primary vibration;
    (b). a recursive neural network, comprising a plurality of weights, which processes said at least one reference signal to generate at least one control signal; and
    (c). secondary source means, comprising at least one secondary source, for converting said at least one control signal into said at least one cancelling vibration, wherein said weights are held fixed online during the operation of said active vibration control system.

2. The active vibration control system of claim 1, wherein said at least one primary vibration is at least one acoustic vibration.

3. The active vibration control system of claim 1, wherein said at least one primary vibration is at least one structural vibration.

4. The active vibration control system of claim 1, wherein said at least one primary vibration is an engine exhaust noise and said at least one secondary source is a speaker.

5. The active vibration control system of claim 1, wherein said reference sensor means comprises a plurality of reference sensors, and said secondary source means comprises a plurality of secondary sources.

6. The active vibration control system of claim 1, wherein said reference sensor means comprises at least one nonvibrational sensor.

7. The active vibration control system of claim 1, wherein said reference sensor means comprises at least one vibrational sensor.

8. The active vibration control system of claim 1, wherein said recursive neural network is a multilayer perceptron with interconnected neurons and tapped delay lines.

9. The active vibration control system of claim 1, wherein said recursive neural network is a multilayer perceptron with interconnected neurons, output feedbacks and tapped delay lines.

10. An active vibration control system for attenuating at least one primary vibration by injecting at least one cancelling vibration in an uncertain operating environment, comprising
    (a). reference sensor means, comprising at least one reference sensor, for deriving at least one reference signal containing information about said at least one primary vibration;
    (b). error sensor means, comprising at least one error sensor, for sensing the combination of said at least one primary vibration and said at least one cancelling vibration to provide at least one error signal;
    (c). a recursive neural network, comprising a plurality of weights, for processing said at least one reference signal and said at least one error signal to generate at least one control signal; and
    (d). secondary source means, comprising at least one secondary source, for converting said at least one control signal into said at least one cancelling vibration, wherein said weights are held fixed online during the operation of said active vibration control system.

11. The active vibration control system of claim 10, wherein said at least one primary vibration is at least one acoustic vibration.

12. The active vibration control system of claim 10, wherein said at least one primary vibration is at least one structural vibration.

13. The active vibration control system of claim 10, wherein no error sensor is placed at at least one objective point.

14. The active vibration control system of claim 10, wherein said reference sensor means comprises at least one nonvibrational sensor.

15. The active vibration control system of claim 10, wherein said at least one primary vibration is at least one acoustic vibration and at least one structural vibration.

16. The active vibration control system of claim 10, wherein said reference sensor means comprises at least one vibrational sensor.

17. The active vibration control system of claim 10, wherein said recursive neural network is a multilayer perceptron with interconnected neurons and tapped delay lines.

18. The active vibration control system of claim 10, wherein said recursive neural network is a multilayer perceptron with interconnected neurons, output feedbacks and tapped delay lines.

19. The active vibration control system of claim 10, wherein said reference sensor means comprises a plurality of reference sensors, said error sensor means comprises a plurality of error sensors, and said secondary source means comprises a plurality of secondary sources.

20. An active vibration control system for attenuating at least one primary vibration by injecting at least one cancelling vibration in an uncertain operating environment, comprising
   (a). error sensor means, comprising at least one error sensor, for sensing the combination of said at least one primary vibration and said at least one cancelling vibration to provide at least one error signal;
   (b). a recursive neural network, comprising a plurality of weights, for processing said at least one error signal to generate at least one control signal; and
   (c). secondary source means, comprising at least one secondary source, for converting said at least one control signal into said at least one cancelling vibration, wherein said plurality of weights are held fixed online during the operation of said active vibration control system.

21. The active vibration control system of claim 20, wherein said at least one primary vibration is at least one acoustic vibration.

22. The active vibration control system of claim 20, wherein said at least one primary vibration is at least one structural vibration.

23. The active vibration control system of claim 20, wherein said at least one primary vibration is at least one acoustic vibration and at least one structural vibration.

24. The active vibration control system of claim 20, wherein no error sensor is placed at at least one objective point.

25. The active vibration control system of claim 20, wherein said error sensor means comprises a plurality of error sensors, and said secondary source means comprises a plurality of secondary sources.

26. The active vibration control system of claim 20, wherein said recursive neural network is a multilayer perceptron with interconnected neurons and tapped delay lines.

27. The active vibration control system of claim 20, wherein said recursive neural network is a multilayer perceptron with interconnected neurons, output feedbacks and tapped delay lines.

* * * * *